(12) United States Patent
Tatematsu et al.

(10) Patent No.: US 7,768,170 B2
(45) Date of Patent: Aug. 3, 2010

(54) ROTARY ELECTRIC MACHINE

(75) Inventors: Kazutaka Tatematsu, Toyota (JP); Yasuhide Yagyu, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 318 days.

(21) Appl. No.: 11/920,279

(22) PCT Filed: Jun. 10, 2005

(86) PCT No.: PCT/JP2005/011090

§ 371 (c)(1),
(2), (4) Date: Nov. 13, 2007

(87) PCT Pub. No.: WO2006/131993

PCT Pub. Date: Dec. 14, 2006

(65) Prior Publication Data

US 2009/0021096 A1    Jan. 22, 2009

(30) Foreign Application Priority Data

Jan. 16, 2004    (JP) .............................. 2004-009222

(51) Int. Cl.
*H02K 16/04* (2006.01)
(52) U.S. Cl. .............................. 310/156.39; 310/156.35
(58) Field of Classification Search ............ 310/156.35, 310/156.36, 156.38, 156.39, 266, 269
See application file for complete search history.

(56) References Cited

U.S. PATENT DOCUMENTS

| | | | |
|---|---|---|---|
| 4,488,075 A | 12/1984 | DeCesare | |
| 4,656,379 A * | 4/1987 | McCarty | 310/181 |
| 4,916,346 A | 4/1990 | Kliman | |
| 5,864,197 A | 1/1999 | Naito et al. | |
| 5,952,756 A * | 9/1999 | Hsu et al. | 310/156.35 |
| 6,211,597 B1 | 4/2001 | Nakano | |
| 6,426,577 B1 * | 7/2002 | Sekiyama et al. | 310/162 |
| 6,744,164 B2 | 6/2004 | Kadoya et al. | |

(Continued)

FOREIGN PATENT DOCUMENTS

DE    1 538 831 A    1/1970

(Continued)

OTHER PUBLICATIONS

Office Action mailed Apr. 6, 2010 from Japanese Patent Application No. 2004-009222 and English translation thereof.

(Continued)

*Primary Examiner*—Dang D Le
(74) *Attorney, Agent, or Firm*—Kenyon & Kenyon LLP

(57) ABSTRACT

A rotary electric machine having a stator and capable of effectively utilizing both end faces of a rotor in the rotating axis direction. The stator comprises a radial part disposed in the rotating axis direction and axial parts disposed in the radial direction. The radial part and the axial parts comprise teeth and coils. The rotor comprises a rotor shaft, a rotor core, and a magnet. The rotor core comprises a radial part and axial parts. The magnet comprises a radial part and axial parts. The radial part and the axial parts of the magnet are formed to face the radial part and the axial parts and of the stator.

8 Claims, 36 Drawing Sheets

U.S. PATENT DOCUMENTS

| | | |
|---|---|---|
| 7,034,422 B2 * | 4/2006 | Ramu .................. 310/114 |
| 2004/0135453 A1 | 7/2004 | Naito et al. |
| 2005/0116679 A1 | 6/2005 | Ramu |
| 2005/0179336 A1 | 8/2005 | Hasebe et al. |

FOREIGN PATENT DOCUMENTS

| | | |
|---|---|---|
| JP | 7-123677 A | 5/1995 |
| JP | 8-331816 A | 12/1996 |
| JP | 9-285046 A | 10/1997 |
| JP | 10-004641 A | 1/1998 |
| JP | 11-243672 A | 9/1999 |
| JP | 11-275826 A | 10/1999 |
| JP | 11-275827 A | 10/1999 |
| JP | 11-275828 A | 10/1999 |
| JP | 2003-189567 A | 7/2003 |
| JP | 2003-319583 A | 11/2003 |
| JP | 2004-112865 A1 | 4/2004 |
| JP | 2004-222384 A | 8/2004 |
| JP | 2005-151725 A | 6/2005 |
| WO | WO 03/012956 A1 | 2/2003 |
| WO | WO 03/100944 A1 | 12/2003 |

OTHER PUBLICATIONS

Office Action dated Mar. 11, 2010 of Chinese Patent Application No. 200580050077.9 and English translation thereof.

* cited by examiner

ROTARY ELECTRIC MACHINE

This is a 371 national phase application of PCT/JP2005/011090 filed 10 Jun. 2005, the content of which is incorporated herein by reference.

FIELD OF THE INVENTION

The present invention relates to a rotary electric machine in which both end faces of a rotor in a rotating axis direction can be effectively utilized in terms of their magnetic properties.

BACKGROUND OF THE INVENTION

JP 11-275826 discloses a rotary electric machine comprising two rotors and one stator. The one stator is placed between the two rotors. Then, the two rotors and the one stator are concentrically arranged so as to have the same axis.

A single coil is formed on stator. Then, combined currents are passed through the single coil to generate rotating magnetic fields corresponding in number to the number of rotors. With this configuration, it becomes possible for one of the two rotors to be used with the one stator to constitute a motor, while the other of the two rotors can be used with the one stator to constitute a generator.

In addition, similar technologies are also described in Japanese Patent Publications JP 11-275827 and JP 11-275828.

However, in the rotary electric machine disclosed in JP 11-275826, no stators are disposed at locations opposing the end faces of the rotor in the rotating axis direction, which results in a problem that it is not possible to make effective use of the end faces of the rotor in the rotating axis direction.

The present invention, which addresses the above-described problem, advantageously provides a rotary electric machine capable of making effective use of both end faces of a rotor in a rotating axis direction.

SUMMARY OF THE INVENTION

According to the present invention, a rotary electric machine comprises a rotor and a stator. The rotor has a plurality of first rotor magnetic pole sections directed toward a radial direction, a plurality of second rotor magnetic pole sections directed toward a rotating axis direction, and a rotor core having a cylinder surface that encloses a rotating axis and a cylinder end face located at an end in the rotating axis direction. The stator has a plurality of first stator magnetic pole sections which are opposed to the cylinder surface and disposed corresponding to the plurality of respective first rotor magnetic pole sections to generate magnetic flux along the radial direction and a plurality of second stator magnetic pole sections which are opposed to the cylinder end face and disposed corresponding to the plurality of respective second rotor magnetic pole sections to generate magnetic flux along the rotating axis direction. The rotor rotates freely relative to the stator upon receiving, at the plurality of first and second rotor magnetic pole sections, magnetic flux from the plurality of respective first and second stator magnetic pole sections.

Then, each of the first rotor magnetic pole sections is composed of a first magnet placed on the cylinder surface of the rotor core and magnetized in the radial direction. Further, each of the second rotor magnetic pole sections is composed of a second magnet embedded in the rotor core and magnetized in the rotating axis direction. Further, the rotor core is sandwiched between both end parts, in the rotating axis direction, of a plurality of magnets each having a cross section which is integrally formed in the shape of a substantially cornered letter C. A middle part of each of the plurality of magnets along the rotating axis direction constitutes the first magnet, and the both end parts of each of the plurality of magnets in the rotating axis direction constitute the second magnet.

In addition, the first rotor magnetic pole sections are composed of a first magnet embedded in the rotor core and magnetized in the radial direction. Further, the second rotor magnetic pole sections are composed of a second magnet embedded in the rotor core and magnetized in the rotating axis direction. Still further, a plurality of magnets each of which is integrally formed and inserted into a hole provided in the rotating axis direction. A middle part of each of the plurality of magnets along the rotating axis direction constitutes the first magnet, while both end parts of each of the plurality of magnets in the rotating axis direction constitute the second magnet.

In addition, each of the first rotor magnetic pole sections is composed of a first ferromagnetic material that forms the rotor core and has a magnetic property of a salient pole in the radial direction. Further, each of the second rotor magnetic pole sections is composed of a second ferromagnetic material that forms the rotor core and has the magnetic property of a salient pole in the rotating axis direction. Still further, the first ferromagnetic material includes at least one type of first cavities, each of which is formed in the rotating axis direction, disposed along the radial direction. In addition, the second ferromagnetic material includes at least one type of second cavities, each of which is formed in the radial direction, disposed along the rotating axis direction.

Preferably, the first cavities are contiguous with the second cavities.

In addition, each of the first rotor magnetic pole sections is composed of a first ferromagnetic material that forms the rotor core and protrudes from the cylinder surface in a direction toward the first stator magnetic pole sections. Each of the second rotor magnetic pole sections is composed of a second ferromagnetic material that forms the rotor core and protrudes from the cylinder end face in a direction toward the second stator magnetic pole sections. Further, the rotor core has, on a plurality of locations along the circumferential direction, a protrusion that protrudes in both the radial direction and the rotating axis direction from the locations along the circumferential direction, in which a part of the protrusion protruding in the radial direction constitutes the first ferromagnetic material, while a part of the protrusion protruding in the rotating axis direction constitutes the second ferromagnetic material. Then, the first stator magnetic pole sections are configured so as to protrude in a direction toward the first rotor magnetic pole sections, while the second stator magnetic pole sections are configured so as to protrude in a direction toward the second rotor magnetic pole sections.

In addition, the second rotor magnetic pole sections include a magnet, and the first rotor magnetic pole sections are composed of only the ferromagnetic material for forming the rotor core. Further, the rotor core has, in the vicinity of its both ends in the rotating axis direction, a cavity which continues in the radial direction extending from the cylinder surface toward an inner circumference direction in parallel to the cylinder end face.

Preferably, the first rotor magnetic pole sections are composed of a ferromagnetic material having the magnetic property of a salient pole in the radial direction. The second rotor magnetic pole sections are composed of a magnet embedded in the rotor core and magnetized in the rotating axis direction.

Preferably, the ferromagnetic material includes at least one type of cavities, each of which is formed in the rotating axis direction, disposed along the radial direction.

In addition, the first rotor magnetic pole sections include a magnet embedded in the rotor core and magnetized in the radial direction. Further, the second rotor magnetic pole sections include a ferromagnetic material that forms the rotor core and has the magnetic property of a salient pole in the rotating axis direction. Still further, the magnet constituting the first rotor magnetic pole sections and a part of the ferromagnetic material constituting the second rotor magnetic pole sections are disposed on the same location in the radial direction.

Preferably, the ferromagnetic material has an indented structure with protrusions and depressions formed along a circumferential direction of the rotor. The magnet is disposed corresponding to the depressions in the indented structure.

Further, the first rotor magnetic pole sections include a magnet embedded in the rotor core and magnetized in the radial direction. Still further, the second rotor magnetic pole sections include a ferromagnetic material that forms the rotor core and has the magnetic property of a salient pole in the rotating axis direction. In addition, the rotor core includes at least one type of cavity in which a first continuous section of each of the cavities that continues in the rotating axis direction is connected to a second continuous section of each of the cavities that continues in the radial direction. The ferromagnetic material is situated on a region of the rotor core including the second continuous section. The magnet is inserted into the first continuous section that continues in the rotating axis direction.

Further, the first rotor magnetic pole sections include a magnet embedded in the rotor core and magnetized in the radial direction. Still further, the second rotor magnetic pole sections include a ferromagnetic material that forms the rotor core and has the magnetic property of a salient pole in the rotating axis direction.

In addition, the ferromagnetic material includes at least one type of slits, each of which is formed in the radial direction, disposed along the rotating axis direction. The magnet is disposed on an outer circumference side of the slits.

Preferably, the first rotor magnetic pole sections are composed of a ferromagnetic material having the magnetic property of a salient pole in the radial direction. Further, the second rotor magnetic pole sections are composed of a second magnet disposed on the cylinder end face of the rotor core and magnetized in the rotating axis direction.

Preferably, the ferromagnetic material includes at least one type of cavities, each of which is formed in the rotating axis direction, disposed along the radial direction.

In addition, the first rotor magnetic pole sections are composed of a magnet disposed on the cylinder surface of the rotor core and magnetized in the radial direction. Further, the second rotor magnetic pole sections are composed of a ferromagnetic material that forms the rotor core and has the magnetic property of a salient pole in the rotating axis direction. Still further, the cylinder end face of the rotor core constituting the second rotor magnetic pole sections is a flat surface aligned with an axial end face of the magnet in the rotating axis direction.

In addition, the second rotor magnetic pole sections are composed of a ferromagnetic material that forms the rotor core and has the magnetic property of a salient pole in the rotating axis direction. Further, the ferromagnetic material includes at least one type of slits, each of which is formed in the radial direction, disposed along the rotating axis direction.

In addition, the first rotor magnetic pole sections are composed of either a ferromagnetic material having the magnetic property of a salient pole in the radial direction or a magnet disposed on the cylinder surface of the rotor core and magnetized in the radial direction. Further, the second rotor magnetic pole sections are composed of either a second magnet disposed on the cylinder end face of the rotor core and magnetized in the rotating axis direction or a ferromagnetic material that forms the rotor core and has the magnetic property of a salient pole in the rotating axis direction. Still further, the first rotor magnetic pole sections are disposed on locations shifted by an electrical angle of 45 degrees relative to placement locations of the second rotor magnetic pole sections.

In addition, the stator has a cooling water channel in a joint part between the plurality of first stator magnetic pole sections and the plurality of second stator magnetic pole sections.

Preferably, the first stator magnetic pole sections comprise a first tooth disposed along the rotating axis direction of the rotor and a first coil wound around the first tooth. Further, the second stator magnetic pole sections comprise a second tooth disposed along the radial direction of the rotor and a second coil wound around the second tooth.

Preferably, a width of the second tooth in a direction toward an outer circumference from an inner circumference of the rotor is maintained substantially constant or is narrowed.

Preferably, one of the first coil or the second coil is placed inside the coil ends of the other of the first coil or the second coil.

In addition, the first stator magnetic pole sections are composed of a first tooth disposed along the rotating axis direction of the rotor and a first coil wound around the first tooth. Further, the second stator magnetic pose sections are composed of a second tooth disposed along the radial direction of the rotor and a second coil wound around the second tooth. Still further, the first tooth is integrally formed with the second tooth. In addition, the first coil is integrally wound with the second coil around the first and second teeth.

Preferably, the first tooth is separated from the second tooth. In addition, the first coil is wound around the first tooth separately from the second coil.

In addition, the first stator magnetic pole sections include a first stator core composed of a plurality of ferromagnetic members laminated along the rotating axis direction. The second stator magnetic pole sections include a second stator core composed of a plurality of ferromagnetic members laminated along the radial direction. Then, the joint part between the first stator magnetic pole sections and the second stator magnetic pole sections is composed of a magnetic dust material.

In addition, the first rotor magnetic pole sections include a first rotor core composed of a plurality of ferromagnetic members laminated along the rotating axis direction. The second rotor magnetic pole sections include a second rotor core composed of a plurality of ferromagnetic members laminated along the radial direction. Then, the joint part between the first rotor magnetic pole sections and the second rotor magnetic pole sections is composed of a magnetic dust material.

In addition, the first stator magnetic pole sections include the first stator core composed of a plurality of ferromagnetic members laminated along the rotating axis direction. The second stator magnetic pole sections include the second stator core composed of a plurality of ferromagnetic members laminated along the radial direction. The first rotor magnetic pole sections include the first rotor core composed of a plurality of ferromagnetic members laminated along the rotating axis direction. The second rotor magnetic pole sections include the second rotor core composed of a plurality of ferromagnetic members laminated along the radial direction. Then, both the joint part between the first stator magnetic pole sections and the second stator magnetic pole sections and the joint part between the first rotor magnetic pole sections and the second rotor magnetic pole sections are composed of a magnetic dust material.

Preferably, the rotor is disposed on an inner circumference side of the stator.

Preferably, the rotor is disposed on an outer circumference side of the stator.

In the rotary electric machine according to the present invention, rotor-stator magnetic interaction occurs in both the radial direction and the rotating axis direction of the rotor, which causes the rotor to freely rotate relative to the stator. In other words, a torque for rotating the rotor is generated in both the radial and rotating axis directions of the rotor.

Therefore, effective use of both end faces of the rotor in the rotating axis direction can be realized when the present invention is employed.

DETAILED DESCRIPTION

Figure 1:
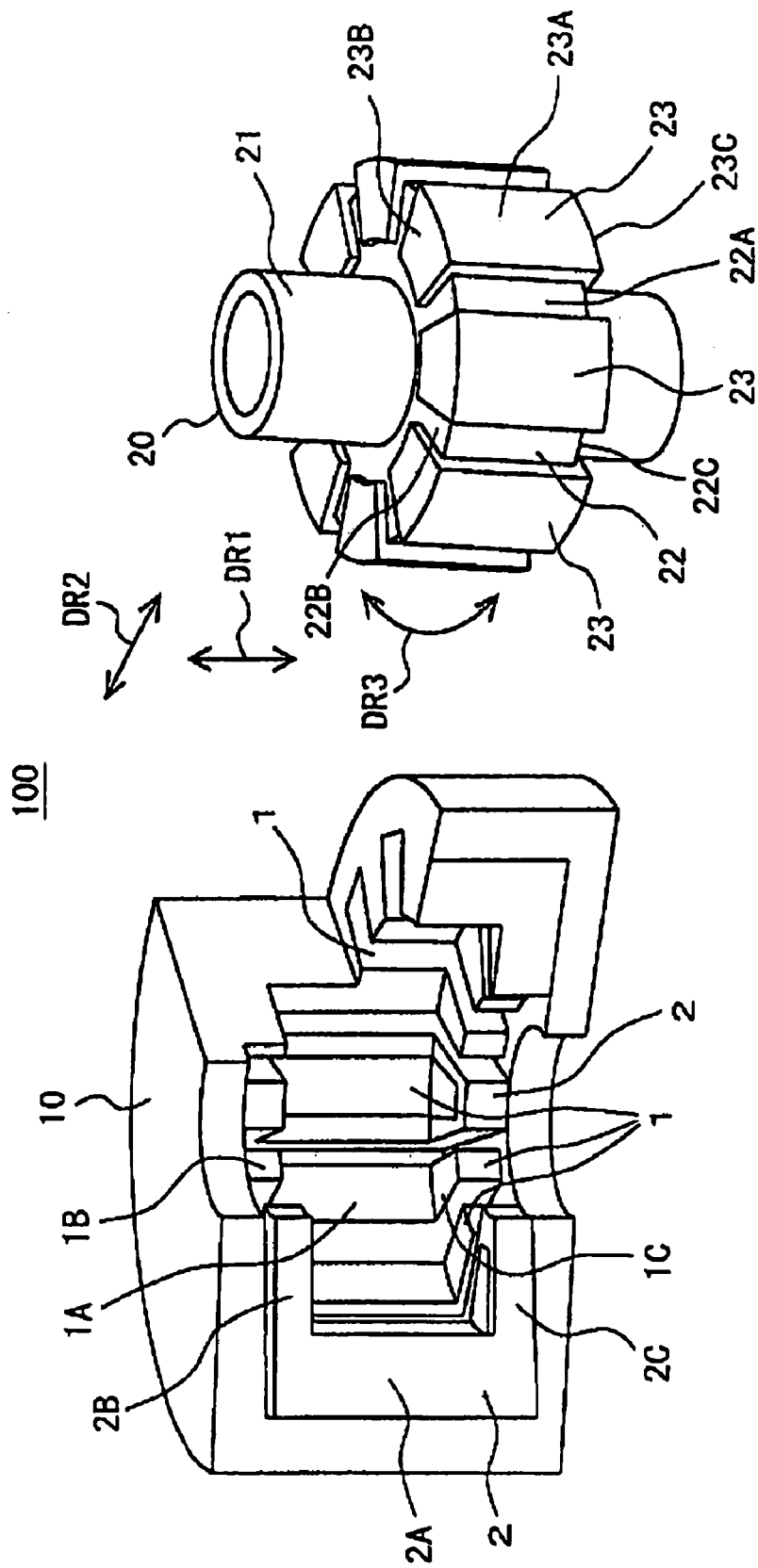
FIG. 1 is a perspective view showing a stator and a rotor in a rotary electric machine according to a first embodiment of the present invention.

Referring to the drawings, preferred embodiments of the present invention will be described in detail below. In the drawings, identical or equivalent components are designated by identical reference numerals, and descriptions related to these components will not be repeated.

Embodiment 1

FIG. 1 is a perspective view showing a stator and a rotor in a rotary electric machine according to a first embodiment of the present invention. Referring to FIG. 1, the rotary electric machine 100 according to Embodiment 1 comprises a stator 10 and a rotor 20.

The stator 10 having a substantially cylindrical hollow shape is formed of a magnetic material. Further, the stator 10 includes a tooth 1 and a coil 2. The tooth 1 is integrally formed in the shape of a substantially cornered letter C. Then, a plurality of teeth 1 are disposed at predetermined intervals along an inner wall of the stator 10.

The tooth 1 has a radial part 1A and axial parts 1B and 1C. The radial part 1A is positioned along a rotating axis direction DR1 of the rotor 20, while the axial parts 1B and 1C are positioned along a radial direction DR2 of the rotor 20. In the drawing of FIG. 1, the axial part 1B is disposed on an upper part of the stator 10, and the axial part 1C is disposed on a lower part of the stator 10.

The coil 2 is integrally wound around the tooth 1 in both the rotating axis direction DR1 and the radial direction DR2. Accordingly, the coil 2 also has the shape of a substantially cornered letter C and includes a radial part 2A and axial parts 2B and 2C. Because the coil 2 wound around the tooth 1 comes into contact with the inner wall of the stator 10, it is possible to improve the ability of the coil 2 to be cooled. More specifically, because the coil 2 is covered with the ferric material forming the stator 10, the cooling efficiency of the coil 2 is improved.

Because the coil 2 is wound around the tooth 1, a coil end of one of either the radial part 2A of the coil 2 wound around the radial part 1A of the tooth 1 or the axial parts 2B, 2C of the coil 2 wound around the axial parts 1B, 1C of the tooth 1 is situated inside a coil end of the other of either the radial part 2A of the coil 2 or the axial parts 2B, 2C of the coil 2. Because the remaining coil can then be located within a dead space inside the coil end, torque efficiency with respect to the overall length of the rotary electric machine 100 can be increased.

The rotor 20 comprises a rotor shaft 21, a rotor core 22 and magnets 23. The rotor core 22 has a substantially cylindrical shape and a structure in which a plurality of magnetic steel sheets are laminated along the rotating axis direction DR1 of the rotor 20. Then, the rotor core 22 is fixed to the rotor shaft 21. The magnet 23 is formed in the shape of a substantially cornered letter C and fixed to the rotor core 22 so as to hold the rotor core 22 therein. Further, a plurality of magnets 23 are disposed at predetermined intervals along a circumferential direction DR3 of the rotor 20.

The magnet 23 includes a radial part 23A and axial parts 23B and 23C. The radial part 23A is protruded along the radial direction DR2 from a cylinder surface 22A of the rotor core 22. On the other hand, the axial parts 23B, 23C are protruded along the rotating axis direction DR1 from cylinder end faces 22B, 22C of the rotor core 22.

More specifically, the radial part 23A is a magnet disposed on the cylinder surface 22A of the rotor 20, while the axial parts 23B and 23C are magnets disposed on the respective cylinder end faces 22B and 22C which exist on either end of the rotor 20 in the rotating axis direction DR1. Then, the radial part 23A is magnetized in the radial direction DR2, and the axial parts 23B, 23C are magnetized in the rotating axis direction DR1.

The rotor 20 is placed in a hollow portion of the stator 10. In this case, the radial part 1A of the tooth 1 and the radial part 2A of the coil 2 are opposed to the radial part 23A of the magnet 23, the axial part 1B of the tooth 1 and the axial part 2B of the coil 2 are opposed to the axial part 23B of the magnet 23, and the axial part 1C of the tooth 1 and the axial part 2C of the coil 2 are opposed to the axial part 23C of the magnet 23.

More specifically, the radial part 1A of the tooth 1 and the radial part 2A of the coil 2 are provided corresponding to the radial part 23A of the magnet 23, the axial part 1B of the tooth 1 and the axial part 2B of the coil 2 are provided corresponding to the axial part 23B of the magnet 23, and the axial part 1C of the tooth 1 and the axial part 2C of the coil 2 are provided corresponding to the axial part 23C of the magnet 23. Further, because the radial part 23A of the magnet 23 is placed on the cylinder surface 22A of the rotor core 22, while the axial parts 23B and 23C of the magnet 23 are respectively placed on the cylinder end faces 22B and 22C of the rotor core 22 as described above, the radial part 1A of the tooth 1 and the radial part 2A of the coil 2 are disposed so as to oppose the cylinder surface 22A of the rotor core 22, the axial part 1B of the tooth 1 and the axial part 2B of the coil 2 are disposed so as to oppose the cylinder end face 22B of the rotor core 22, and the axial part 1C of the tooth 1 and the axial part 2C of the coil 2 are disposed so as to oppose the cylinder end face 22C of the rotor core 22.

It should be noted that each of the plurality of magnets 23, 23, . . . disposed along the circumferential direction DR3 of the rotor 20 constitutes a rotor magnetic pole section. Further, the rotor magnetic pole section has a radial rotor magnetic pole section composed of the radial part 23A of the magnet 23 and axial rotor magnetic pole sections composed of the axial parts 23B and 23C of the magnet 23.

In addition, each of the plurality of teeth 1, 1, disposed along the circumferential direction DR3 constitutes, together with each of the plurality of coils 2, 2, . . . wound around the plurality of teeth 1, 1, . . . , a stator magnetic pole section. Further, the stator magnetic pole section has a radial stator magnetic pole section composed of the radial part 1A of the tooth 1 and the radial part 2A of the coil 2, and axial stator magnetic pole sections composed of the axial parts 1B, 1C of the tooth 1 and the axial parts 2B, 2C of the coil 2.

Because the radial part 23A and the axial parts 23B, 23C are respectively placed on the cylinder surface 22A and the cylinder end faces 22B and 22C of the rotor core 22 as described above, the radial part 23A and the axial parts 23B, 23C of the rotor 20 are formed of a SPM (Surface Permanent Magnet).

The rotor 20 is produced by manufacturing the rotor core 22 from a magnetic dust core formed into a substantially cylindrical shape, inserting the rotor shaft 21 into the produced rotor core 22, and fixing the magnets 23 onto the rotor core 22.

Figure 2:
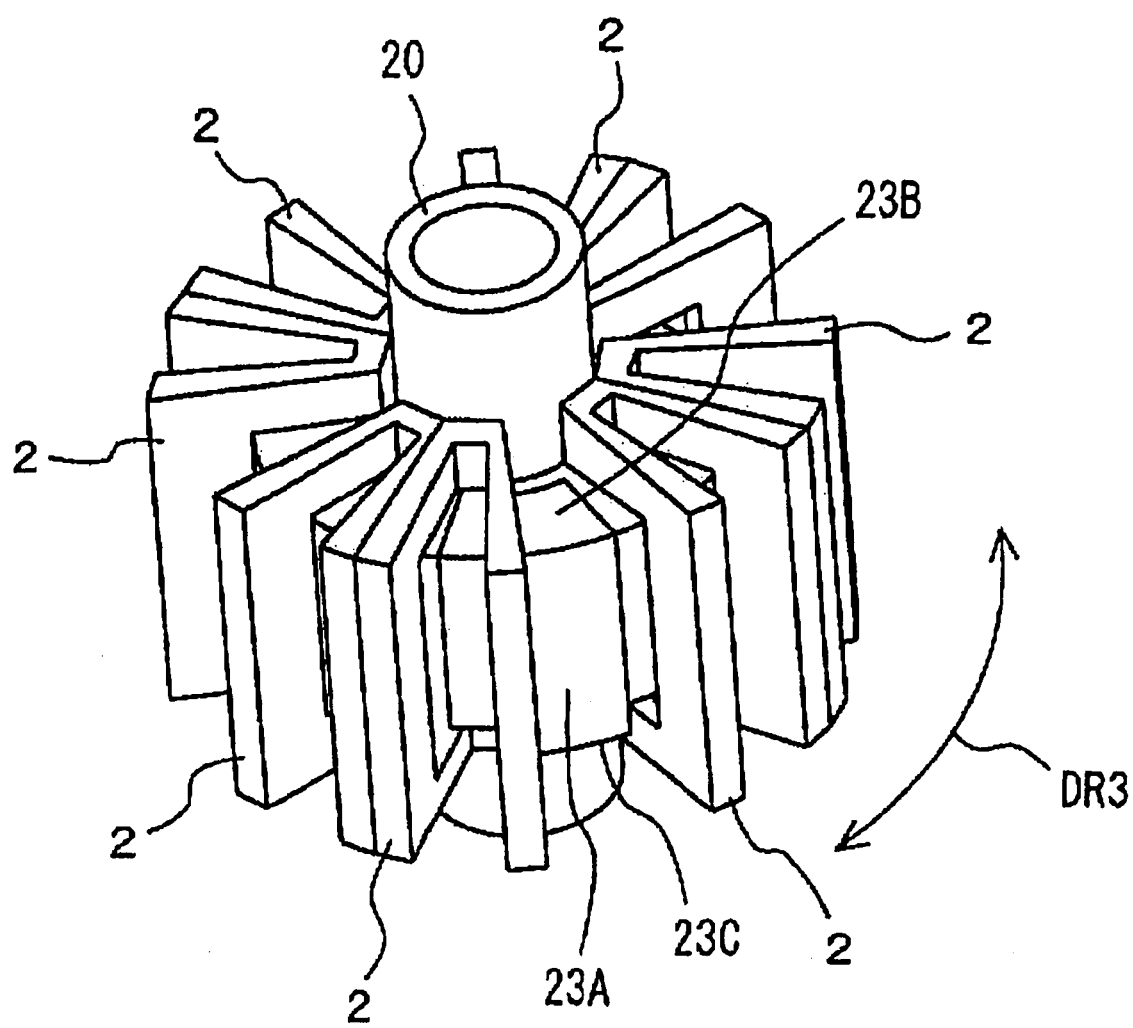
FIG. 2 is a perspective view of coils and the rotor shown in FIG. 1.

FIG. 2 is a perspective view of the coil 2 and the rotor 20 shown in FIG. 1. Referring to FIG. 2, the radial part 23A and the axial parts 23B, 23C of the magnet 23 are rotatable in the circumferential direction DR3 inside the coil 2 having the shape of the substantially cornered letter C.

Figure 3:
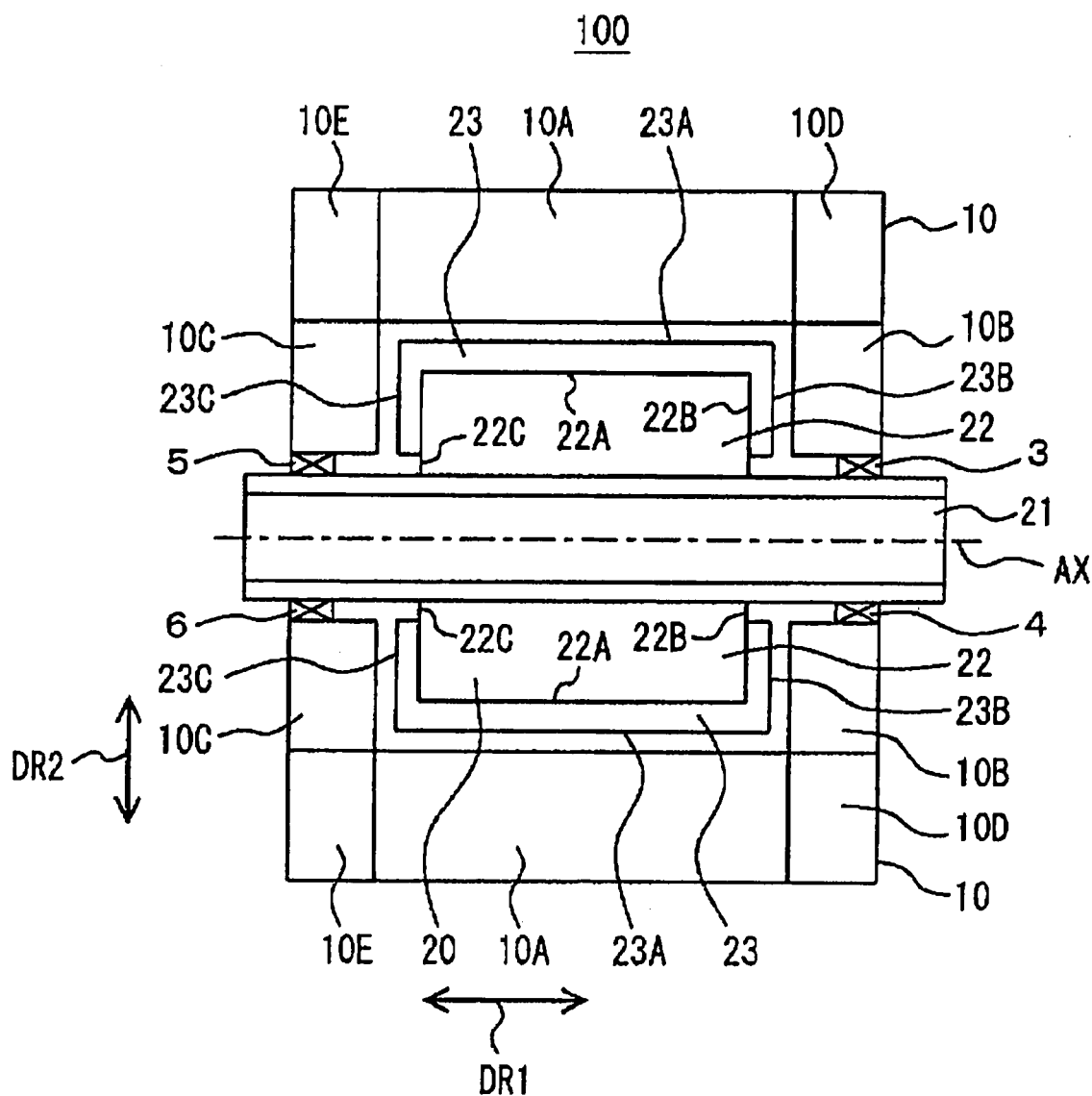
FIG. 3 is a cross-sectional view of the stator and the rotor in the rotary electric machine shown in FIG. 1.

FIG. 3 is a cross-sectional view of the stator 10 and the rotor 20 in the rotary electric machine 100 shown in FIG. 1. Referring to FIG. 3, the magnet 23 is fixed to the rotor core 22 from the radial direction DR2 of the rotor 20 so as to hold the rotor core 22.

Bearings 3~6 are inserted between the stator 10 and the rotor shaft 21 of the rotor 20. Then, the rotor shaft 21 is supported by the bearings 3~6. In this manner, the rotor 20 is rotatably supported by the stator 10.

The stator 10 includes a radial part 10A, axial parts 10B and 10C, and a joint parts 10D and 10E. The radial part 10A is disposed along the rotating shaft direction DR1 of the rotor 20. The axial parts 10B and 10C are disposed along the radial direction DR2 of the rotor 20. Then, the radial part 10A is opposed to the radial part 23A of the magnet 23, while the axial parts 10B and 10C are opposed to the axial parts 23B and 23C of the magnet 23, respectively.

The radial part 10A includes the above-described radial stator magnetic pole section, while the axial parts 10B and 10C include the above-described axial stator magnetic pole sections. Accordingly, when a current is passed through the coil 2, the radial part 10A generates magnetic fields in the radial direction DR2 and exerts the generated magnetic fields on the radial part 23A of the magnet 23. On the other hand, when the current is passed through the coil 2, the axial parts 10B and 10C generate magnetic fields in the rotating axis direction DR1 and exert the generated magnetic fields on the axial parts 23B and 23C of the magnet 23, respectively.

Therefore, because the radial part 23A of the magnet 23 is magnetized in the radial direction DR2, while the axial parts 23B, 23C are magnetized in the rotating axis direction DR1 as described above, the radial part 23A and the axial parts 23B, 23C interact with the magnetic fields from the respective radial part 10A and the axial parts 10B, 10C of the stator 10. As a consequence, the rotor 20 is rotated around a rotating axis AX.

In this case, the rotor 20 rotates about the rotating axis AX due to magnetic interaction both between the radial part 10A of the stator 10 and the radial part of the rotor 20 (=the radial part 23A of the magnet 23) existing in the radial direction DR2, and between the axial parts 10B, 10C of the stator 10 and the axial parts of the rotor 20 (=the axial parts 23B, 23C of the magnet 23) existing in the rotating axis direction DR1. Therefore, it becomes possible for the rotary electric machine 100 to realize an increased torque density greater than that obtained when the rotor 20 rotates due to magnetic interaction only between the radial part 10A of the stator 10 and the radial part of the rotor 20 (=the radial part 23A of the magnet 23) existing in the radial direction DR2. In addition, because torque can be generated at both end parts of the rotor 20 in the rotating axis direction DR1, there is no wasted space, and the efficiency of space utilization can be further improved. Further, because the amount of magnetic flux that leaks along the rotating axis direction DR1 from the cylinder surface 22A or leaks along the radial direction DR2 from the cylinder end faces 22B and 22C is small, torque can be generated with a high degree of efficiency.

It should be noted that, in the magnet 23, the radial part 23A may be contiguous to the axial parts 23B and 23C, or may be separated from the axial parts 23B and 23C by a non-magnetic component or a cavity.

In addition, the rotary electric machine 100 may function as, for example, a motor for driving the drive wheels of a vehicle or a generator for generating electric power from the rotation of the drive wheels.

Embodiment 2

Figure 4:
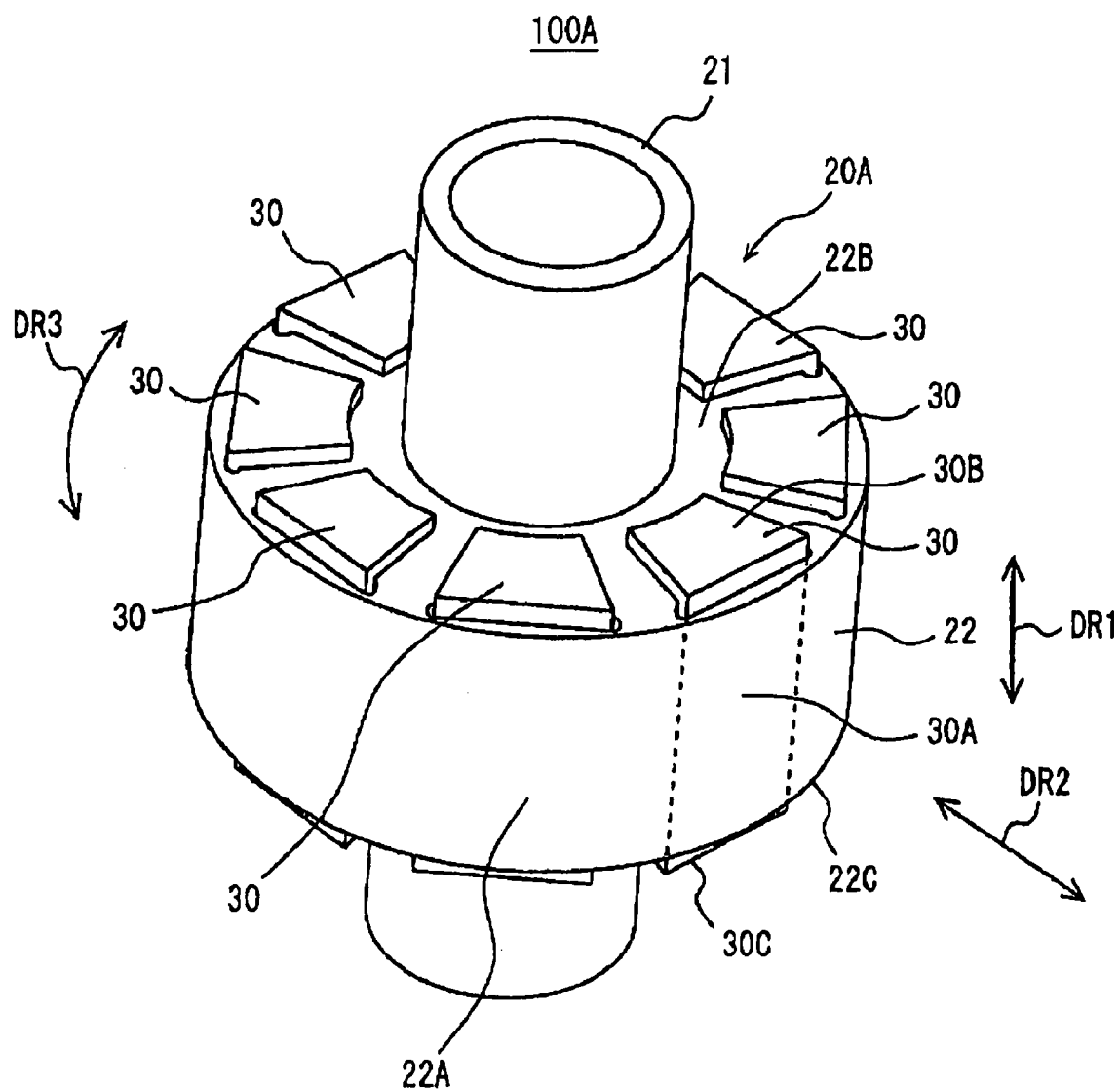
FIG. 4 is a perspective view showing a rotor in a rotary electric machine according to a second embodiment of the present invention.

FIG. 4 is a perspective view showing a rotor in a rotary electric machine according to a second embodiment of the present invention. Referring to FIG. 4, the rotary electric machine 100A according to Embodiment 2 comprises a rotor 20A in place of the rotor 20 in the rotary electric machine 100.

In the rotor 20A, the magnet 23 of the rotor 20 is replaced with a magnet 30, while the remaining components are identical to those of the rotor 20 described above. A plurality of the magnets 30 are disposed at predetermined intervals along the circumferential direction DR3. Then, each of the magnets 30 is inserted in the rotor core 22 from the rotating axis direction DR1, and both end faces of the magnets 30 in the rotating axis direction DR1 are protruded from the rotor core 22.

Each magnet 30 is formed in the shape of a substantially cornered letter C and has a radial part 30A and axial parts 30B and 30C. The radial part 30A is disposed along the rotating axis direction DR1, while the axial parts 30B and 30C are disposed along the radial direction DR2. Because the magnet 30 is inserted in the rotor core 22, the radial part 30A is situated inside the cylinder surface 22A of the rotor core 22, and because the both end faces of the magnet 30 are protruded from the rotor core 22, the axial parts 30B and 30C are situated on the respective cylinder end faces 22B and 22C of the rotor core 22. The radial part 30A is magnetized in the radial direction DR2, while the axial parts 30B and 30C are magnetized in the rotating axis direction DR1. Therefore, the radial part 30A is composed of an IPM (Interior Permanent Magnet), while the axial parts 30B and 30C are composed of the SPM.

As a result, the rotary electric machine 100A becomes capable of using a reluctance torque caused by the magnetic flux generated along the radial direction DR2 on the cylinder surface 22A.

The rotor 20A is produced by manufacturing the rotor core 22 from a magnetic dust core formed into a substantially cylindrical shape, inserting the rotor shaft 21 into the produced rotor core 22, and disposing the magnets 30 on the rotor core 22.

Here, the radial part 30A constitutes the radial rotor magnetic pole section, and the axial parts 30B and 30C constitute the axial rotor magnetic pole sections.

Except as described, the structure is identical to that of Embodiment 1.

Embodiment 3

Figure 5:
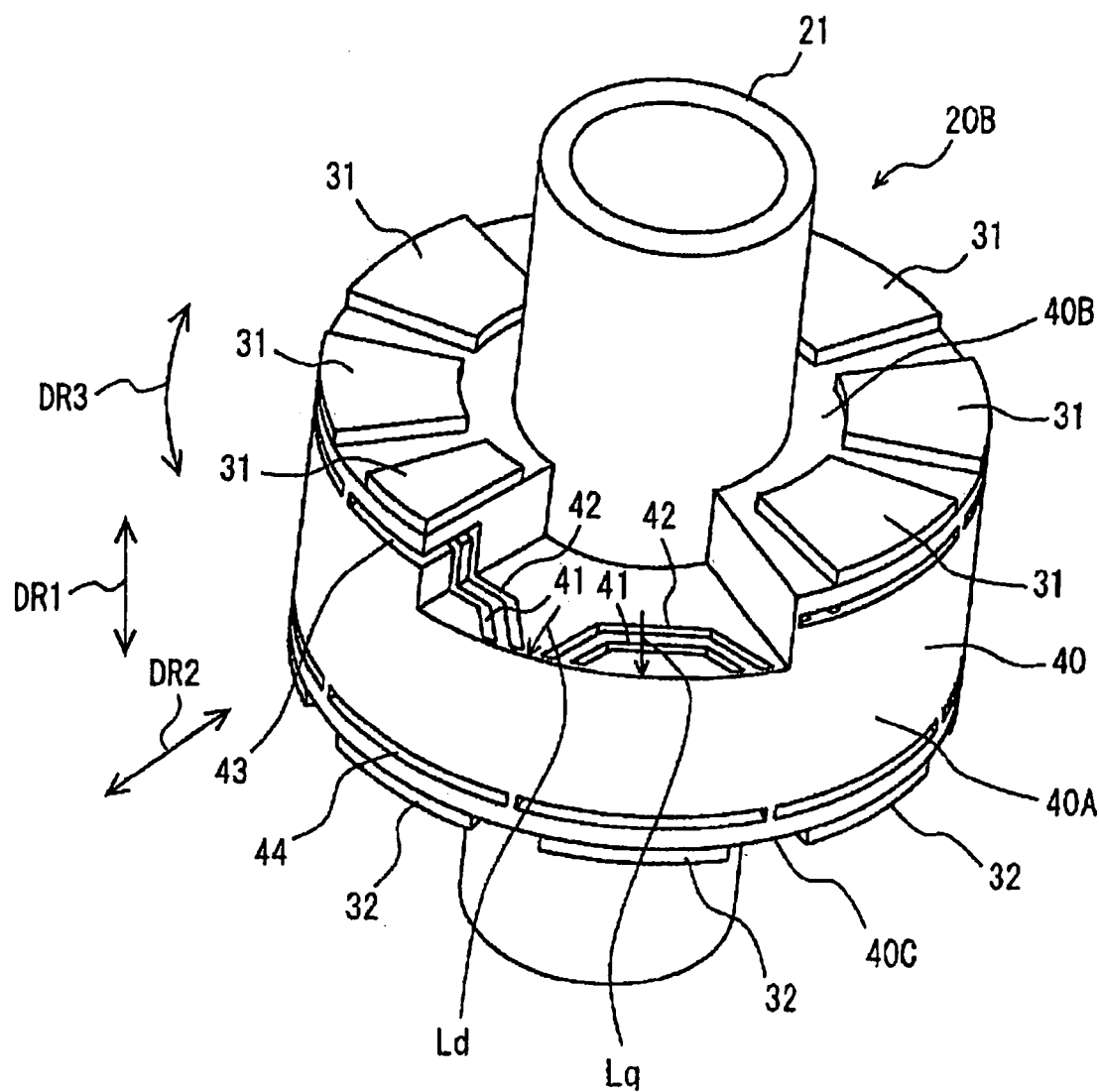
FIG. 5 is a perspective view showing a rotor in a rotary electric machine according to a third embodiment of the present invention.

FIG. 5 is a perspective view showing a rotor in a rotary electric machine according to a third embodiment of the present invention. Referring to FIG. 5, the rotary electric machine 100B according to Embodiment 3 comprises a rotor 20B in place of the rotor 20 in the rotary electric machine 100.

The rotor 20B includes the rotor shaft 21, magnets 31 and 32, and a rotor core 40. The rotor core 40 is fixed to the rotor shaft 21. A plurality of magnets 31 and 32 are disposed at predetermined intervals along the circumferential direction DR3, wherein each of the magnets 31 is disposed on a cylinder end face 40B of the rotor core 40 in the rotating axis direction DR1, while each of the magnets 32 is disposed on a cylinder end face 40C of the rotor core 40 in the rotating axis direction DR1. Further, the magnets 31 and 32 are magnetized in the rotating axis direction DR1.

The rotor core 40 having a substantially cylindrical shape is composed of a plurality of magnetic steel sheets which are laminated along the rotating axis direction DR1. In addition, the rotor core 40 has cavities 41~44. There are a plurality of cavities 41~44 disposed at predetermined intervals along the circumferential direction DR3. Further, the cavities 41~44 are formed in the rotor core 40 so as to be sandwiched between the magnets 31 and 32. More specifically, each of the cavities 41~44 is formed, corresponding to a pair of the magnets 31 and 32 disposed on the cylinder end faces 40B and 40C, in a region between the pair of the magnets 31 and 32 inside the rotor core 40.

The cavities 41 and 42 are disposed along the rotating axis direction DR1 between the cavity 43 and the cavity 44 on an inner circumference side of the cylinder surface 40A of the rotor core 40. Further, the cavities 41 and 42 having the shape of a substantially cornered letter C opening towards the cylinder surface 40A (an outer circumferential surface of the rotor core 40) are placed in the vicinity of the cylinder surface 40A.

The cavities 43 and 44 are formed substantially in parallel to the respective cylinder end faces 40B and 40C from the cylinder surface 40A toward the inner radius side and connected to the cavities 41 and 42 formed along the rotating axis direction DR1. Then, the cavity 43 is formed at a predetermined distance away from the cylinder end face 40B along a direction toward the cylinder end face 40C, while the cavity 44 is formed at a predetermined distance away from the cylinder end face 40C along a direction toward the cylinder end face 40B. Consequently, the cavities 41 and 42 are situated between the cavity 43 and the cavity 44 in the rotating axis direction DR1 without reaching the cylinder end faces 40B and 40C. In other words, there is a region having no cavities 41 to 44 formed therein under the magnet 31, and a region having none of the cavities 41 to 44 formed therein also exists above the magnet 32. The presence of the region having none of the cavities 41 to 44 formed therein both under the magnet 31 and above the magnet 32 as described above is designed to secure the magnetic paths of the magnets 31 and 32.

The cavities 41 and 42 are provided so that the properties of a salient pole will propagate in the radial direction DR2. More specifically, if the inductance resulting from passage of magnetic flux crossing the cavities 41 and 42 along the radial direction DR2 is defined as Lq (=a q-axis direction inductance), and the inductance resulting from passage of magnetic flux passing through the region having none of the cavities 41 or 42 formed in the circumferential direction DR3 (i.e. a region between the cavities 41, 42 and the cavities 41, 42 having the shape of a substantially cornered letter C) is defined as Ld (=a d-axis direction inductance), the cavities 41 and 42 ensure that the magnetic property will satisfy the relationship Ld>Lq.

Because the cavities 41 and 42 suppress a shorting of magnetic flux in the radial direction DR2 while the region in which cavities 41 and 42 are not formed therein allows the magnetic flux to pass along the radial direction DR2, the magnetic property satisfies the relationship Ld>Lq.

On the other hand, the cavities 43 and 44 are provided to prevent magnetic flux from leaking in the radial direction DR2.

In the rotor 20B, because the magnetic property of a salient pole can be obtained in the radial direction DR2 as described above, the plurality of cavities 41~44 disposed at predetermined intervals along the circumferential direction DR3 performs the same function that performed by a magnet magnetized in the radial direction DR2. Then, a magnetic pole section that realizes the property of a salient pole without using any magnets is referred to as a "SynR (Synchronous Reluctance)".

Accordingly, in the rotor 20B, the radial part (the rotor core 40 and the cavities 41~44) is composed of the SynR, while the axial parts (the magnets 31 and 32) are composed of the SPM.

As a result, because no magnets that generate magnetic flux in the radial direction DR2 exist on the cylinder surface 40A, cost reduction can be realized in the rotary electric machine 100B.

It should be noted that a d axis of the magnetic pole section composed of the SynR is situated in a direction of a magnetization easy axis (i.e. a direction located between the cavity 41, 42 and the cavity 41, 41 shown in FIG. 5), while a q axis of the magnetic pole section composed of the SynR is situated in a direction shifted by 90 degrees relative to the d axis (the remainder are the same).

The rotor 20B is produced by manufacturing the rotor core 40 from a magnetic dust core formed into a substantially cylindrical shape, inserting the rotor shaft 21 into the produced rotor core 40, and disposing the magnets 31 and 32 on the respective cylinder end faces 40B and 40C of the rotor core 40. In this example, the rotor core 40 is divided into a section located between the cavity 43 and the cavity 44, a section located on an upper side of the cavity 43, and a section located on a lower side of the cavity 44, and produced by independently forming each of the sections and bonding the formed three sections.

Here, the rotor core 40 and the cavities 41~44 constitute the radial rotor magnetic pole section, and the magnets 31 and 32 constitute the axial rotor magnetic pole section.

Although it has been described that the rotor core 40 includes the two types of cavities 41 and 42, the present invention is not limited to this configuration. The rotor core 40 may include just one type of cavity formed in the rotating axis direction DR1 (the remainder are the same), or may include more than two types of cavities. The magnetic property of a salient pole (Ld>Lq) can be realized as long as the rotor core 40 includes at least one type of cavity.

Further, the plurality of magnetic steel sheets for forming the rotor core 40 with the cavities 41 and 42 constitute a "ferromagnetic body" having the magnetic property of a salient pole in the radial direction DR2.

Figure 6:
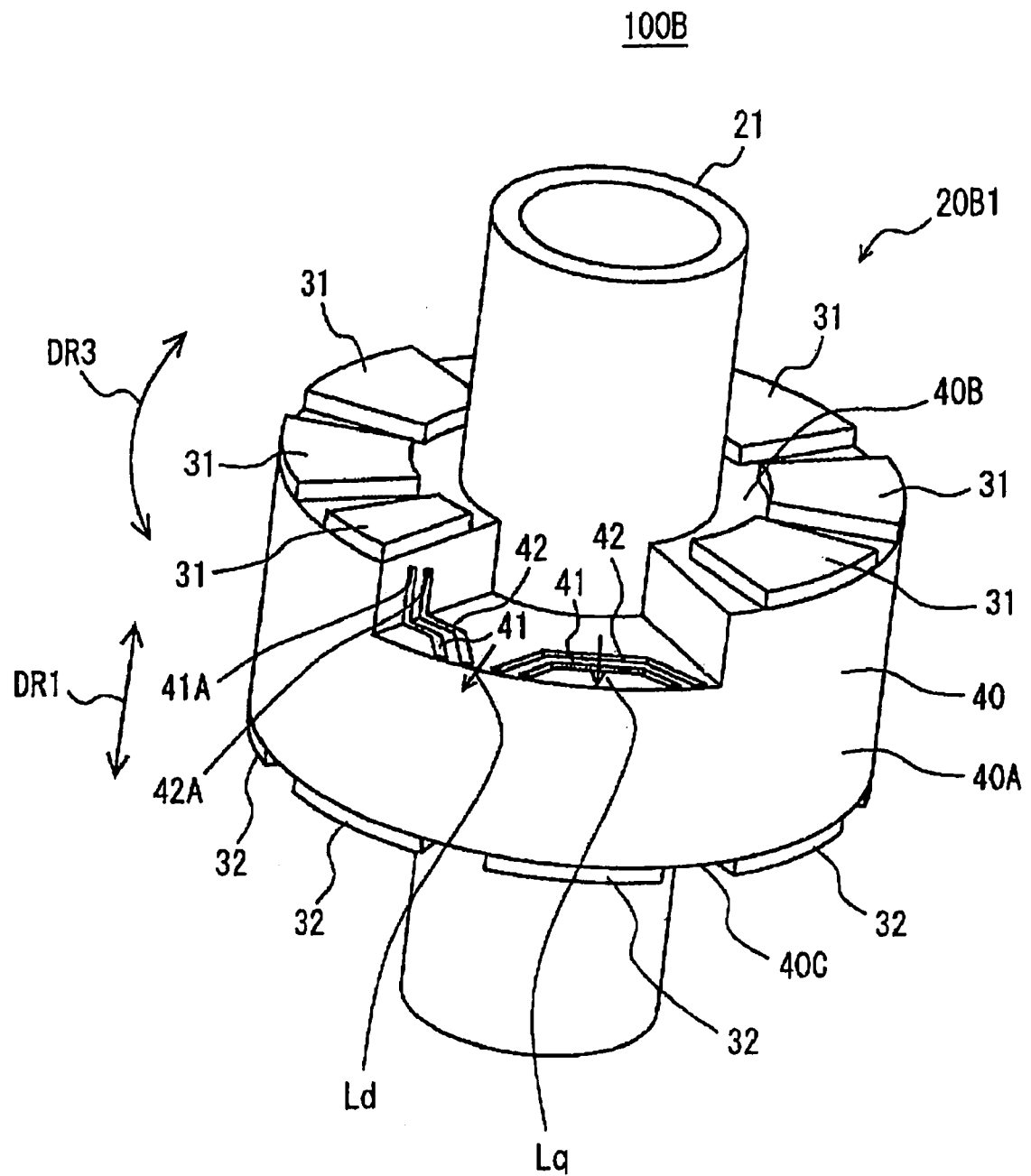
FIG. 6 is another perspective view of the rotor according to the third embodiment.

FIG. 6 is another perspective view of the rotor according to Embodiment 3. Referring to FIG. 6, the rotary electric machine 100B according to Embodiment 3 may comprise a rotor 20B1 in place of the rotor 20B shown in FIG. 5.

The rotor 20B1 is configured by removing the cavities 43 and 44 from the rotor core 40, and the remaining configuration is identical to that of the rotor 20B. In this case, a distance between an end 41A, 42A of the cavity 41, 42 and the cylinder end face 40B is established in such a manner that the end 41A, 42A of the cavity 41, 42 are saturated with magnetic flux of the magnet 31, 32. Hence, magnetic flux leakage in the radial direction DR2 can be prevented through the saturated magnetic flux of the magnets 31 and 32. In addition, because there is no need to provide the cavities 43 and 44 for preventing the magnetic flux leakage in the radial direction DR2, the overall length of a motor can be reduced more than that of a motor in which the rotor 20B shown in FIG. 5 is installed.

Such a rotor 20B1 has a radial part composed of the SynR and axial parts composed of the SPM, and functions just as in the case of the rotor 20B.

The rotor 20B1 may be produced using a manufacturing method used to produce the rotor 20B.

Except as described above, the structure of this embodiment is identical to that of Embodiment 1.

Embodiment 4

Figure 7:
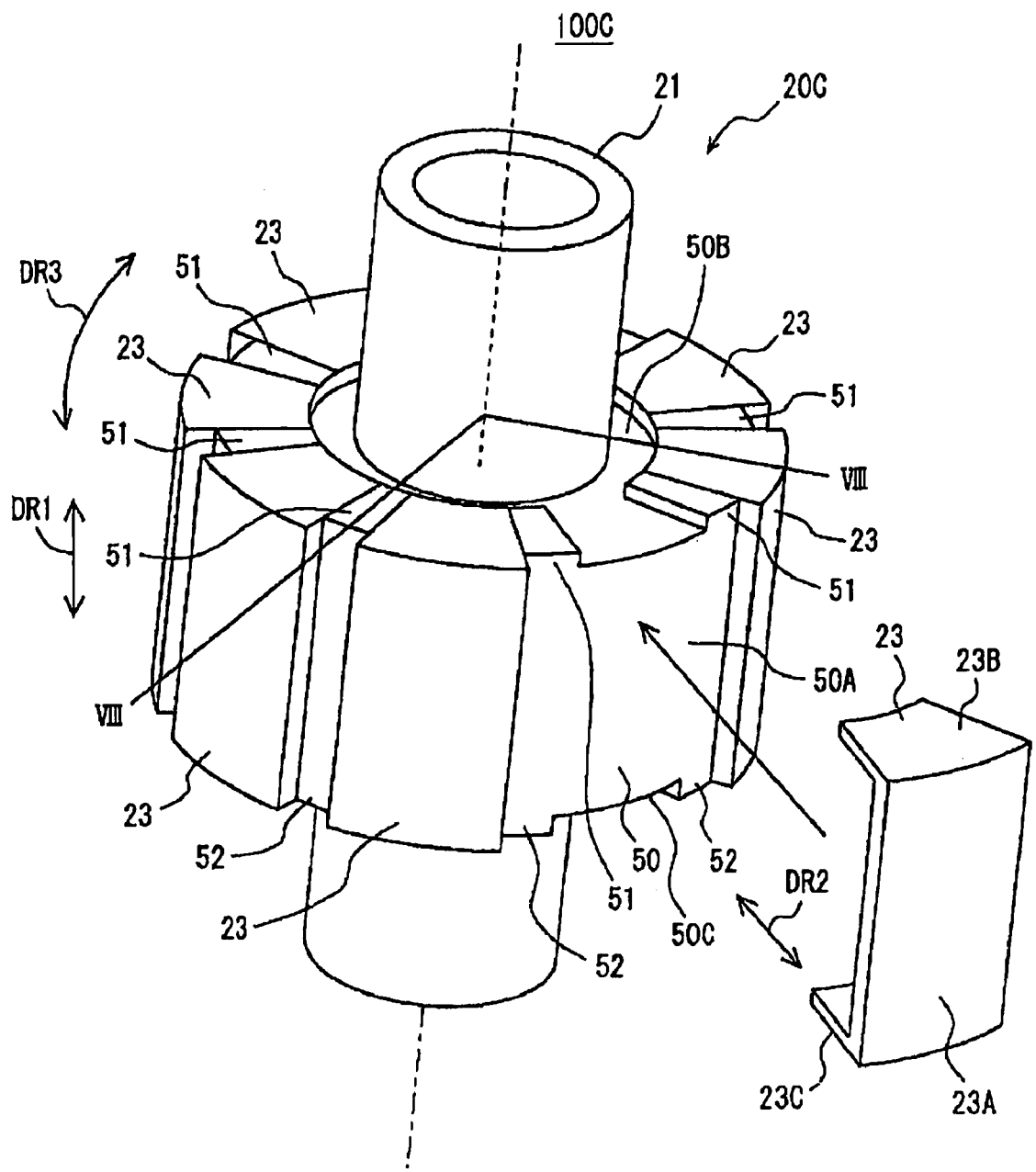
FIG. 7 is a perspective view showing a rotor in a rotary electric machine according to a fourth embodiment of the present invention.

FIG. 7 is a perspective view showing a rotor in a rotary electric machine according to a fourth embodiment of the present invention. Referring to FIG. 7, the rotary electric machine 100C according to Embodiment 4 comprises a rotor 20C in place of the rotor 20 in the rotary electric machine 100.

The rotor 20C includes the rotor shaft 21, the magnets 23, and a rotor core 50. The rotor core 50 has protrusions 51 and 52. The protrusions 51 and 52 are formed along the circumferential direction DR3 at predetermined intervals on cylinder end faces 50B and 50C, respectively, in the rotating axis direction DR1 so as to be equal in number to the number of the magnets 23. In this example, the protrusions 51 and the protrusions 52 are formed on the same locations in the circumferential direction DR3.

The protrusions 51 and 52 are not entirely formed across an overall region of the rotor core 50 in the radial direction DR2, but formed in such a manner that inner circumferential ends of the protrusions 51 and 52 are aligned with inner circumferential ends of the axial parts 23B and 23C of the magnets 23.

The magnet 23 is attached from the radial direction DR2 to the rotor core 50 after the axial part 23B is inserted between the adjacent two protrusions 51 and 51 while the axial part 23C is inserted between the adjacent two protrusions 52 and 52. Accordingly, the axial part 23B is fitted between the adjacent two protrusions 51 and 51, while the axial part 23C is fitted between the adjacent two protrusions 52 and 52.

Figure 8:
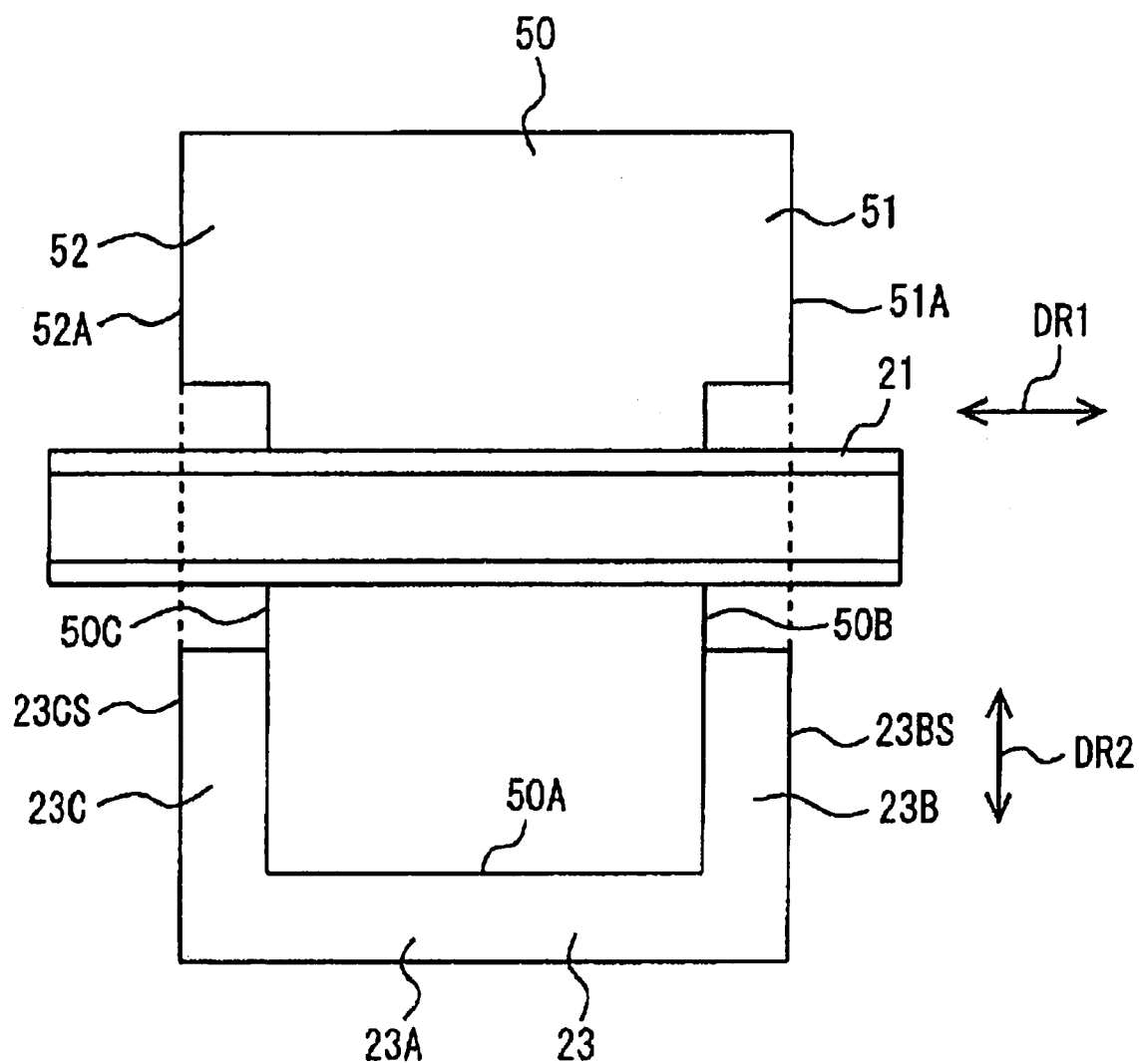
FIG. 8 is a cross-sectional view taken along a line VIII-VIII indicated in FIG. 7.

FIG. 8 is a cross-sectional view taken along a line VIII-VIII indicated in FIG. 7. Referring to FIG. 8, the rotor core 50 has the protrusions 51 and 52 respectively formed on both sides of the rotor core 50 in the rotating axis direction DR1. The substantially cornered-C-shaped magnet 23 is fixed to the rotor core 50 from the radial direction DR2 so as to hold the rotor core 50 therein.

Further, the radial part 23A of the magnet 23 has an inner circumferential surface that contacts a cylinder surface 50A of the rotor core 50. In other words, an outer circumferential surface of the radial part 23A extends outward from the cylinder surface 50A of the rotor core 50 in the radial direction DR2.

In addition, an upper surface 51A of the protrusion 51 is aligned with an upper surface 23BS of the axial part 23B, while an upper surface 52A of the protrusion 52 is aligned with an upper surface 23CS of the axial part 23C. In other words, the upper surfaces 23BS and 23CS of the axial parts 23B and 23C do not extend out from the respective upper surfaces 51A and 52A of the protrusions 51 and 52 in the rotating axis direction DR1. As such, because the upper surfaces 23BS and 23CS of the axial parts 23B and 23C are respectively aligned with the upper surfaces 51A and 52A of the protrusions 51 and 52, the axial parts 23B and 23C are defined in position embedded in the rotor core 50.

Thus, the radial part 23A is composed of the SPM, while the axial parts 23B and 23C are composed of the IPM.

As a result, reluctance torque can be utilized on the cylinder surface 50A, to thereby realize a high torque density.

It should be noted that formation of the axial parts 23B and 23C of the magnet 23 respectively disposed between the protrusions 51 and 51 and between the protrusions 52 and 52 while preventing the axial parts 23B and 23C from extending outward from the protrusions 51 and 52 in the rotating axis direction DR1 is equivalent to "provision of a magnet embedded in the rotor core 50".

The rotor 20C is produced by manufacturing the rotor core 50 from a magnetic dust core formed into a substantially cylindrical shape, inserting the rotor shaft 21 into the produced rotor core 50, and disposing the magnets 23 on the rotor core 50.

Here, the radial part 23A constitutes the radial rotor magnetic pole section, while the axial parts 23B and 23C constitute the axial rotor magnetic pole sections.

Except as described above, the structure is identical to that of Embodiment 1.

Embodiment 5

Figure 9:
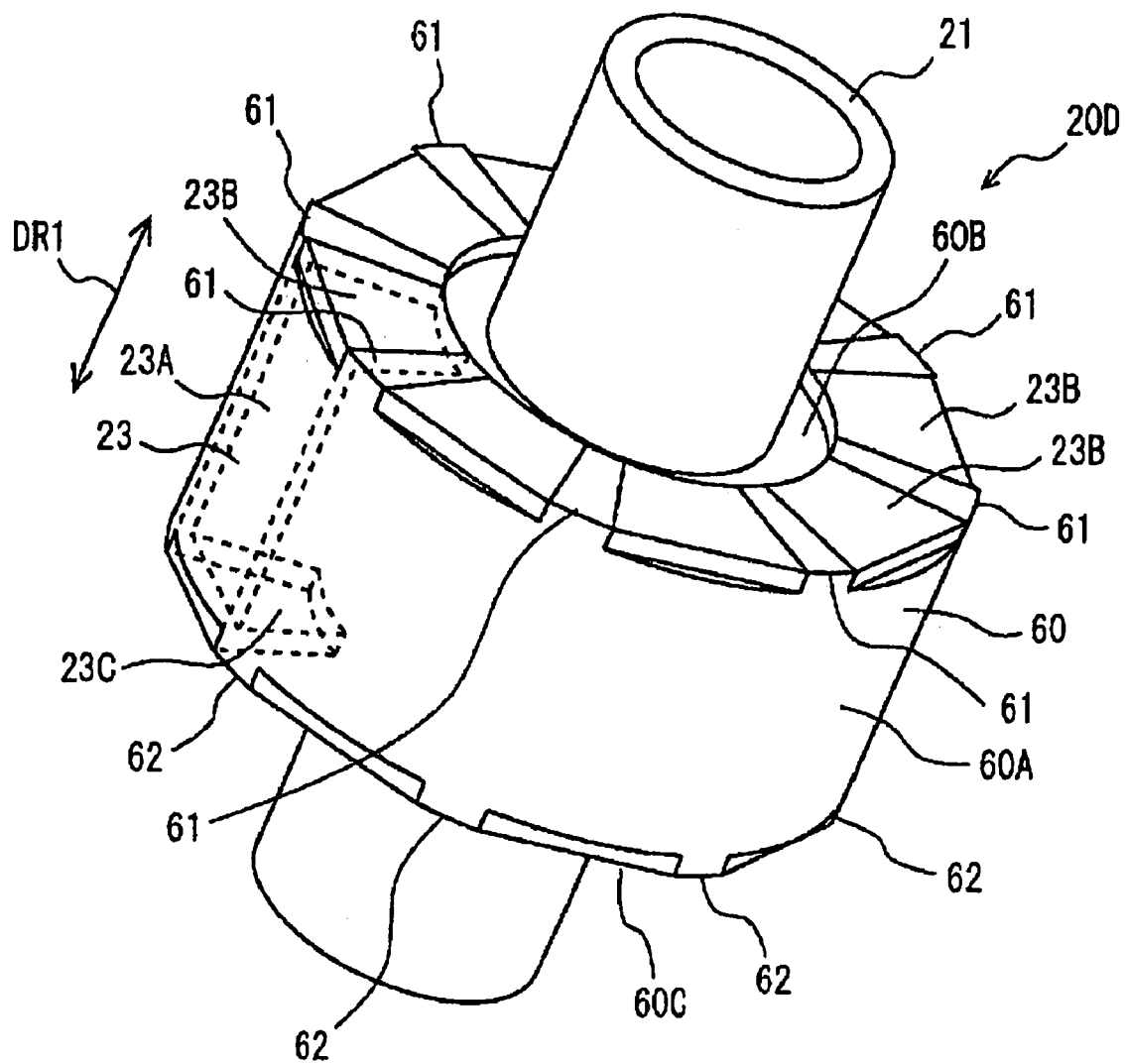
FIG. 9 is a perspective view showing a rotor in a rotary electric machine according to a fifth embodiment of the present invention.

FIG. 9 is a perspective view showing a rotor in a rotary electric machine according to a fifth embodiment of the present invention. Referring to FIG. 9, the rotary electric machine 100D according to Embodiment 5 comprises a rotor 20D in place of the rotor 20 in the rotary electric machine 100.

The rotor 20D includes the rotor shaft 21, the magnets 23, and a rotor core 60. The rotor core 60 has protrusions 61 and 62 which are formed in a way similar to that of the protrusions 51 and 52 of the rotor core 50.

In the rotor 20D, the radial part 23A of the magnet 23 is inserted, from the rotating axis direction DR1, into the rotor core 60 between adjacent two protrusions 61 and 61 and between adjacent two protrusions 62 and 62. Further, the axial part 23B of the magnet 23 is inserted between the adjacent two protrusions 61 and 61, and the axial part 23C is inserted between the adjacent two protrusions 62 and 62. In this manner, the axial part 23B is fitted between the adjacent two protrusions 61 and 61, and the axial part 23C is fitted between the adjacent two protrusions 62 and 62.

Then, an upper surface of the axial part 23B is aligned with the top of the protrusion 61, while an upper surface of the axial part 23C is aligned with the top of the protrusion 62. In other words, the axial parts 23B and 23C do not extend out from the tops of the protrusions 61 and 62 in the rotating axis direction DR1.

Accordingly, the radial part 23A and the axial parts 23B and 23C are composed of the IPM.

As a result, the reluctance torque can be utilized on both a cylinder surface 60A and cylinder end faces 60B and 60C, to thereby realize a high torque density.

It should be noted that formation of the axial parts 23B and 23C of the magnet 23 respectively disposed between the protrusions 61 and 61 and between the protrusions 62 and 62 while preventing the axial parts 23B and 23C from extending out from the protrusions 61 and 62 in the rotating axis direction DR1 is equivalent to the "provision of a magnet embedded in the rotor core 60".

The rotor 20D is produced by manufacturing the rotor core 60 from a magnetic dust core formed into a substantially cylindrical shape, inserting the rotor shaft 21 into the produced rotor core 60, and disposing the magnets 23 on the rotor core 60.

In this configuration, the radial part 23A constitutes the radial rotor magnetic pole section, while the axial parts 23B and 23C constitute the axial rotor magnetic pole sections.

The structure is otherwise identical to that of Embodiment 1.

Embodiment 6

Figure 10:
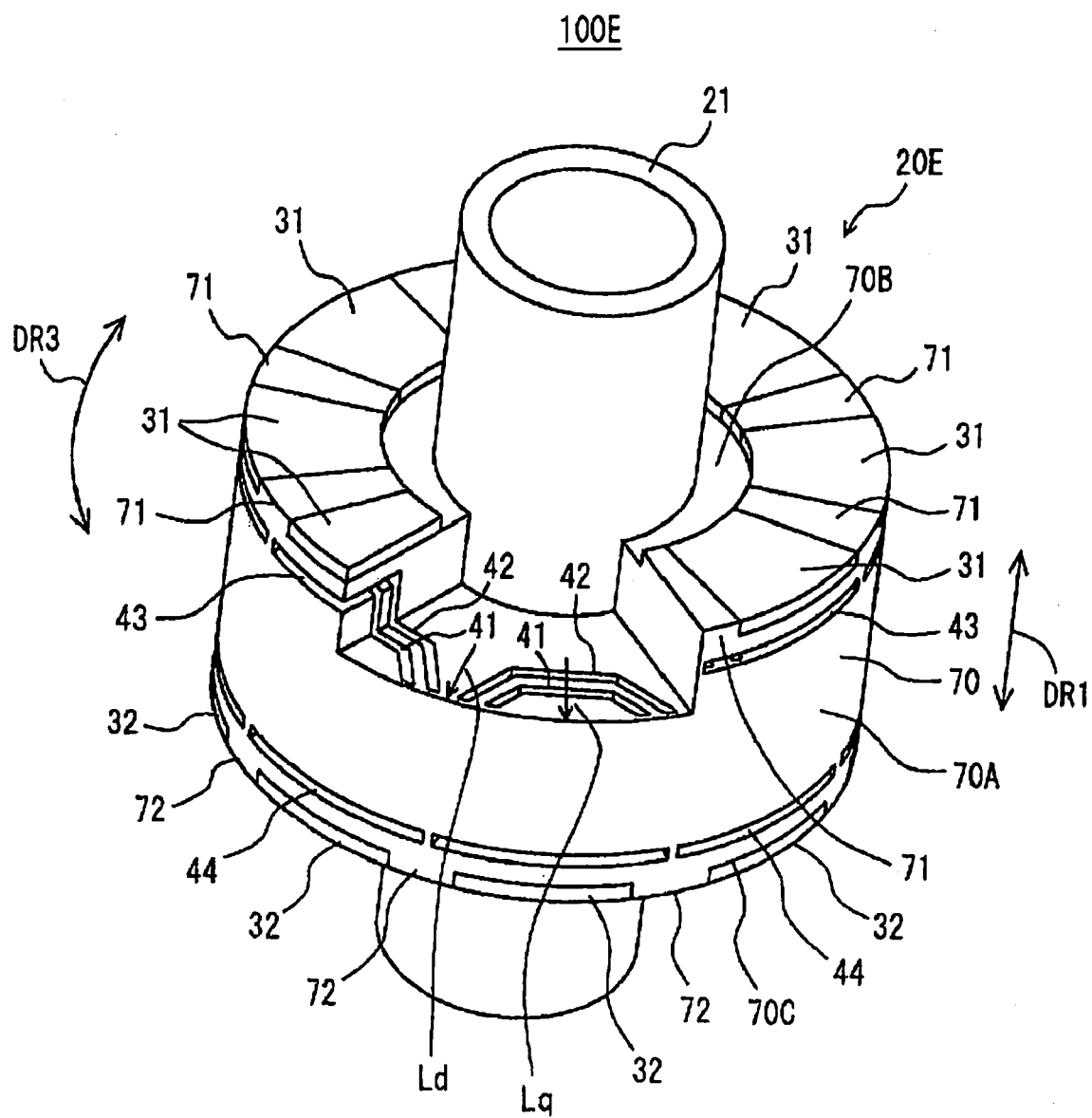
FIG. 10 is a perspective view showing a rotor in a rotary electric machine according to a sixth embodiment of the present invention.

FIG. 10 is a perspective view showing a rotor in a rotary electric machine according to a sixth embodiment of the present invention. Referring to FIG. 10, the rotary electric machine 100E according to Embodiment 6 comprises a rotor 20E in place of the rotor 20 in the rotary electric machine 100.

The rotor 20E is configured by replacing the rotor core 40 of the rotor 20B shown in FIG. 5 with a rotor core 70, while the remaining components of the rotor 20E are identical to those of the rotor 20B. The rotor core 70 is configured by adding protrusions 71 and 72 to the rotor core 40, and the remaining components of the rotor core 70 are identical to those of the rotor core 40.

The protrusions 71 and 72 may be formed in a manner similar to that used for forming the protrusions 51 and 52 of the rotor core 50 in Embodiment 4. In such a case, the protrusions 71 and 72 are formed on locations corresponding to regions where the cavities 41 and 42 are not formed in the circumferential direction DR3 (i.e. locations of areas between the cavities 41, 42 and the adjacent cavities 41, 42 having the shape of a substantially cornered letter C).

In the rotor 20E, the magnet 31 is disposed on a cylinder end face 70B between the adjacent two protrusions 71 and 71. Further, the magnet 32 is disposed on a cylinder end face 70C between the adjacent two protrusions 72 and 72. Then, an upper surface of the magnet 31 is aligned with the top of the protrusion 71, while an upper surface of the magnet 32 is aligned with the top of the protrusion 72. In other words, the magnet 31 does not extend out from the protrusion 71 of the rotor core 70 in the rotating axis direction DR1, while the magnet 32 does not extend out from the protrusion 72 of the rotor core 70 in the rotating axis direction DR1. The remaining structure is identical to that of the rotor core 40 shown in FIG. 5.

Therefore, in the rotor 20E, the radial part (the rotor core 70 and the cavities 41~44) is composed of the SynR, while the axial parts (the magnets 31 and 32) are composed of the IPM.

Thus, in the rotary electric machine 100E having no magnet to generate magnetic flux in the radial direction DR2 on the cylinder surface 70A, cost reduction can be realized.

It should be noted that formation of the magnets 31 and 32 respectively disposed between the protrusions 71 and 71 and between the protrusions 72 and 72 while preventing the magnets 31 and 32 from extending out from the protrusions 71 and 72 in the rotating axis direction DR1 is equivalent to the "provision of a magnet embedded in the rotor core 70".

The rotor 20E is produced by manufacturing the rotor core 70 from a magnetic dust core formed into a substantially cylindrical shape, inserting the rotor shaft 21 into the produced rotor core 70, and respectively disposing the magnets 31 and 32 on the cylinder end faces 70B and 70C of the rotor core 70. In this case, the rotor core 70 is divided into a section located between the cavity 43 and the cavity 44, a section located on an upper side of the cavity 43, and a section located on a lower side of the cavity 44, and produced by separately forming each of the sections and bonding the formed three sections.

Here, the rotor core 70 and the cavities 41~44 constitute the radial rotor magnetic pole section, and the magnets 31 and 32 constitute the axial rotor magnetic pole sections.

Although it has been described that the rotor core 70 includes two types of the cavities 41 and 42, the present invention is not limited to this configuration. The rotor core 70 may include just one type of cavity formed in the rotating axis direction DR1 (the remainder are the same), or may include more than two types of cavities. The magnetic property of a salient pole (Ld>Lq) can be realized as long as the rotor core 70 includes at least one type of cavity.

Further, the plurality of magnetic steel sheets for forming the rotor core 70 with the cavities 41 and 42 constitutes a "ferromagnetic body" having the magnetic property of a salient pole in the radial direction DR2.

Figure 11:
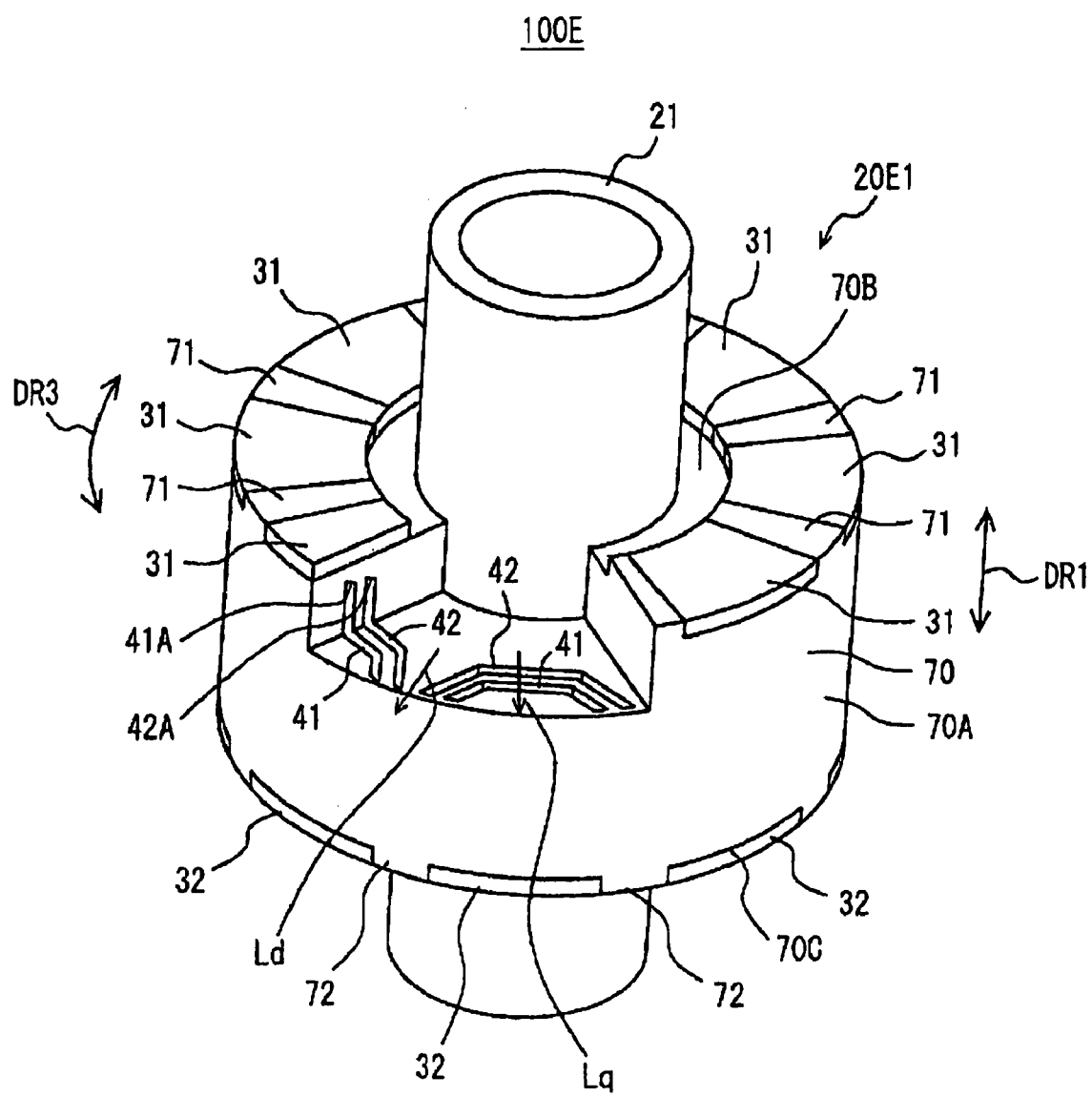
FIG. 11 is another perspective view of the rotor according to the sixth embodiment.

FIG. 11 is another perspective view of the rotor according to Embodiment 6. Referring to FIG. 11, the rotary electric machine 100E according to Embodiment 6 may comprise a rotor 20E1 shown in FIG. 11 in place of the rotor 20E shown in FIG. 10.

The rotor 20E1 is obtained by removing the cavities 43 and 44 from the rotor core 70, and the remaining components of the rotor 20E1 are identical to those of the rotor 20E. When this is done, the distance between the end 41A, 42B of the cavity 41, 42 and the cylinder end face 70B is established in such a manner that the ends 41A and 42A of the cavities 41 and 42 in the rotating axis direction DR1 are saturated with the magnetic flux of the magnets 31 and 32. In this way, magnetic flux leakage in the radial direction DR2 can be prevented by means of the saturated magnetic flux of the magnets 31 and 32. In addition, because there is no necessity to provide the cavities 43 and 44 for preventing the magnetic flux leakage in the radial direction DR2, a greater torque can be obtained from the radial part composed of the SynR.

As a result, the rotor 20E1 has the radial part composed of the SynR and the axial parts composed of the IPM and functions just as in the case of the rotor 20E.

The rotor 20B1 may be produced using the same manufacturing method as that used to produce the rotor 20E.

Except as described above, the structure is identical to that in Embodiment 1.

Embodiment 7

Figure 12:
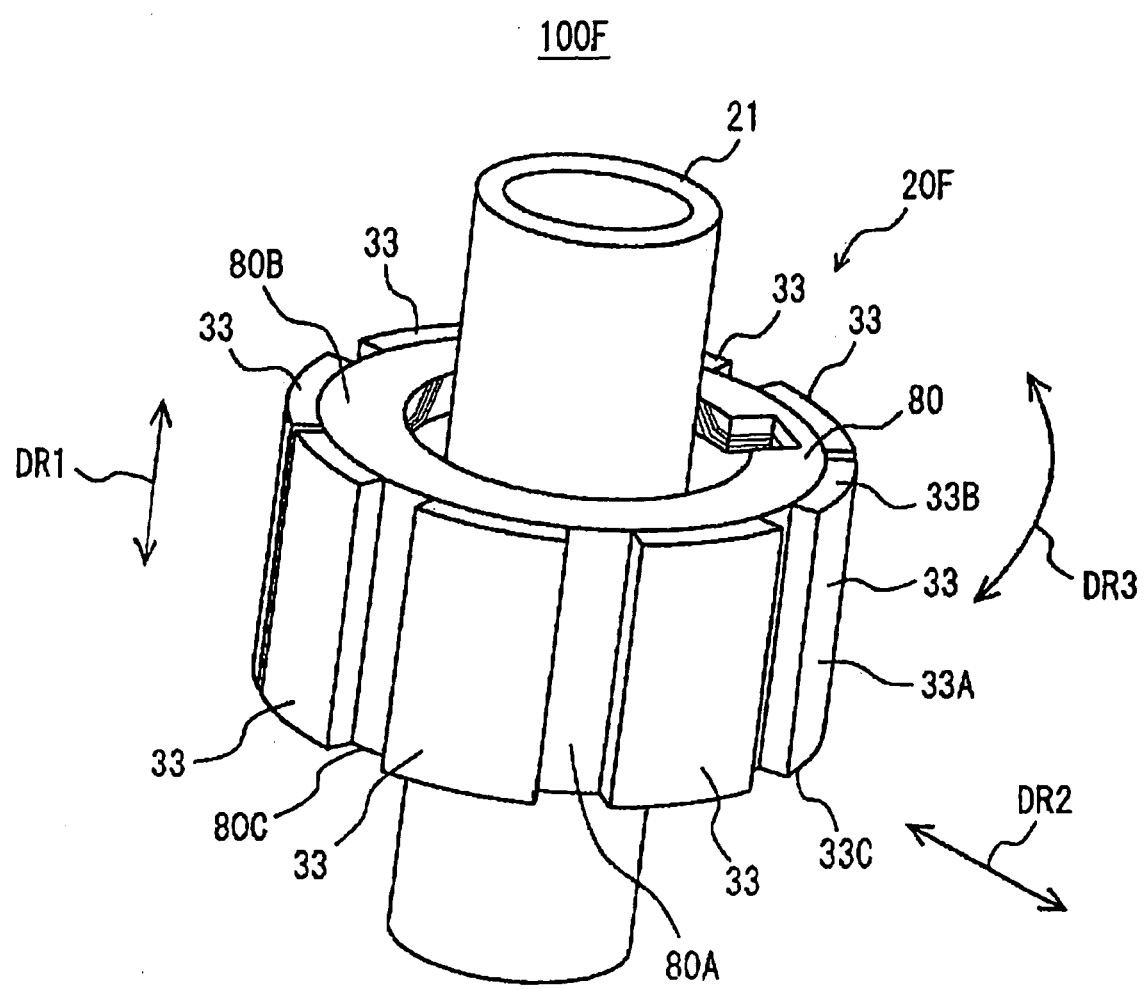
FIG. 12 is a perspective view showing a rotor in a rotary electric machine according to a seventh embodiment of the present invention.
Figure 13:
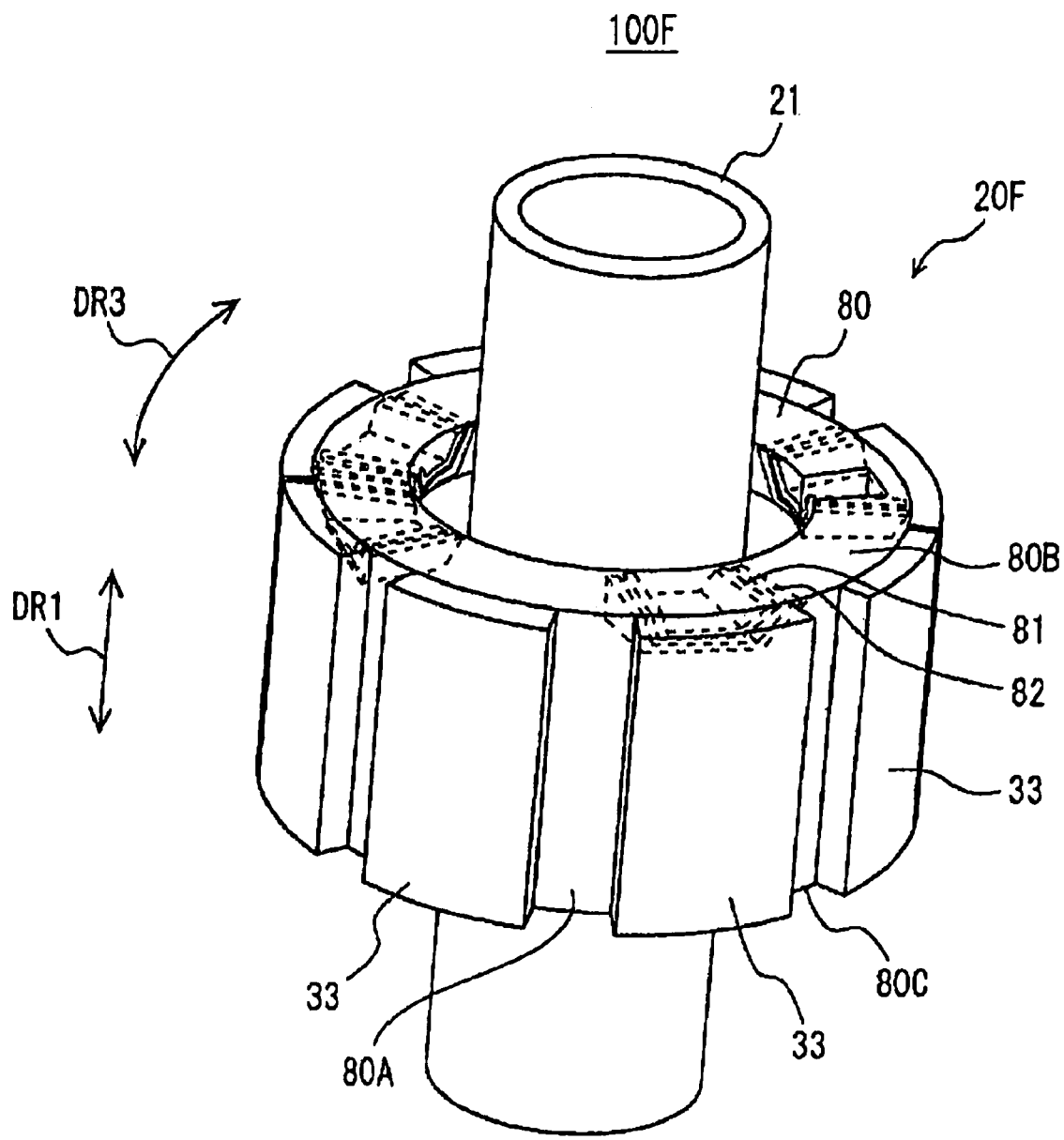
FIG. 13 is a perspective view showing the rotor in the rotary electric machine according to the seventh embodiment.

FIGS. 12 and 13 are perspective views showing a rotor in a rotary electric machine according to a seventh embodiment of the present invention. Referring to FIGS. 12 and 13, the rotary electric machine 100F according to Embodiment 7 comprises a rotor 20F in place of the rotor 20 in the rotary electric machine 100.

The rotor 20F includes the rotor shaft 21, the magnets 33, and a rotor core 80. The rotor core 80 is fixed to the rotor shaft 21. A plurality of the magnets 33, 33, 33, . . . are disposed at predetermined intervals along the circumferential direction DR3 on a cylinder surface 80A of the rotor core 80. In this case, an outer circumferential surface 33A of each of the magnets 33 is protruded from the cylinder surface 80A in the radial direction DR2. In addition, end faces 33B and 33C of each of the magnets 33 in the rotating axis direction DR1 are respectively aligned with cylinder end faces 80B and 80C of the rotor core 80.

The rotor core 80 has slits 81 and 82 formed at predetermined intervals along the circumferential direction DR3. The slits 81 and 82 are formed inside the rotor core 80 on locations matching placement locations of the magnets 33 in the circumferential direction DR3 (Refer to FIG. 13).

Figure 14:
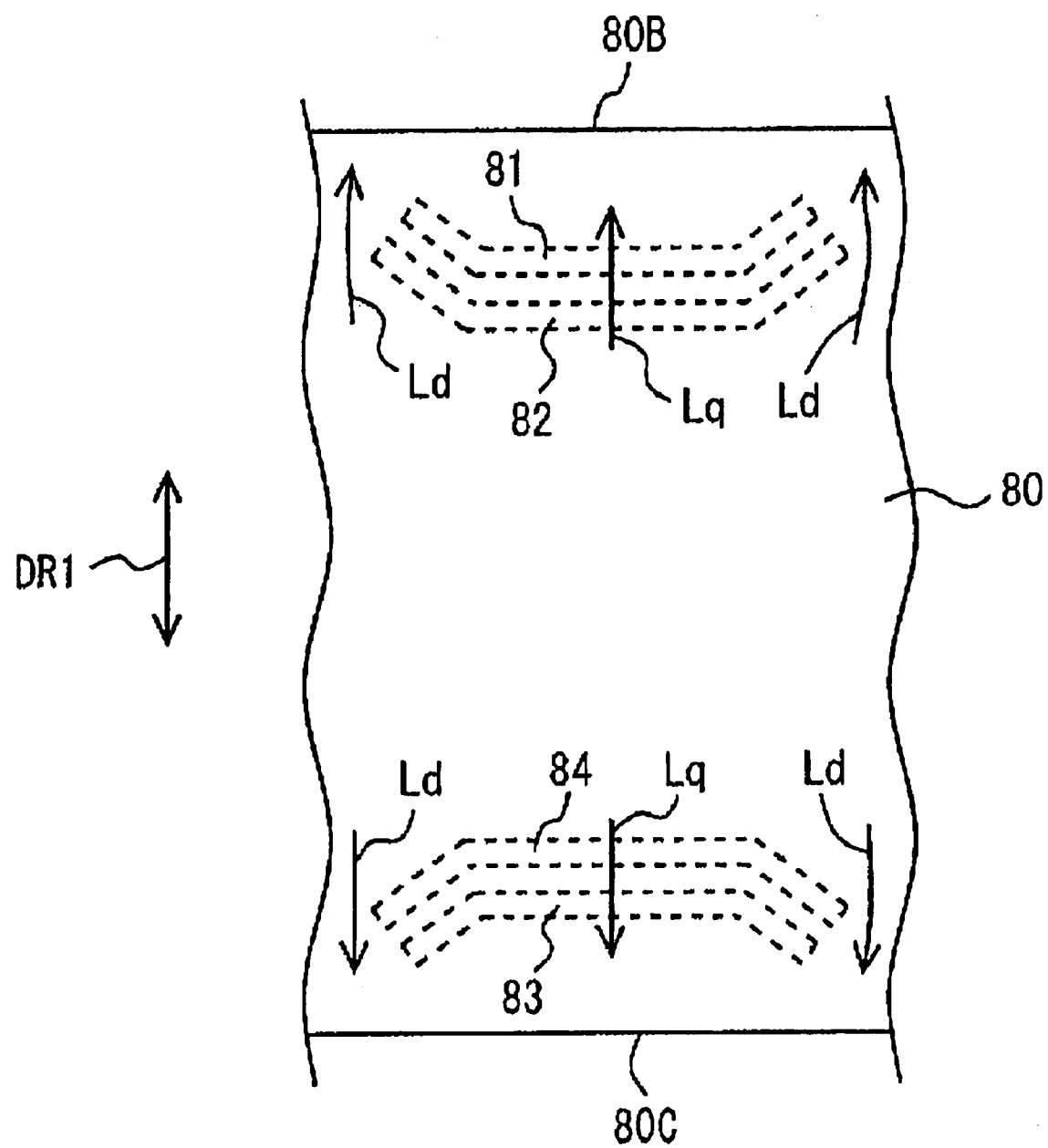
FIG. 14 is a plan view of a rotor core shown in FIGS. 12 and 13 when viewed from a cylinder surface side of the rotor core.

FIG. 14 is a plan view of the rotor core 80 viewed from a cylinder surface 80A side of the rotor core 80 shown in FIGS. 12 and 13. Referring to FIG. 14, the rotor core 80 includes the slits 81~84. The slits 81 and 82 are formed on a cylinder end face 80B side, and the slits 83 and 84 are formed on a cylinder end face 80C side.

The slits 81 and 82 are formed in the shape of a substantially cornered letter C opening towards the cylinder end face 80B. On the other hand, the slits 83 and 84 are formed in the shape of a substantially cornered letter C opening towards the cylinder end face 80C. Then, the slit 81 is formed nearer to the cylinder end face 80B than the slit 82. The slit 83 is formed nearer to the cylinder end face 80C than the slit 84.

The slits 81, 82 and the slits 83, 84 are designed to realize the property of a salient pole (Ld>Lq) in the rotating axis direction DR1. With this configuration, the rotor core 80 performs, together with the slits 81, 82 or the slits 83, 84, the function the same as that performed by a magnet magnetized in the rotating axis direction DR1.

Therefore, in the rotor 20F, the radial part (=the magnets 33) is composed of the SPM, while the axial part (=the rotor core 80 with the slits 81, 82 or the rotor core 80 with the slits 83, 84) is composed of the SynR.

Consequently, a magnet torque on the cylinder surface 80A can be used to rotate the rotor 20F. In addition, because no magnets are needed on the cylinder end faces 80B and 80C to generate magnetic flux in the rotating axis direction DR1, the cost of manufacturing the rotor 20F can be reduced.

The rotor 20F is produced by manufacturing the rotor core 80 from a magnetic dust core formed into a substantially cylindrical shape, inserting the rotor shaft 21 into the produced rotor core 80, and disposing the magnets 33 on the cylinder surface 80A of the rotor core 80. In this embodiment, the rotor core 80 is divided into a section including none of the slits 81~84, a section including the slits 81 and 82, and a section including the slits 83 and 84, and produced by separately forming each of the sections and bonding the formed three sections. The section including the slits 81 and 82 is divided into a plurality of segments separated at the center of the slits 81 and 82 in the circumferential direction DR3, and produced by separately forming each of the plurality of segments so as to create the slits 81 and 82 and bonding the plurality of formed segments along the circumferential direction DR3. The section including the slits 83 and 84 is produced according to the same method for producing the segment including the slits 81 and 82.

It should be noted that the magnets 33 constitute the radial rotor magnetic pole section, while the rotor core 80 and the slits 81~84 constitute the axial rotor magnetic pole section.

Although an example was described in which the rotor core 80 has two types of the slits 81 and 82 and two types of the slits 83 and 84 on both respective edge regions in the rotating axis direction DR1, the present invention is not limited to this configuration. The rotor core 80 may includes just one slit or two or more slits on each of the edge regions in the rotating axis direction DR1 (the remainder are the same). The rotor core 80 has the magnetic property of a salient pole (Ld>Lq) in the rotating axis direction DR1 as long as the rotor core 80 includes at least one type of slits on each of the both edge regions in the rotating axis direction DR1.

Embodiment 8

Figure 15:
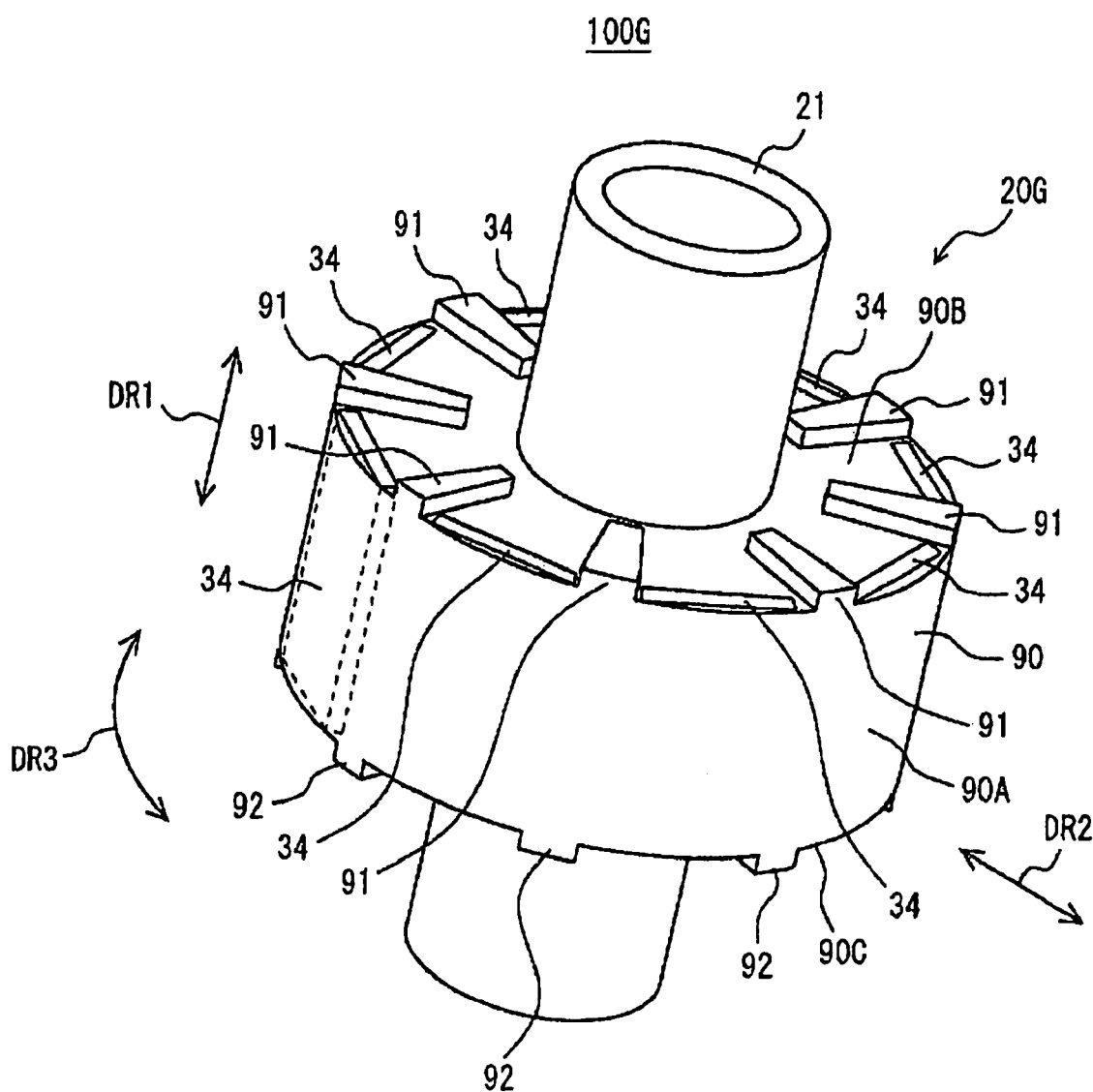
FIG. 15 is a perspective view showing a rotor in a rotary electric machine according to an eighth embodiment of the present invention.

FIG. 15 is a perspective view showing a rotor in a rotary electric machine according to an eighth embodiment of the present invention. Referring to FIG. 15, the rotary electric machine 100G according to Embodiment 8 comprises a rotor 20G in place of the rotor 20 in the rotary electric machine 100.

The rotor 20G includes the rotor shaft 21, the magnets 34, and a rotor core 90. The rotor core 90 has protrusions 91 and 92. The protrusions 91 and 92 are formed in a way similar to that for forming the protrusions 51 and 52 of the rotor core 50 in Embodiment 4.

A plurality of magnets 34, 34, . . . are inserted, from the rotating axis direction DR1, into the rotor core 90 at predetermined intervals along the circumferential direction DR3. More specifically, each of the magnets 34 is inserted, from the rotating axis direction DR1, into the rotor core 90 at locations close to a cylinder surface 90A between adjacent two protrusions 91 and 91 and between adjacent two protrusions 92 and 92. Both end faces of the magnets 34 in the rotating axis direction DR1 are aligned with cylinder end faces 90B and 90C of the rotor core 90. Then, each of the magnets 34 is magnetized in the radial direction DR2.

As a result of forming the protrusions 91 and 92 on the respective cylinder end faces 90B and 90C, the rotor core has an indented structure with protrusions and depressions formed in the circumferential direction DR3, and the magnetic property of a salient pole in the rotating axis direction DR1. Accordingly, the rotor core 90 with the protrusions 91 or the rotor core 90 with the protrusions 92 performs the function the same as that of a magnet magnetized in the rotating axis direction DR1.

Therefore, in the rotor 20G, the radial part (=the magnets 34) is composed of the IPM, while the axial part (=the rotor core 90 with the protrusions 91 or the rotor core 90 with the protrusions 92) is composed of the SynR.

As a result, a high-density torque can be realized by means of the magnet torque and the reluctance torque on the cylinder surface 90A. In addition, because no magnet is needed to generate magnetic flux in the rotating axis direction DR1 on the cylinder end faces 90B and 90C, the cost of the rotor 20G can be reduced.

The rotor 20G is produced by manufacturing the rotor core 90 from a magnetic dust core formed in a substantially cylindrical shape, inserting the rotor shaft 21 into the produced rotor core 90, and disposing the magnets 34 on the rotor core 90.

It should be noted that the magnets 34 constitute the radial rotor magnetic pole section, while the rotor core 90 with the protrusions 91 or the rotor core 90 with the protrusions 92 constitutes the axial rotor magnetic pole section.

Figure 16:
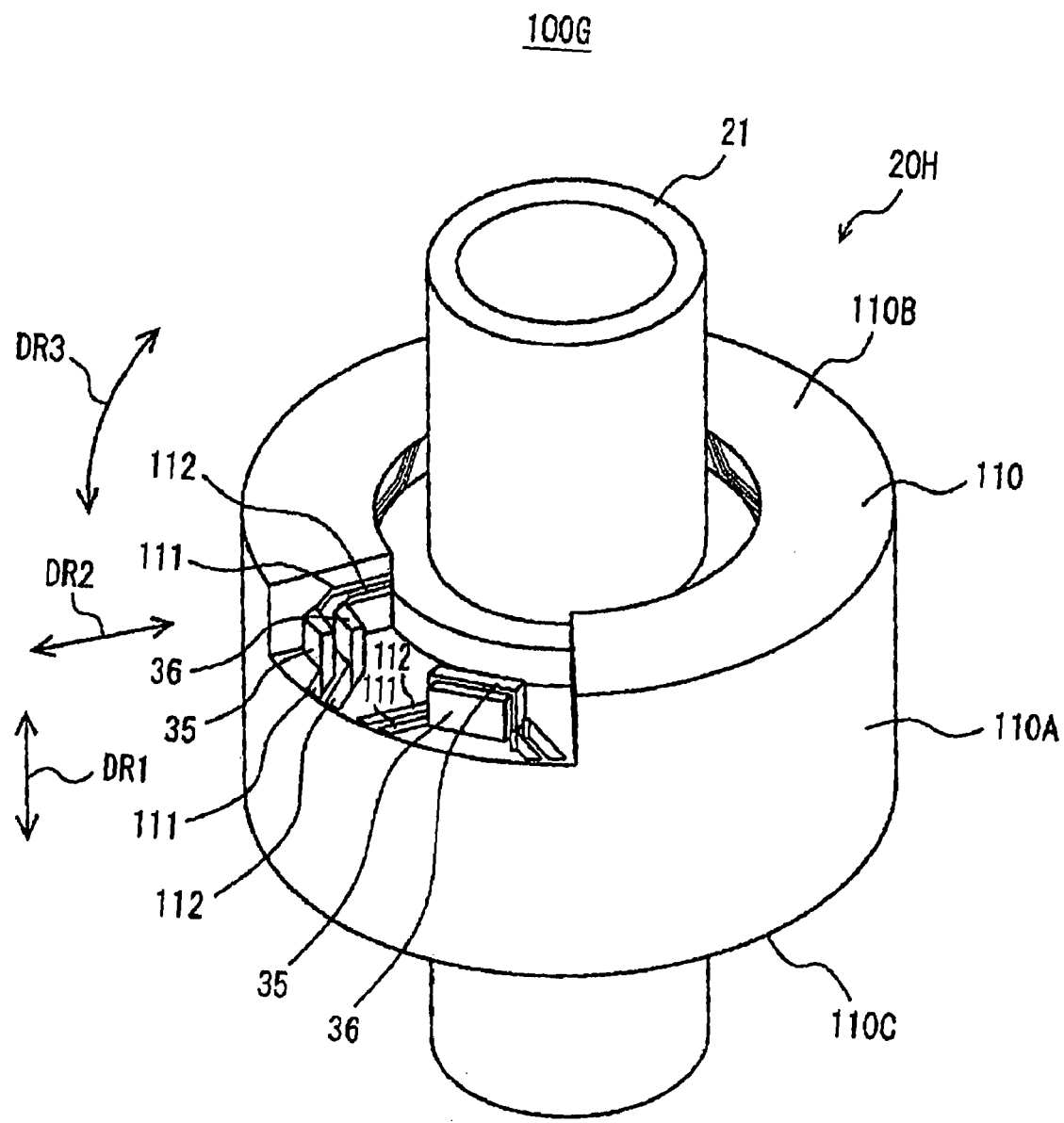
FIG. 16 is another perspective view of the rotor according to the eighth embodiment.

FIG. 16 is another perspective view of the rotor according to Embodiment 8. Referring to FIG. 16, the rotary electric machine 100G according to Embodiment 8 may include a rotor 20H shown in FIG. 16 in place of the rotor 20G shown in FIG. 15.

The rotor 20H comprises the rotor shaft 21, the magnets 35 and 36, and a rotor core 110. The rotor core 110 has cavities 111 and 112 in the inside thereof. The cavities 111 and 112 are formed in such a manner that a first continuous section of each of the cavities 111 and 112 that continues along the rotating axis direction DR1 is connected to a second continuous section of each of the cavities 111 and 112 that continues along the radial direction DR2. Then, a plurality of the cavities 111 and 112 are disposed at predetermined intervals along the circumferential direction DR3.

The cavities 111 and 112 are formed, on a plane parallel to cylinder end faces 110B or 110C, in the shape of a substantially cornered letter C opening towards a cylinder surface 110A. Further, the magnets 35 and 36 magnetized in the radial direction DR2 are respectively inserted into the respective first continuous sections that continue along the rotating axis direction DR1 in the cavities 111 and 112 from the rotating axis direction DR1.

As a result, because magnetic flux that leaks from the magnets 35 and 36 is bended from the rotating axis direction DR1 to the radial direction DR2 due to the cavities 111 and 112, and linked with magnetic flux from the coil 2 of the stator 10 on the cylinder end faces 110B and 110C, the magnet torque can be obtained in addition to the reluctance torque on the cylinder end surfaces 110B and 110C.

More specifically, because the cavities 111 and 112 are formed also along the radial direction DR2 in the vicinity of the cylinder end faces 110B and 110C, the properties of a salient pole (Ld>Lq) are produced by the rotor core 110 in the rotating axis direction DR1 through the cavities 111 and 112 formed along the radial direction DR2. As such, a reluctance torque can be obtained, in addition to the magnet torque generated by magnetic flux from the magnets 35 and 36, on the cylinder end faces 110B and 110C.

In the rotor 20H, because the magnets 35 and 36 are embedded in the rotor core 110, the radial part (=the magnets 35 and 36) is composed of the IPM, and because the cavities 111 and 112 are formed along the radial direction DR2, the axial part (=the rotor core 110 and the cavities 111 and 112 formed along the radial direction DR2) is composed of the SynR.

The rotor 20H is produced by manufacturing the rotor core 110, and inserting the rotor shaft 21 into the produced rotor core 110. Then, the rotor core 110 is produced by manufacturing, from a magnetic duct core formed in a substantially cylindrical shape, a section of the rotor core 110 including the cavities 111 and 112 in the rotating axis direction DR1, inserting the magnets 35 and 36 into the cavities 111 and 112 in the produced section, producing, from magnetic duct cores formed in a substantially cylindrical shape, two sections including the cavities 111 and 112 in the radial direction DR2, and bonding the produced two sections to both respective sides of the section in which the magnets 35 and 36 are inserted.

It should be noted that the magnets 35 and 36 constitute the radial rotor magnetic pole section, while the rotor core 110 and the cavities 111 and 112 formed along the radial direction DR2 constitute the axial rotor magnetic section.

Although an example was described in which the rotor core 110 includes two types of the cavities 111 and 112, the present invention is not limited to this configuration. The rotor core 110 may include just one type of cavity, or more than two types of cavities, formed from the rotating axis direction DR1 to the radial direction DR2. The magnetic property of a salient pole (Ld>Lq) can be realized as long as the rotor core 110 includes at least one type of cavities, in which case a part of the cavity formed along the rotating axis direction DR1 may be contiguous to or separated from another part of the cavity formed along the radial direction DR2.

Further, a plurality of magnetic steel sheets for forming the rotor core 110 with the part of the cavities 111 and 112 formed along the rotating axis direction DR1 constitute "a first ferromagnetic material" having the magnetic property of a salient pole in the radial direction DR2.

Still further, a plurality of magnetic steel sheets for forming the rotor core 110 with the part of the cavities 111 and 112 formed along the radial direction DR2 constitute "a second ferromagnetic body" having the magnetic property of a salient pole in the rotating axis direction DR1.

Figure 17:
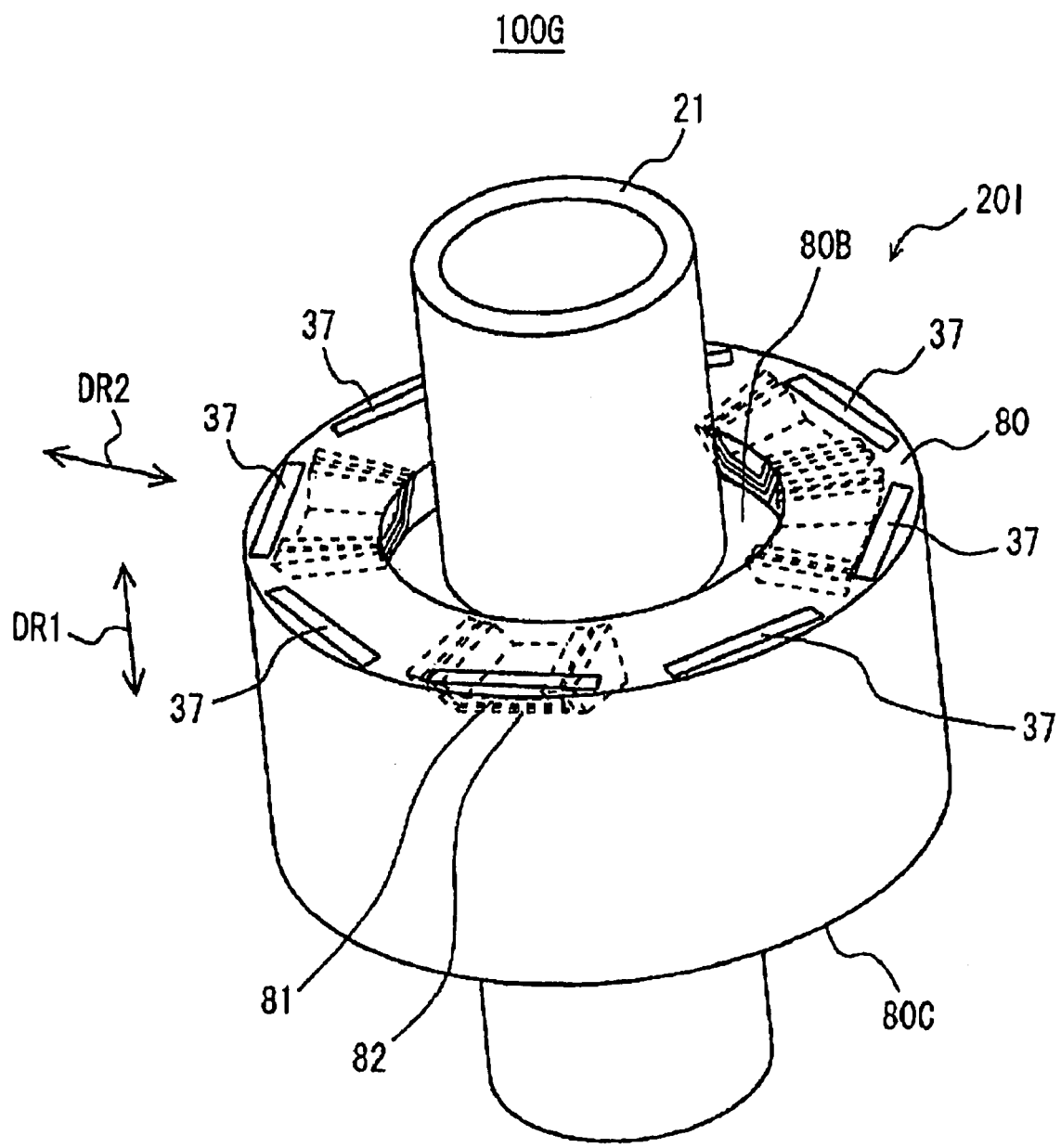
FIG. 17 is still another perspective view of the rotor according to the eighth embodiment.

FIG. 17 is still another perspective view of the rotor in Embodiment 8. Referring to FIG. 17, the rotary electric machine 100G according to Embodiment 8 may comprise a rotor 20I shown in FIG. 17 in place of the rotor 20G shown in FIG. 15.

The rotor 20I comprises the rotor shaft 21, magnets 37, and the rotor core 80. The rotor core 80 is configured as described with reference to FIG. 13. The magnets 37 are magnetized in the radial direction DR2 and inserted into the rotor core 80 from the rotating axis direction DR1.

In this case, the magnets 37 are inserted, on an outer circumference side of the slits 81 and 82, into the rotor core 80. Then, there is a region where no slit is formed between the magnet 37 and the slit 81 or 82. The region having no slit formed therein has a function for preventing leakage of magnetic flux in the rotating axis direction DR1 caused by saturation of magnetic flux of the magnet 37.

In addition, both end faces of the magnets 37 in the rotating axis direction DR1 are aligned with the cylinder end faces 80B and 80C of the rotor core 80. In other words, the magnets 37 do not extend out from the cylinder end face 80B or 80C in the rotating axis direction DR1.

In the rotor 20I, because the magnets 37 are embedded in the rotor core 80, the radial part (=the magnets 37) is composed of the IPM. On the other hand, because the slits 81 and 82 and the slits 83 and 84 are respectively formed in the vicinity of the cylinder end faces 80B and 80C (refer to FIG. 14), the axial part (=the rotor core 80 with the slits 81 and 82 or the rotor core 80 with the slits 83 and 84) is composed of the SynR.

The rotor 20I is produced by manufacturing the rotor core 80 according to the same method as described for the manufacturing method of the rotor 20F, and disposing the magnets 37 on the produced rotor core 80.

It should be noted that the magnets 37 constitute the radial rotor magnetic pole section, while the rotor core 80 with the slits 81 and 82 or the rotor core 80 with the slits 83 and 84 constitute the axial rotor magnetic pole section.

Embodiment 9

Figure 18:
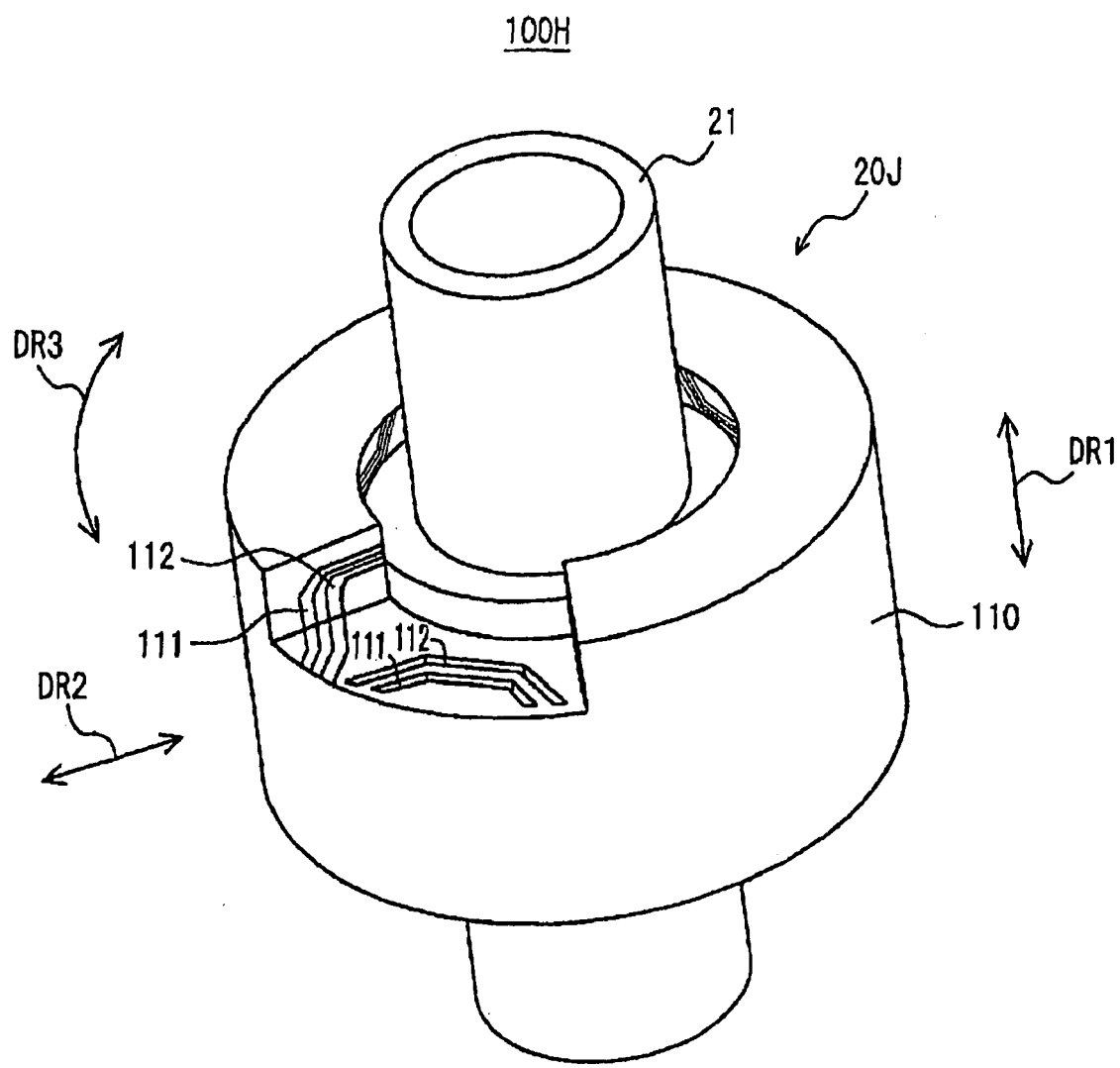
FIG. 18 is a perspective view showing a rotor in a rotary electric machine according to a ninth embodiment of the present invention.

FIG. 18 is a perspective view showing a rotor in a rotary electric machine according to a ninth embodiment of the present invention. Referring to FIG. 18, the rotary electric machine 100H according to Embodiment 9 comprises a rotor 20J in place of the rotor 20 in the rotary electric machine 100.

The rotor 20J is configured by removing the magnets 35 and 36 from the rotor 20H shown in FIG. 16, and the remaining components of the rotor 20J are identical to those of the rotor 20H.

Because the rotor core 110 includes in the inside thereof the cavities 111 and 112 which are three-dimensionally formed along the rotating axis direction DR1, the radial direction DR2 and the circumferential direction DR3, the property of a salient pole are realized in both the rotating axis direction DR1 and the radial direction DR2.

More specifically, a part of the cavities 111 and 112 formed along the radial direction DR2 realizes the property of a salient pole in the rotating axis direction DR1, while a part of the cavities 111 and 112 formed along the rotating axis direction DR1 realizes the property of a salient pole in the radial direction DR2. In other words, the part of the cavities 111 and 112 formed along the radial direction DR2 performs a function identical to that of a magnet magnetized in the rotating axis direction DR1, while the part of the cavities 111 and 112 formed along the rotating axis direction DR1 performs a function identical to that of a magnet magnetized in the radial direction DR2.

Accordingly, in the rotor 20J, the radial part (=the part of the cavities 111 and 112 formed along the rotating axis direction DR1) and the axial part (=the part of the cavities 111 and 112 formed along the radial direction DR2) are composed of the SynR.

As a result, because no magnet is needed to generate magnetic flux in the rotating axis direction DR1 or the radial direction DR2, the cost of the rotor can be reduced.

The rotor 20J is produced by manufacturing, from a magnetic dust core formed in a substantially cylindrical shape, a section of the rotor core 110 including the cavities 111 and 112 along the rotating axis direction DR1, producing, from magnetic dust cores formed in a substantially cylindrical shape, two sections of the rotor core 110 including the cavities 111 and 112 along the radial direction DR2, and bonding the produced two sections to respective sides of the section including the cavities 111 and 112 along the rotating axis direction DR1.

It should be noted that the part of the cavities 111 and 112 formed along the rotating axis direction DR1 constitutes the radial rotor magnetic pole section, while the part of the cavities 111 and 112 formed along the radial direction DR2 constitutes the axial rotor magnetic pole section.

Figure 19:
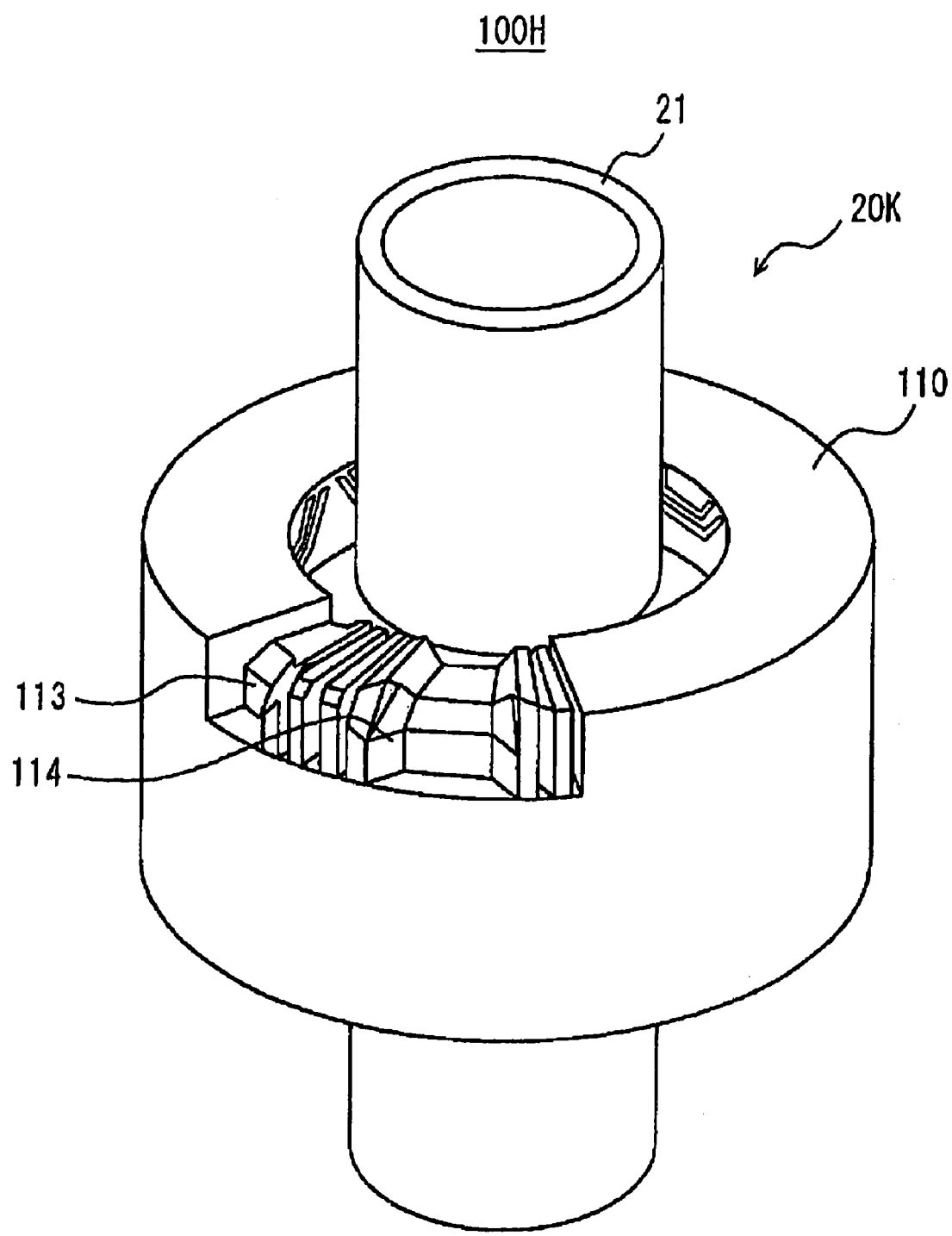
FIG. 19 is another perspective view of the rotor according to the ninth embodiment.

FIG. 19 is another perspective view of the rotor in Embodiment 9. Referring to FIG. 19, the rotary electric machine 100G according to Embodiment 9 may include a rotor 20K shown in FIG. 19 in place of the rotor 20J shown in FIG. 18.

The rotor 20K is configured by adding non-magnetic members 113 and 114 to the rotor 20J, and the remaining components of the rotor 20K are identical to those of the rotor 20J.

The non-magnetic members 113 and 114 are filled in regions where the cavities 111 and 112 of the rotor core 110 are formed. In other words, the non-magnetic members 113 and 114 are inserted into the cavities 111 and 112 shown in FIG. 18. With this configuration, spatial retention of the magnetic steel sheets that form the cavities 111 and 112 is eased.

The structure is otherwise identical to that of the rotor 20J.

Embodiment 10

Figure 20:
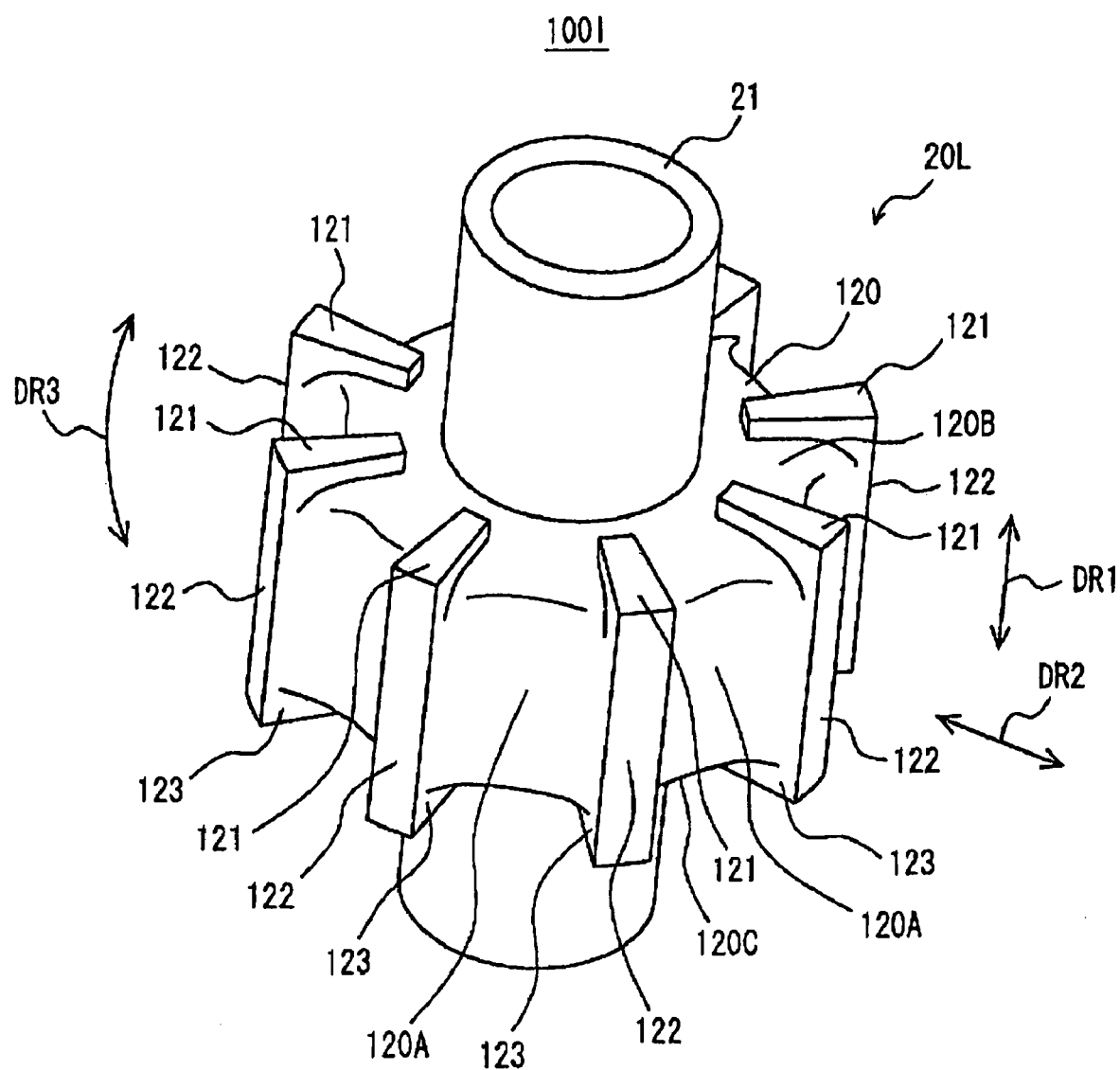
FIG. 20 is a perspective view showing a rotor in a rotary electric machine according to a tenth embodiment of the present invention.

FIG. 20 is a perspective view showing a rotor in a rotary electric machine according to a tenth embodiment of the present invention. Referring to FIG. 20, the rotary electric machine 100I according to Embodiment 10 comprises a rotor 20L in place of the rotor 20 in the rotary electric machine 100.

The rotor 20L comprises the rotor shaft 21 and a rotor core 120. The rotor core 120 has protrusions 121~123. There are a plurality of protrusions 121~123 disposed at predetermined intervals along the circumferential direction DR3. The protrusions 121 and 123 are disposed along the radial direction DR2 on respective cylinder end faces 120B and 120C of the rotor core 120, and the protrusions 122 are disposed along the rotating axis direction DR1 on a cylinder surface 120A of the rotor core 120.

The protrusions 121 are protruded from the cylinder end face 120B of the rotor core 120 in the rotating axis direction DR1, while the protrusions 123 are protruded from the cylinder end face 120C of the rotor core 120 in the rotating axis direction DR1. Further, the protrusions 122 are protruded from the cylinder surface 120A of the rotor core 120 in the radial direction DR2.

Figure 21:
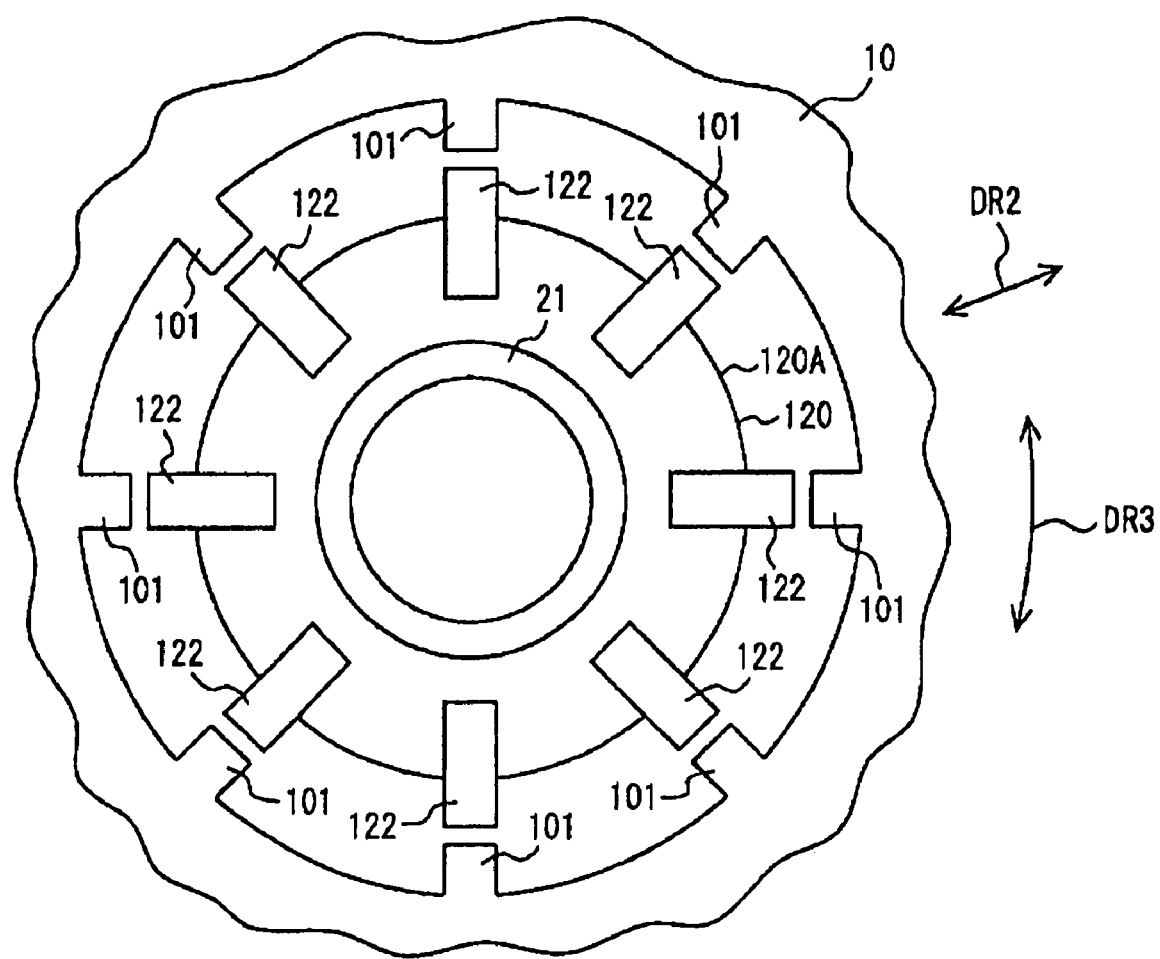
FIG. 21 is a plan view of a rotor shaft and a rotor core when viewed from a rotating axis direction DR1 indicated in FIG. 20.

FIG. 21 is a plan view of the rotor shaft 21 and the rotor core 120 viewed from the rotating axis direction DR1 depicted in FIG. 20. It should be noted that FIG. 21 also shows a part of the stator 10.

Referring to FIG. 21, the stator 10 has eight protrusions 101 disposed at predetermined intervals along the circumferential direction DR3. A coil which is not illustrated is wound around each of the eight protrusions 101.

Corresponding to the provision of the eight protrusions 101 on the stator 10, the rotor core 120 has eight protrusions 122 formed along the circumferential direction DR3.

Because the rotor core 120 has the protrusions 122 extending out from a cylinder surface 120A in the radial direction DR2 at a predetermined interval along the circumferential direction DR3, a magnetic structure of a salient pole is established in the radial direction DR2. More specifically, inductance in the protrusions 122 becomes greater than that in a region where the protrusions 122 are not formed. Further, when the protrusions 122 of the rotor core 120 approach the protrusions 101 of the stator 10, currents are passed through the coils wound around the protrusions 101 of the stator 10.

Then, magnetic fields generated upon the passage of the currents through the coils magnetically interact with the protrusions 122 of the rotor core 120, to thereby rotate the rotor 20L in the circumferential direction DR3.

The stator 10 also has, on each end in the rotating axis direction, eight protrusions opposed to the protrusions 121, 123 of the rotor core 120 in a form similar to that shown in FIG. 21, and coils are wound around the eight protrusions. Accordingly, magnetic fields generated upon passage of currents through the coils magnetically interact with the protrusions 121, 123 of the rotor core 120, to thereby rotate the rotor 20L in the circumferential direction DR3.

As described above, because the rotor 20L has the protrusions 121, 123, and 122 protruding in the rotating axis direction DR1 and in the radial direction DR2, the radial part (=the protrusions 122) and the axial parts (=the protrusions 121 and 123) are composed of SR (Switched Reluctance).

Consequently, the magnetic salient pole structure is formed on both the cylinder surface 120A and the cylinder end faces 120B and 120C, thereby enabling output of a high-density torque.

The rotor 20L is manufactured by forming a magnetic dust core in a substantially cylindrical shape having the protrusions 121~123 to produce the rotor core 120, and inserting the rotor shaft 21 into the produced rotor core 120.

It should be noted that the protrusions 101 constitute the radial stator magnetic pole section, while the protrusions of the stator 10 opposed to the protrusions 121 or 123 of the rotor core 120 in the form similar to that shown in FIG. 21 constitute the axial stator magnetic pole section.

In addition, the protrusions 122 constitute the radial rotor magnetic pole section, while the protrusions 121 or 123 constitute the axial rotor magnetic pole sections.

Except as described, the structure is identical to that of Embodiment 1.

Embodiment 11

Figure 22:
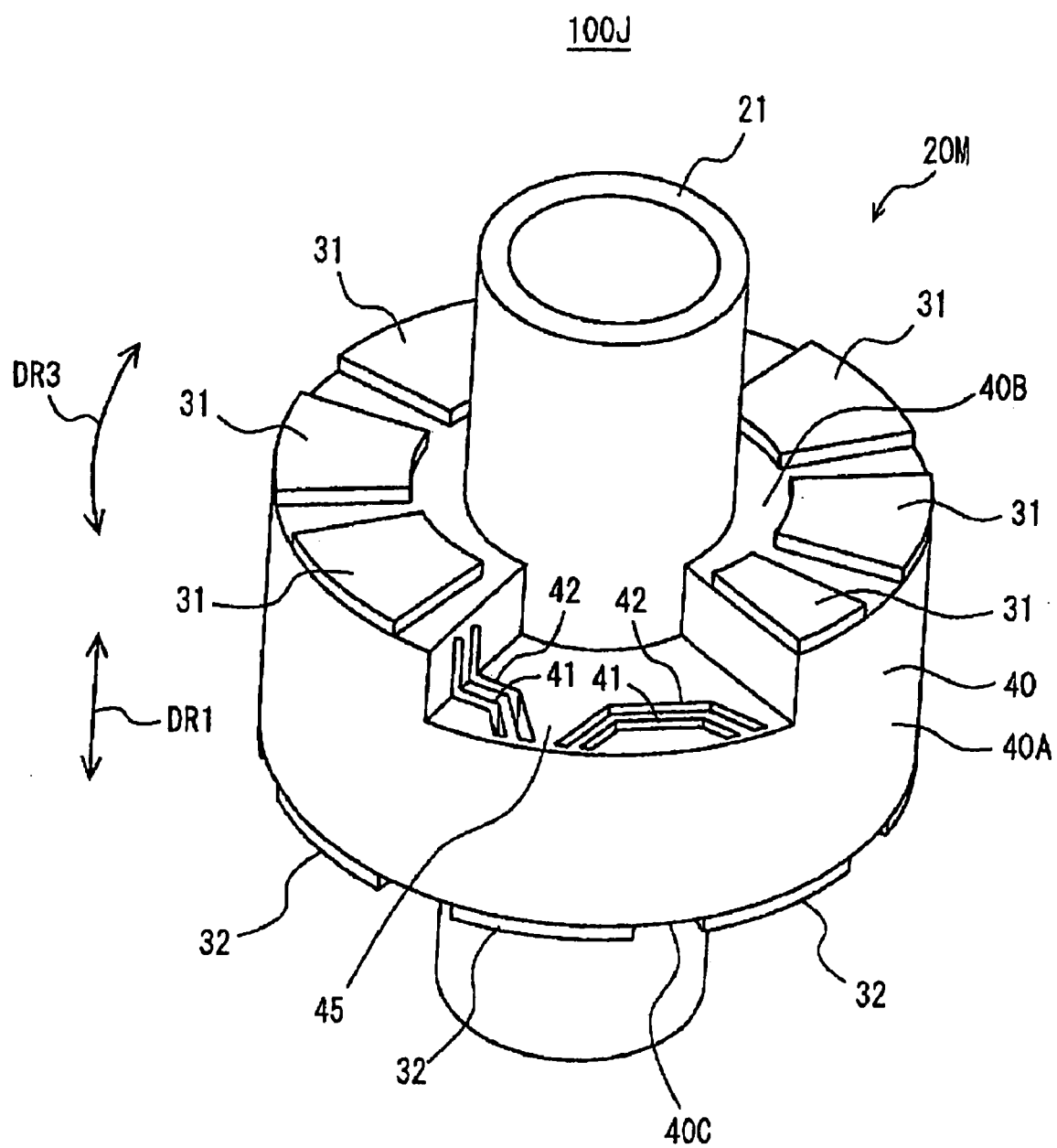
FIG. 22 is a perspective view of a rotor in a rotary electric machine according to an eleventh embodiment of the present invention.

FIG. 22 is a perspective view showing a rotor in a rotary electric machine according to an eleventh embodiment of the present invention. Referring to FIG. 22, the rotary electric machine 100J according to Embodiment 11 has a rotor 20M in place of the rotor 20B of the rotary electric machine 100B shown in FIG. 5, and the remaining components of the rotary electric machine 100J are identical to those of the rotary electric machine 100B.

Similarly to the rotor 20B, the rotor 20M comprises the rotor shaft 21, the magnets 31 and 32, and the rotor core 40. In the rotor 20M, displacement locations of the magnets 31 and 32 differ from those in the rotor 20B. Specifically, in the rotor 20M, the magnets 31 and 32 are respectively disposed on cylinder end faces 40B and 40C so as to sandwich a region 45 existing between two adjacent cavities 41 and 41 and between two adjacent cavities 42 and 42 in the circumferential direction DR3. In other words, the magnets 31 and 32 are placed on locations shifted by an electrical angle of 45 degrees along the circumferential direction DR3 relative to those locations in the rotor 20B.

Figure 23:
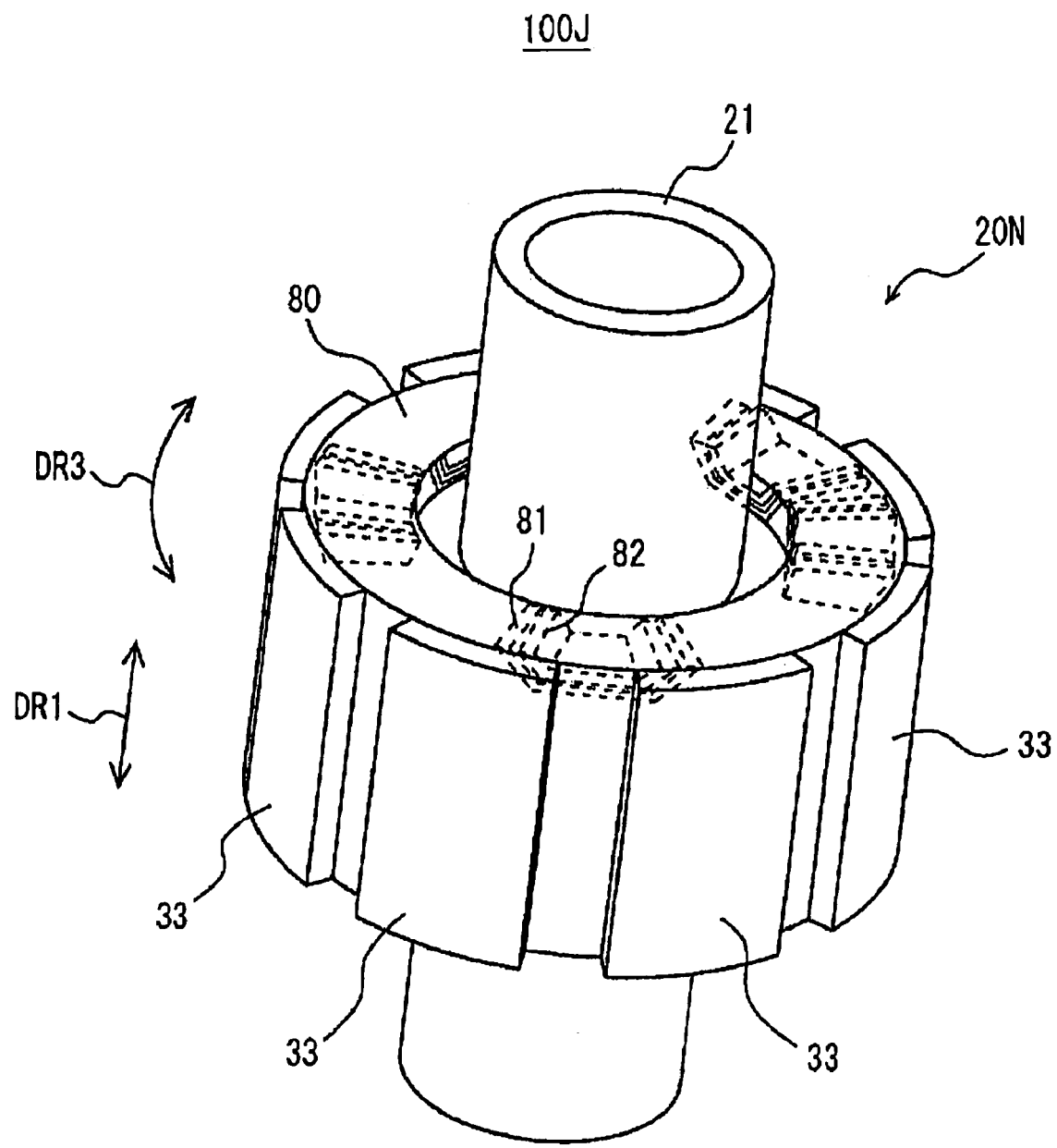
FIG. 23 is another perspective view of the rotor according to the eleventh embodiment.

FIG. 23 is another perspective view of the rotor and other components in Embodiment 11. Referring to FIG. 23, the rotary electric machine 100J according to Embodiment 11 may comprise a rotor 20N shown in FIG. 23 in place of the rotor 20M shown in FIG. 22.

The rotor 20N includes, similarly to the rotor 20F shown in FIG. 13, the rotor shaft 21, the magnets 33, and the rotor core 80. In the rotor 20N, the displacement locations of the magnets 33 differ from those of the rotor 20F. Specifically, in the rotor 20N, the slits 81 and 82 and the slits 83 and 84 (the slits 83 and 84 are not illustrated in FIG. 23) are disposed so as to be located between two adjacent magnets 33 and 33. In other words, the magnets 33 are placed on locations shifted by the electrical angle of 45 degrees along the circumferential direction DR3 relative to those in the rotor 20F.

As such, the rotary electric machine 100J according to Embodiment 11 is characterized in provision of the rotor 20M or 20N which is configured by shifting, in the rotor 20B or 20F in which one of the radial part or the axial part of the rotor is composed of the SPM and the other of the radial part or the axial part is composed of the SynR, the axial part along the circumferential direction DR3 relative to the radial part so as to establish a phase difference between the radial part and the axial part at the electrical angle of 45 degrees.

Figure 24:
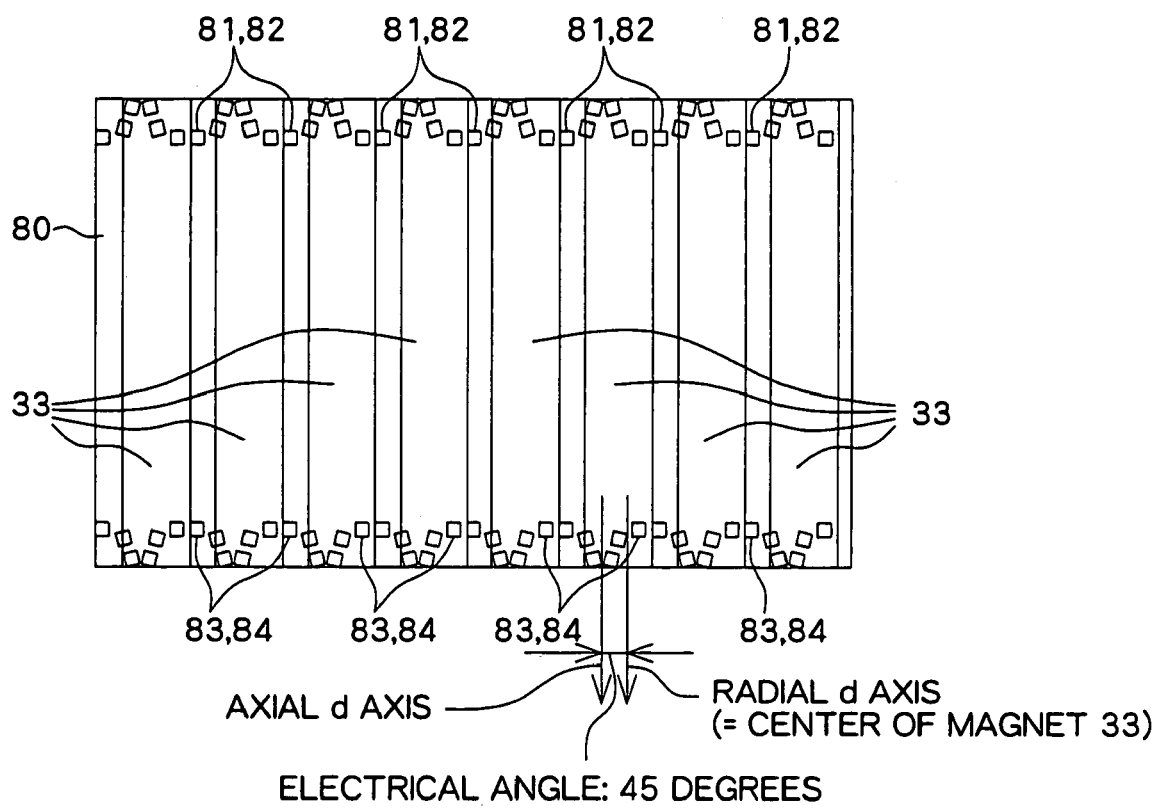
FIG. 24 is a developed view of a rotor core and magnets shown in FIG. 23.

FIG. 24 is a developed view of the rotor core 80 and the magnets 33 shown in FIG. 23. In addition, FIG. 25 is a developed view of the rotor 80 and the magnets 33 shown in FIG. 13.

Referring to FIG. 24, when the magnets 33 are shifted along the circumferential direction DR3 by the electrical angle of 45 degrees, i.e. when the magnets are moved along the circumferential direction DR3 by a mechanical angle of 11.25 degrees, the d shaft of the axial part (the rotor core 80 with the slits 81 and 82 or the rotor core 80 with the slits 83 and 84) is shifted by the electrical angle of 45 degrees relative to the d shaft (the center of the magnets 33) of the radial part (the magnets 33). It should be noted that because FIGS. 24 and 25 depict an 8-pole (4 pole pair) motor, the electrical angle of 45 degrees corresponds to the mechanical angle of 11.25 degrees (=one-fourth of 45 degrees).

Figure 25:
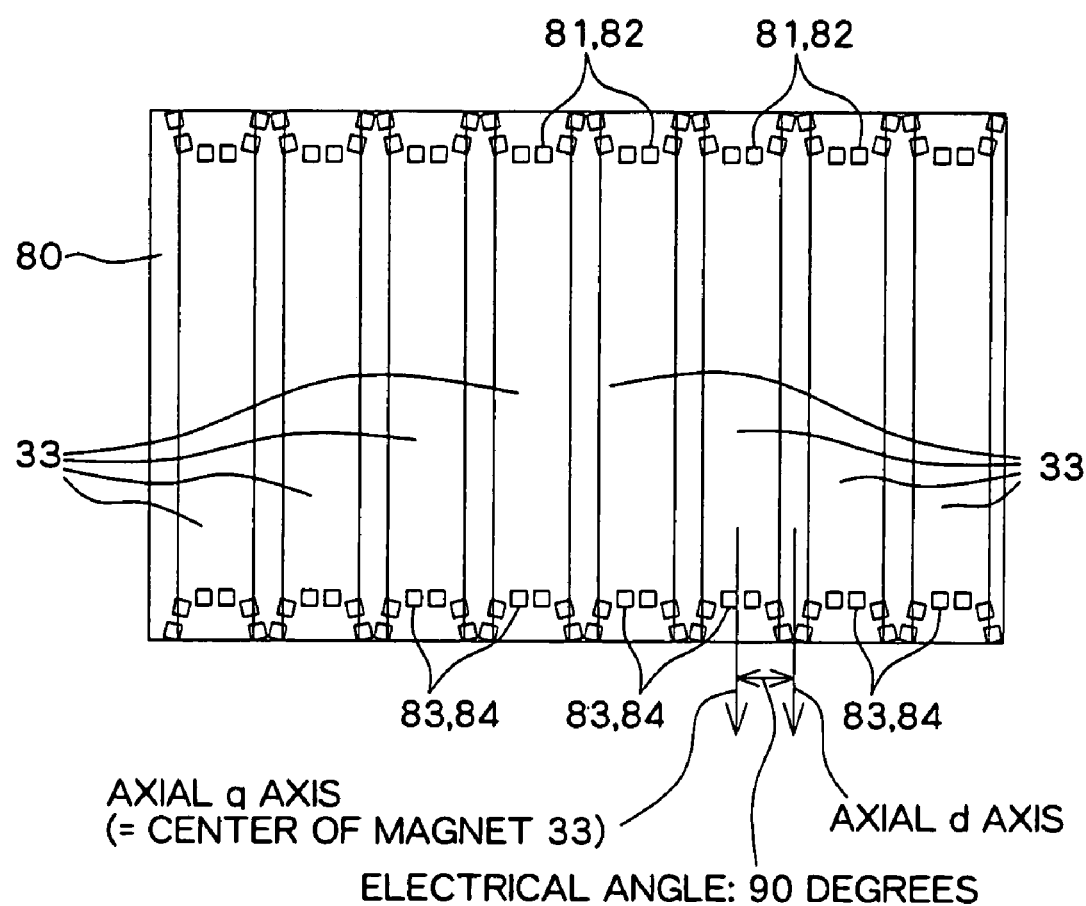
FIG. 25 is a developed view of a rotor core and magnets shown in FIG. 13.

On the other hand, referring to FIG. 25 which shows the magnets 33 not shifted along the circumferential direction DR3 by the electrical angle of 45 degrees, a q shaft of the axial part (the rotor core 80 with the slits 81 and 82 or the rotor core 80 with the slits 83 and 84) is shifted by an electrical angle of 90 degrees relative to the d shaft of the axial part, thereby matching with the d shaft of the radial part (the center of the magnets 33).

Figure 26:
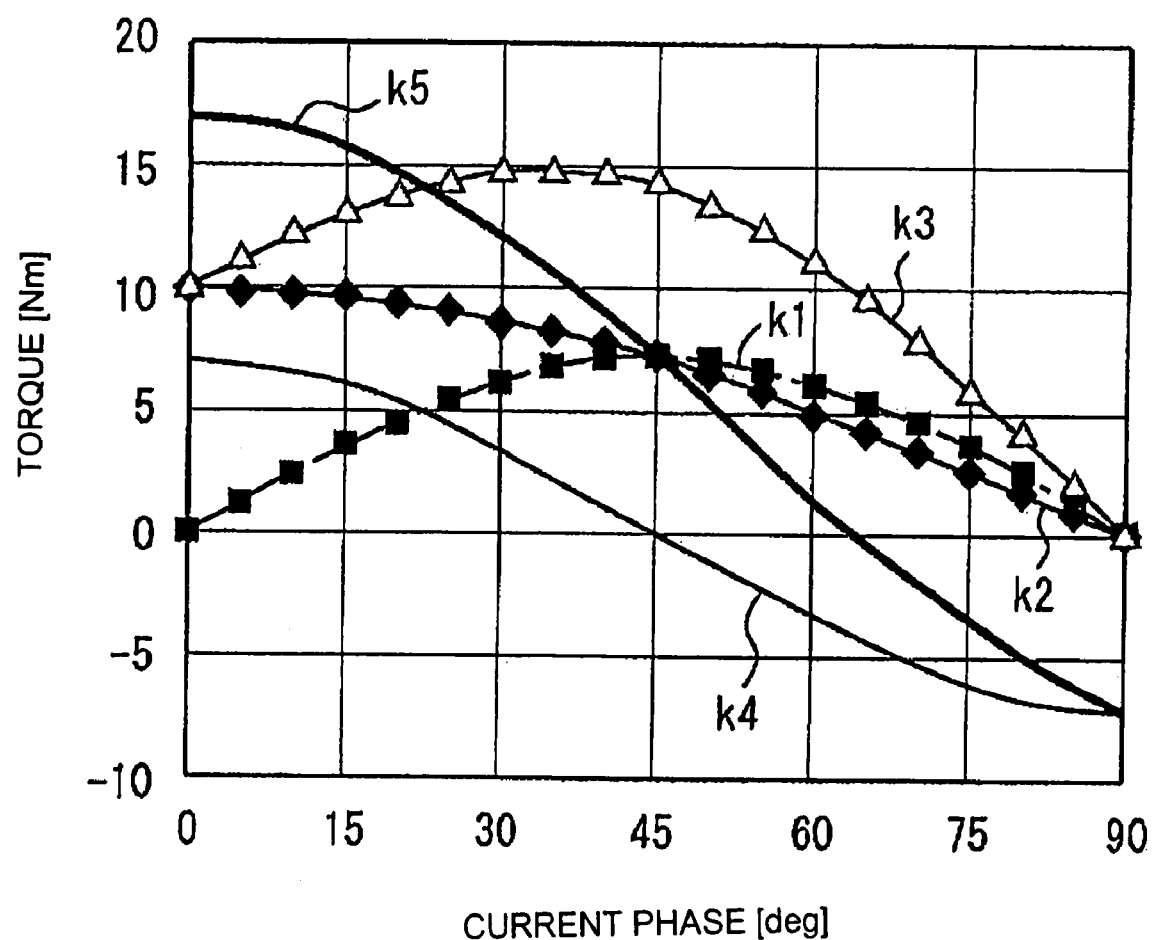
FIG. 26 is a diagram showing a relationship between a torque and a phase of currents passing through coils in the stator.

FIG. 26 shows a relationship between a torque and a current phase of a current that flows through the coil 2 in the stator 10. In FIG. 26, the abscissa represents the current phase and the ordinate represents the torque. Referring to FIG. 26, a curve k1 describes reluctance torques attained when the magnets 33 are not shifted along the circumferential direction DR3 by the electrical angle of 45 degrees, a curve k2 describes magnet torques of the magnets 33, and a curve k3 describes the sum of the curve k1 and the curve k2, in other words, a total torque attained when the magnets 33 are not shifted along the circumferential direction DR3 by the electrical angle of 45 degrees.

In addition, a curve k4 corresponds to reluctance torques attained when the magnets 33 are shifted along the circumferential direction DR3 by the electrical angle of 45 degrees, and a curve k5 describes the sum of the curve k2 and the curve k4, i.e. the total torque attained when the magnets 33 are shifted along the circumferential direction DR3 by the electrical angle of 45 degrees. In this case, the curve k4 corresponds to a curve obtained when the k1 is shifted leftward by a current phase of 45 degrees. However, the curve k4 is not limited to the curve obtained by shifting leftward the k1 by the current phase of 45 degrees, and, in general, the curve k4 corresponds to a curve obtained when the curve k1 is shifted so as to make a maximum value of the magnet torque match with a maximum value of the reluctance torque.

As is evident from FIG. 26, when the magnets 33 are shifted along the circumferential direction DR3 by an electrical angle of 45 degrees, a greater total torque can be obtained in a current phase of 0 degrees. This is achieved by a fact that, through the leftward shifting of the curve k1 by the current phase of 45 degrees, the current phase in which the maximum value of the reluctance torque can be obtained is matched with the current phase in which the maximum value of the magnet torque can be obtained.

As described above, the rotary electric machine 100J according to Embodiment 11 can be driven in the current phase in which both the reluctance torque and the magnet torque reach their peak. As a consequence, the greater torque can be obtained.

It should be noted that the rotors 20M and 20N are respectively manufactured by shifting the placement locations of the magnets 31, 32 and the magnets 33 along the circumferential direction DR3 by the mechanical angle of 11.25 degrees in the manufacturing method for the rotors 20B and 20F.

Embodiment 12

Figure 27:
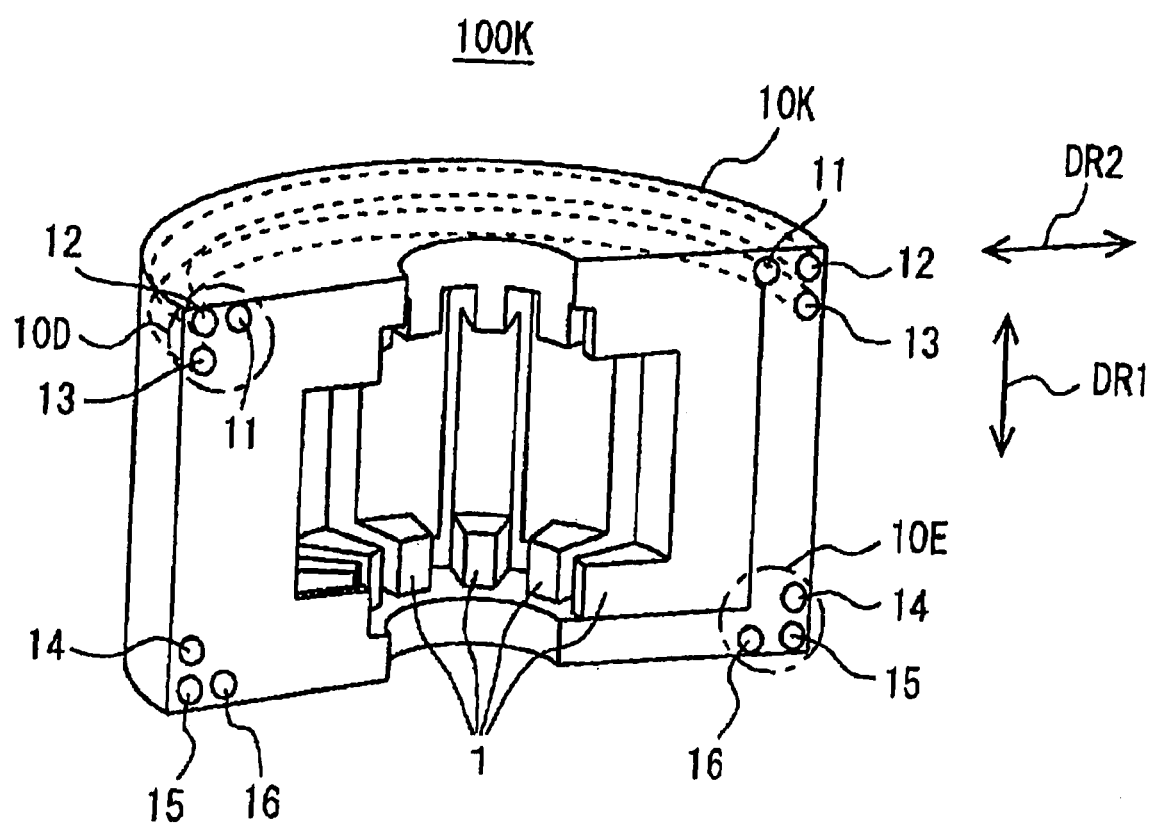
FIG. 27 is a perspective view showing a stator in a rotary electric machine according to a twelfth embodiment of the present invention.

FIG. 27 is a perspective view showing a stator in a rotary electric machine according to a twelfth embodiment of the present invention. Referring to FIG. 27, the rotary electric machine 100K according to Embodiment 12 is configured by replacing the stator 10 of the rotary electric machine 100 shown in FIG. 1 with a stator 10K, and the remaining components of the rotary electric machine 100K are identical to those of the rotary electric machine 100. It should be noted that the coils 2 are not illustrated in FIG. 27.

The stator 10K is configured by adding cooling water channels 11~16 to the stator 10, and the remaining components of the stator 10K are otherwise identical to those of the stator 10. The cooling water channels 11~13 are disposed in a joint part 10D of the stator 10K along the circumference of the stator 10K. In addition, the cooling water channels 14~16 are disposed in a joint part 10E of the stator 10K along the circumference of the stator 10K.

Providing the cooling water channels 11~16 in the joint parts 10D and 10E where the magnetic density is relatively low makes it possible to improve cooling capability to be cooled without reducing the strength of magnetic fields with respect to saturation of the magnetic flux density.

Figure 28:
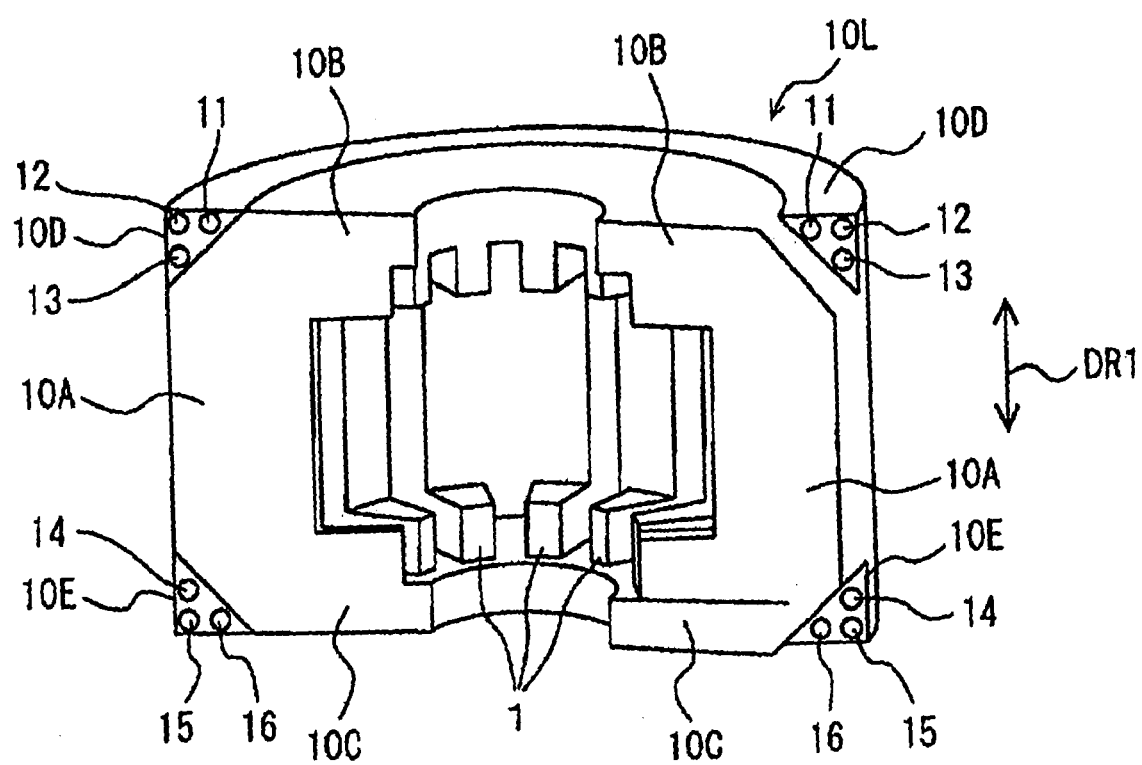
FIG. 28 is another perspective view of the stator according to the twelfth embodiment.

FIG. 28 is another perspective view of the stator in Embodiment 12. Referring to FIG. 28, the rotary electric machine 100K according to Embodiment 12 may comprise a stator 10L shown in FIG. 28 in place of the stator 10K shown in FIG. 27.

The stator 10L has a configuration in which the joint parts 10D and 10E are formed as separate components independent of the radial part 10A and the axial parts 10B and 10C in the stator 10K, and the remaining components of the stator 10L are identical to those of the stator 10K.

Even when the cooling water channels 11~16 are provided to the joint parts 10D and 10E formed as the separate components as described above, the cooling capability can be improved without reducing the strength of magnetic fields with respect to saturation of the magnetic flux density.

It should be noted that any one of the above-described rotors 20A~20N may be used in place of the rotor 20 in the rotary electric machine 100K according to Embodiment 12.

Embodiment 13

Figure 29:
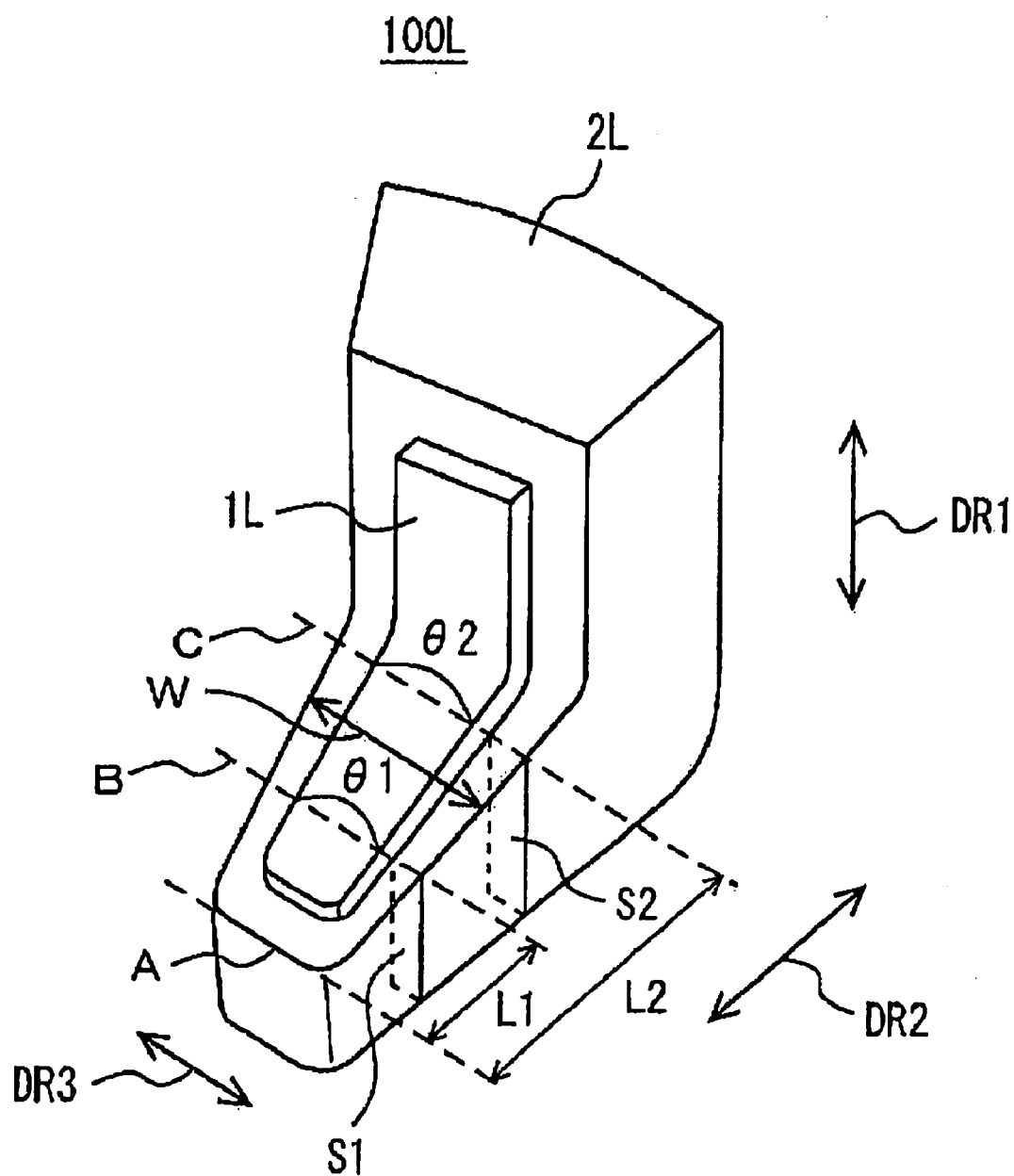
FIG. 29 is a perspective view showing a tooth and a coil in a rotary electric machine according to a thirteenth embodiment of the present invention.

FIG. 29 is a perspective view of a tooth and a coil in a rotary electric machine according to a thirteenth embodiment of the present invention. Referring to FIG. 29, the rotary electric machine 100L according to Embodiment 13 comprises the tooth 1L and the coil 2L.

When the spread angle of the width of the tooth 1L at a location B which is at a distance L1 away from an end A of the coil 2L in the radial direction DR2 toward the outer circumference side is θ1, the spread angle of the width of the tooth 1L at a location C which is at a distance L2 away from the end A toward the outer circumference side is θ2, the cross-sectional area of the coil 2L at the location B is S1, and the cross-sectional area of the coil 2L at the location C is S2, the widths of the tooth 1L and the coil 2L are defined such that the relationships S1<S2 and θ1≧θ2 are both satisfied.

More specifically, the tooth 1L is set to a width which is substantially constant in the radial direction DR2 or broadened toward the inner circumference side from the outer circumference side while maintaining a total width W of the tooth 1L and the coil 2L in the circumferential direction.

With this setting, saturation of the magnetic flux density at the end A can be suppressed even when the magnetic flux density is increased. Consequently, it becomes possible to suppress saturation of the torque generated due to magnetic interaction between the stator magnetic pole section placed in the radial direction DR2 and the rotor magnetic pole section.

It should be noted that any one of the above-described rotors 20~20L may be used in the rotary electric machine 100L according to Embodiment 13. Further, as described for Embodiment 12, the cooling water channels may be formed in the joint parts of the stator.

Embodiment 14

Figure 30:
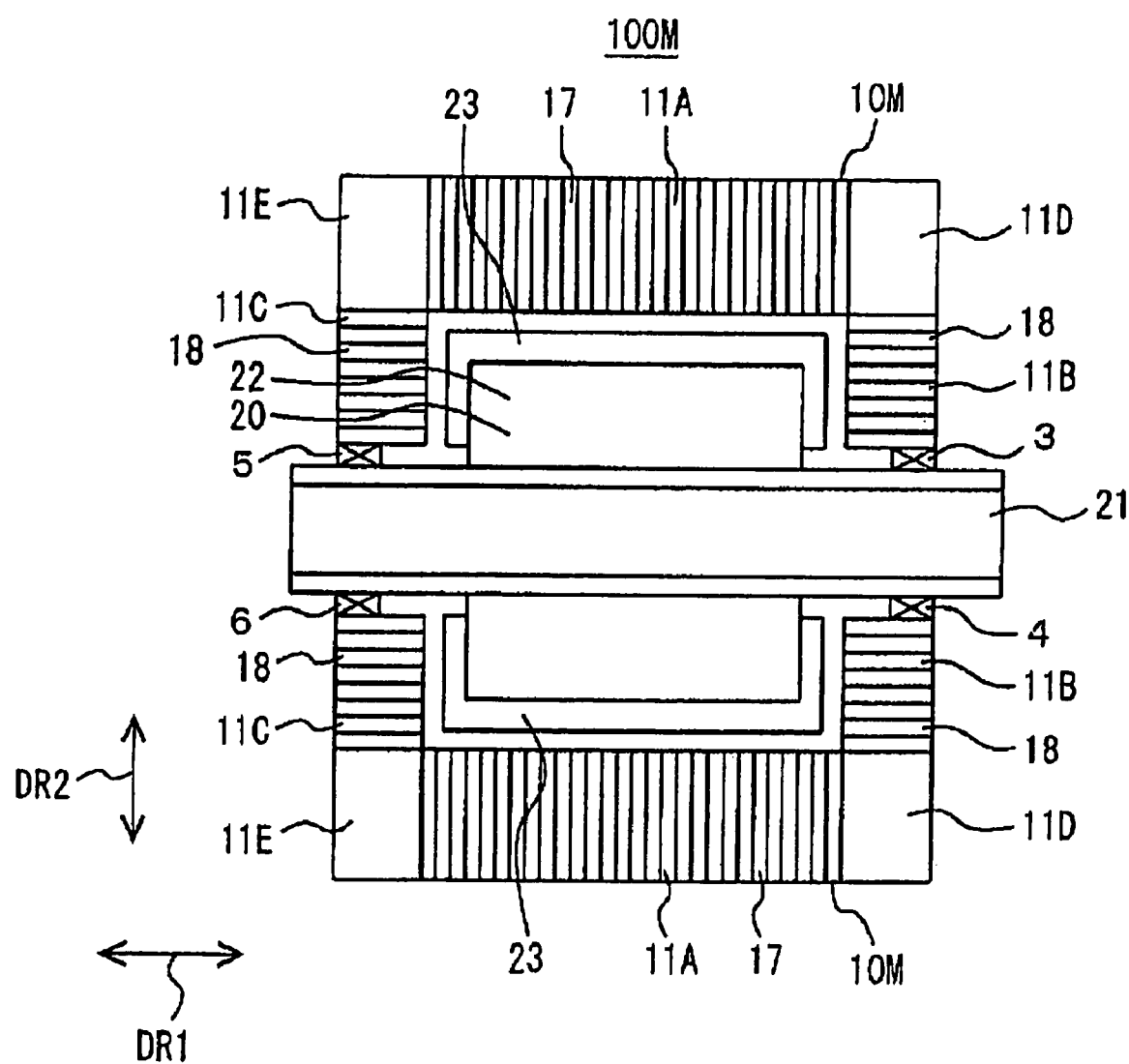
FIG. 30 is a schematic cross-sectional view of a rotary electric machine according to a fourteenth embodiment of the present invention.

FIG. 30 is a schematic cross-sectional view of a rotary electric machine according to a fourteenth embodiment of the present invention. Referring to FIG. 30, the rotary electric machine 100M according to Embodiment 14 is configured by replacing the stator 10 of the rotary electric machine 100 shown in FIG. 3 with a stator 10M, and the remaining components of the rotary electric machine 100M are identical to those of the rotary electric machine 100.

The stator 10M includes a radial part 11A, axial parts 11B and 11C, and joint parts 11D and 11E. The radial part 11A is disposed along the rotating axis direction DR1, while the axial parts 11B and 11C are disposed along the radial direction DR2.

The radial part 11A is formed of a plurality of magnetic steel sheets 17, 17, 17, . . . laminated along the rotating axis direction DR1, while the axial parts 11B and 11C are formed of a plurality of magnetic steel sheets 18, 18, 18, . . . laminated along the radial direction DR2. In addition, the joint parts 11D and 11E for connecting the radial part 11A with the axial parts 11B and 11C are formed of a ferric dust core. The ferric dust core is produced by bonding dust of a ferric core using an adhesive.

Figure 31:
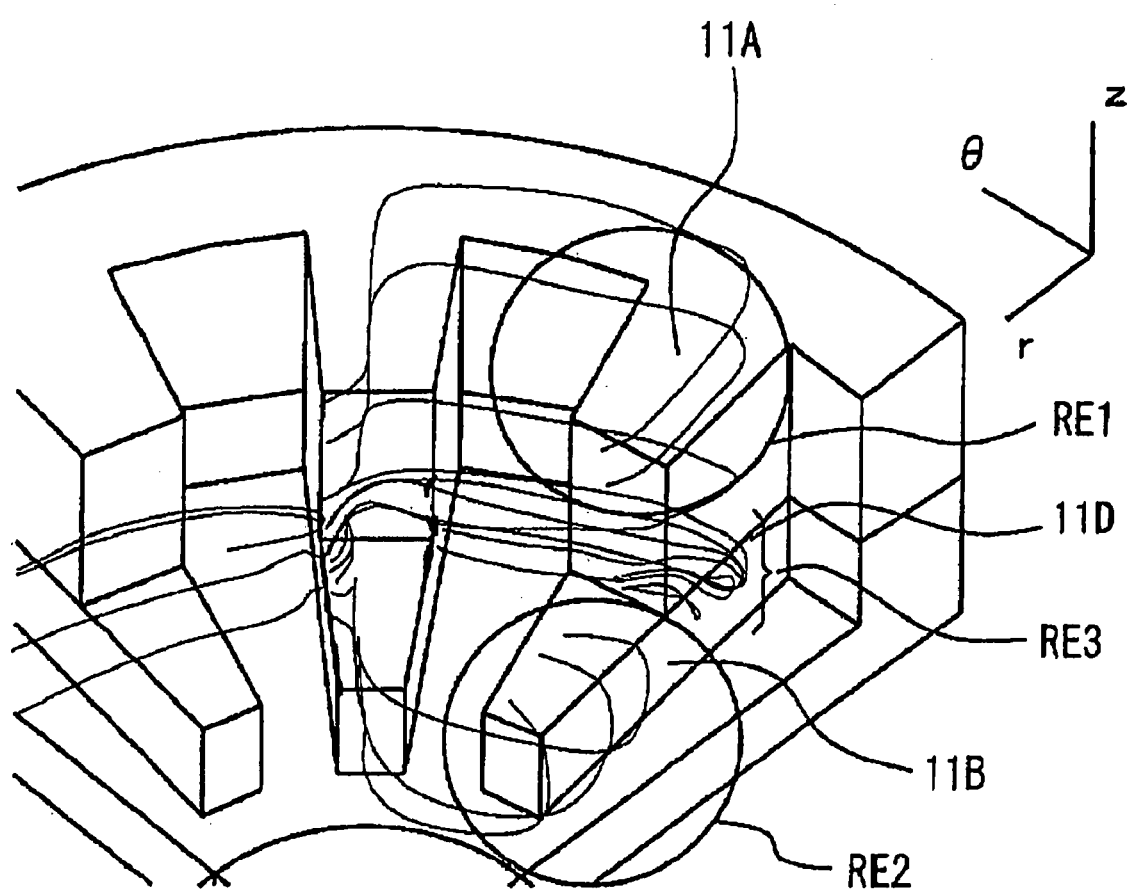
FIG. 31 is a diagram showing magnetic flux distribution in a radial part, an axial part, and a joint part of a stator shown in FIG. 30.

FIG. 31 is a diagram showing magnetic flux distribution in the radial part 11A, the axial parts 11B, and the joint part 11D of the stator 10M shown in FIG. 30. It should be noted that the magnetic flux distribution is represented using polar coordinates in FIG. 31 where a z axis corresponds to the rotating axis direction DR1, an r axis corresponds to the radial direction DR2, and a θ axis corresponds to the circumferential direction DR3.

Referring to FIG. 31, in the radial part 11A, magnetic flux flows in a direction of an r-θ plane as shown in a region RE1. Further, in the axial part 11B, magnetic flux flows in a direction of an r-z plane as shown in a region RE2. Thus, the magnetic flux flows in a planar direction in the radial part 11A and the axial part 11B.

On the other hand, in the joint part 11D, magnetic flux is three-dimensionally distributed as shown in a region RE3.

Because magnetic flux is distributed in the planar direction in the radial part 11A and the axial part 11B, an eddy current can be prevented even when the radial part 11A and the axial parts 11B and 11C are produced by means of the plurality of laminated magnetic steel sheets.

When the joint parts 11D and 11E are produced, similarly to the radial part 11A, by means of the plurality of magnetic steel sheets laminated along the rotating axis direction DR1, the eddy current occurs on the magnetic steel sheets that forms the axial parts 11B and 11C, resulting in deterioration of the magnetic property. On the other hand, when the joint parts 11D and 11E are produced, similarly to the axial parts 11B and 11C, by the plurality of magnetic steel sheets laminated along the radial direction DR2, the eddy current occurs on the magnetic steel sheets that forms the radial part 11A, resulting in deterioration of the magnetic property.

With this in view, in order to combine the magnetic flux generated in the radial part 11A and the magnetic flux generated in the axial parts 11B and 11C, the joint parts 11D and 11E are composed of the ferric dust core capable of three-dimensionally distributing magnetic flux.

As a result of configuring the joint parts 11D and 11E of the ferric dust core capable of three-dimensional distribution of magnetic flux as described above, the magnetic flux generated in the radial part 11A and the magnetic flux generated in the axial parts 11B and 11C can easily be combined, to thereby realize an increased output torque of the rotary electric machine 100M.

It should be noted that any one of the above-described rotors 20~20N may be used in the rotary electric machine 100M.

Figure 32:
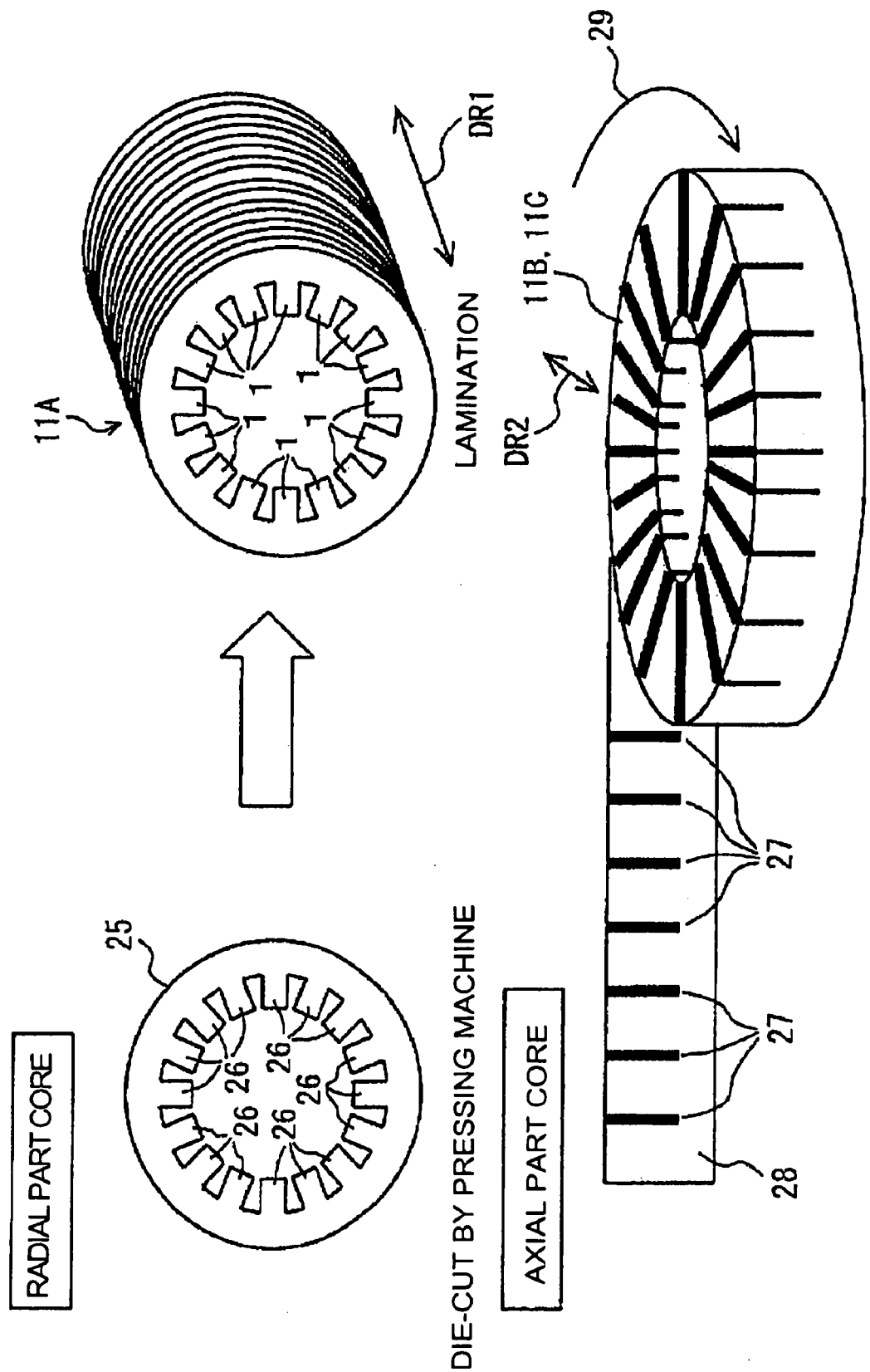
FIG. 32 is a diagram showing a manufacturing method for the stator 10M shown in FIG. 30.

FIG. 32 is a diagram showing a manufacturing method for the stator 10M shown in FIG. 30. Referring to FIG. 32, a method for manufacturing the radial part 11A will be described first. The inner circumference side of circular magnetic steel sheets 25 are die-cut by means of a pressing machine, to thereby produce protrusions 26 for forming the teeth 1. Then, the magnetic steel sheets 25 are laminated along the rotating axis direction DR1 to produce the radial part 11A. In this case, a plurality of teeth 1 are formed on the inner circumference side.

Next, a method for manufacturing the axial parts 11B and 11C will be described. A band-shaped magnetic steel sheet 28 having a plurality of slits 27, 27, 27, . . . formed thereon are rolled in a direction shown by an arrow 29 so as to form the slits in a radial pattern, thereby producing the axial parts 11B and 11C. In this case, the plurality of slits 27, 27, 27, . . . are formed on the band-shaped magnetic steel sheet 28 in such a manner that spacing between the slits 27 is gradually increased.

Then, the radial part 11A and the axial parts 11B and 11C produced according to the above described methods are connected by means of the joint parts 11D and 11E composed of the ferric dust core to complete the stator 10M.

Figure 33:
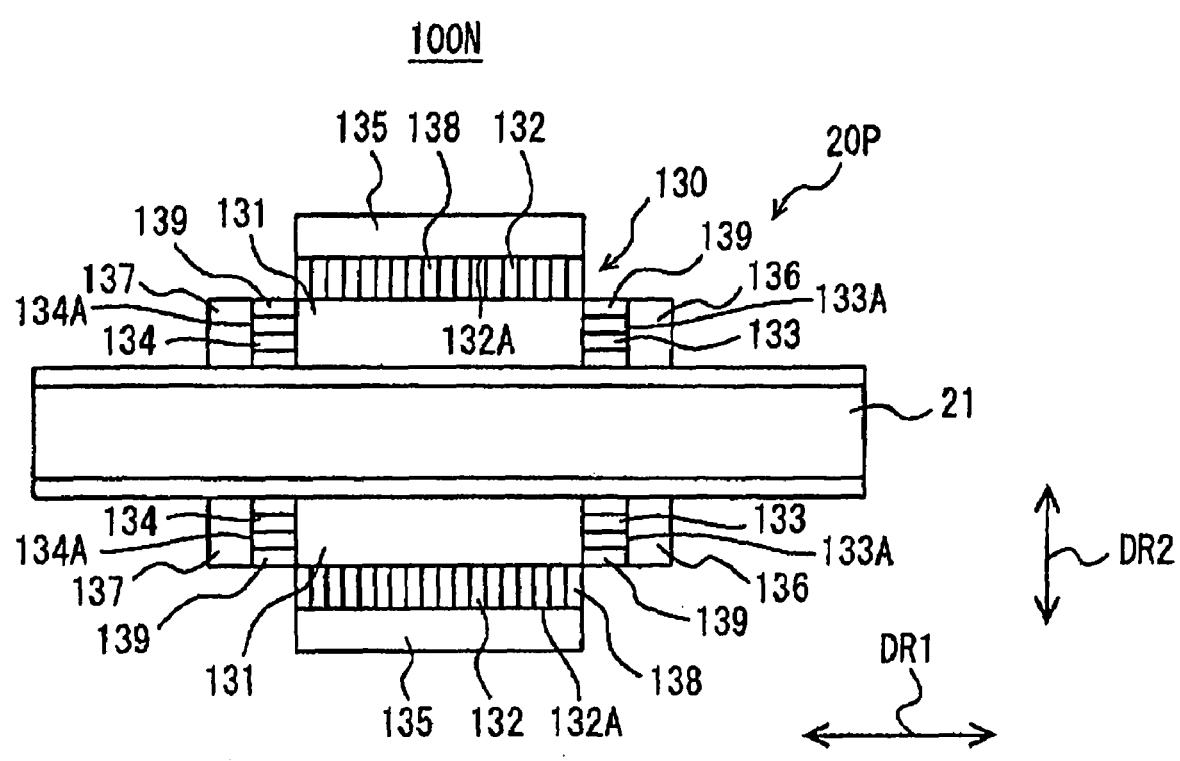
FIG. 33 is a schematic cross-sectional view showing a rotor in the rotary electric machine according to the fourteenth embodiment.

FIG. 33 is a schematic cross-sectional view of a rotor in a rotary electric machine according to Embodiment 14. Referring to FIG. 33, the rotary electric machine 100N according to Embodiment 14 comprises a rotor 20P in place of the rotor 20 of the rotary electric machine 100 shown in FIG. 3.

The rotor 20P comprises the rotor shaft 21, a rotor core 130, and magnets 135~137. The rotor core 130 consists of a joint part 131, a radial part 132, and axial parts 133 and 134.

The joint part 131 is formed of a ferric dust core and fixed to the rotor shaft 21. The radial part 132 is composed of a plurality of magnetic steel sheets 138 laminated along the rotating axis direction DR1. The axial parts 133 and 134 are composed of a plurality of magnetic steel sheets 139 laminated along the radial direction DR2.

The magnet 135 is disposed on a cylinder surface 132A of the radial part 132, the magnet 136 is disposed on a cylinder end face 133A of the axial part 133, and the magnet 137 is disposed on a cylinder end face 134A of the axial part 134.

When the joint part 131 for connecting the radial part 132 with the axial parts 133 and 134 of the rotor 20P is produced using the ferric dust core as described above, combining the magnetic flux generated in the radial part 132 with magnetic flux generated in the axial parts 133 and 134 can be facilitated, to thereby increase the output torque of the rotary electric machine 100N.

It may be noted that the joint part 131 is here formed of the ferric dust core for the same reason that the joint parts 11D and 11E in the rotary electric machine 100M are formed of the ferric dust core.

In addition, although it has been described above that one of the stator or the rotor comprises the radial part which is formed of the plurality of magnetic steel sheets laminated along the rotating axis direction DR1, the axial parts which are formed of the plurality of magnetic steel sheets laminated along the radial direction DR2, and the joint part for connecting the radial part to the axial parts which is formed of the ferric dust core, the present invention is not limited to the above-described structure. Both the stator and the rotor may comprise the radial part which is formed of the plurality of magnetic steel sheets laminated along the rotating axis direction DR1, the axial parts which are formed of the plurality of magnetic steel sheets laminated along the radial direction DR2, and the joint part for connecting the radial part to the axial parts which is formed of the ferric dust core.

Figure 34:
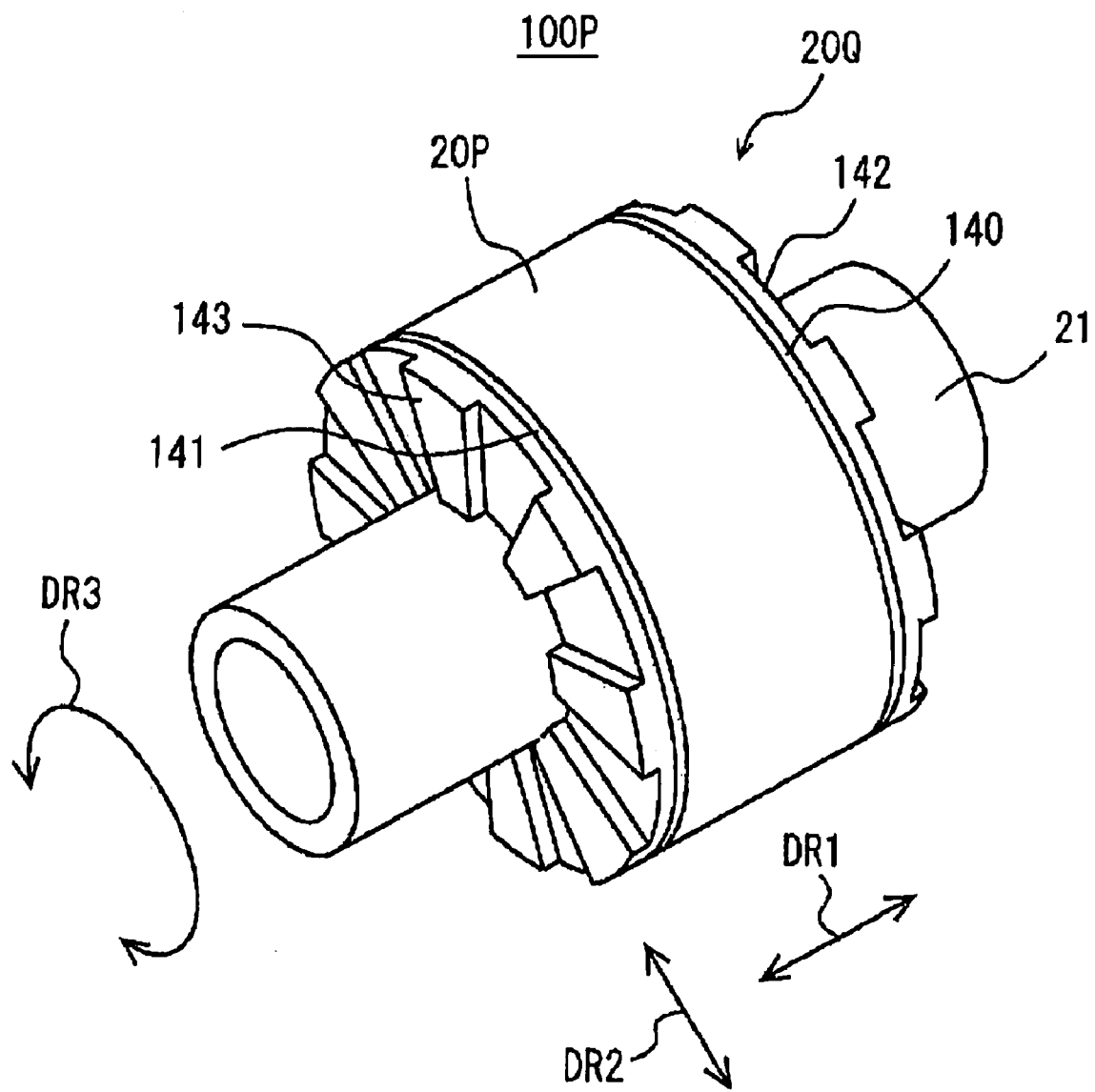
FIG. 34 is a perspective view of another rotor in the rotary electric machine according to the fourteenth embodiment.
Figure 35:
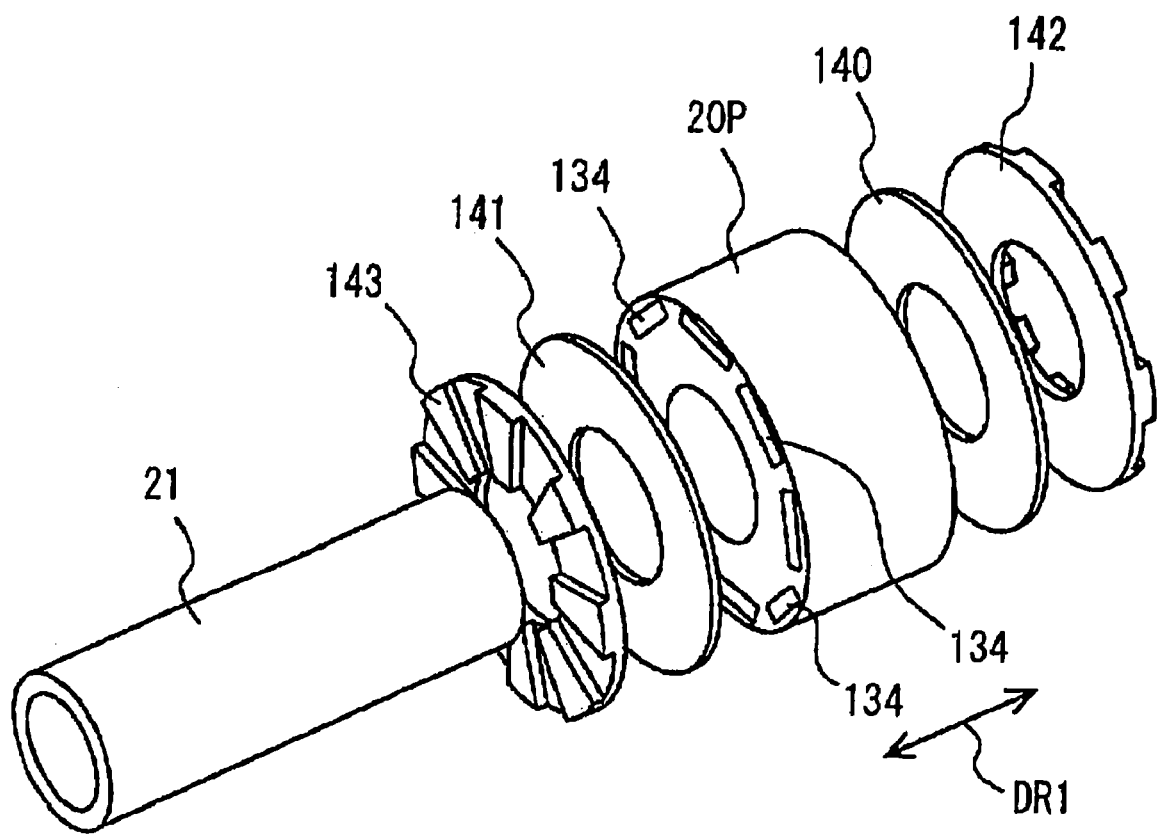
FIG. 35 is an exploded view of the rotor shown in FIG. 34.

FIG. 34 is a perspective view showing another rotor in a rotary electric machine according to Embodiment 14, and FIG. 35 is an exploded view of the rotor shown in FIG. 34. Referring to FIGS. 34 and 35, the rotary electric machine 100P according to Embodiment 14 comprises a rotor 20Q in place of the rotor 20 in the rotary electric machine 100.

The rotor 20Q is configured by adding non-magnetic plates 140 and 141 and end plates 142 and 143 to the rotor 20P, and the remaining components of the rotor 20Q are identical to those of the rotor 20P. The non-magnetic plates 140 and 141 retain both respective ends of the magnetic steel sheets contained in the rotor 20P in the rotating axis direction DR1. Then, the end plates 142 and 143 are caulked to the rotor shaft 21 to hold the magnetic steel sheets in the rotor 20P and the non-magnetic plates 140 and 141.

The end plates 142 and 143 have an indented structure with protrusions and depressions formed along the circumferential direction DR3 on a surface opposite to the magnetic steel sheets of the rotor 20P.

As described above, the plurality of magnetic steel sheets laminated along the rotating axis direction DR1 or the radial direction DR2 can easily be retained through the use of the non-magnetic plates 140 and 141 and the end plates 142 and 143.

Embodiment 15

Figure 36:
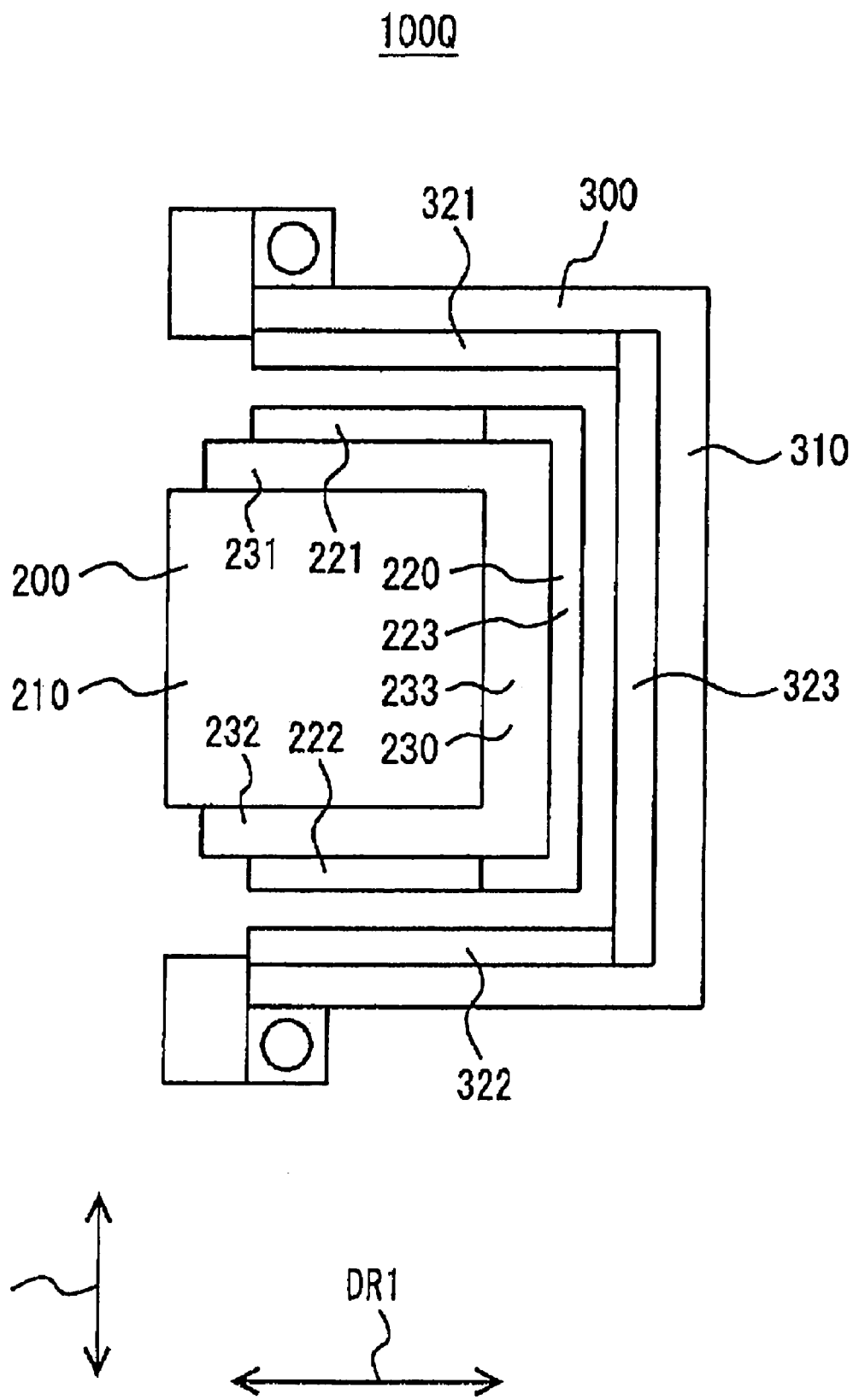
FIG. 36 is a schematic cross-sectional view of a rotary electric machine according to a fifteenth embodiment of the present invention.

FIG. 36 is a schematic cross-sectional view of a rotary electric machine according to a fifteenth embodiment of the present invention. Referring to FIG. 36, the rotary electric machine 100Q according to Embodiment 15 comprises a stator 200 and a rotor 300. The stator 200 is provided on an inner circumference side of the rotor 300 so as to be rotatable freely relative to the rotor 300.

The stator 200 includes a stator core 210, a tooth 220, and a coil 230. The tooth 220 consists of radial parts 221 and 222 and an axial part 223. The coil 230 consists of radial parts 231 and 232 and an axial part 233.

The radial parts 221 and 222 of the tooth 220 are disposed along the rotating axis direction DR1, while the axial part 223 is disposed along the radial direction DR2. Then, the radial parts 231 and 232 of the coil 230 are respectively wound around the radial parts 221, 222 and the axial part 223 of the tooth 220.

The rotor 300 includes a rotor core 310 and magnets 321~323. The rotor core 310 is formed in a hollow cylindrical shape. The magnets 321~323 are placed on an inner surface of the rotor core 310. More specifically, the magnets 321 and 322 are disposed on the inner surface of the rotor core 310 along the rotating axis direction DR1, while the magnet 323 is disposed on the inner surface of the rotor core 310 along the radial direction DR2. In this case, the magnets 321~323 are placed so as to respectively oppose the radial parts 231, 232 and the axial part 233 of the coil 230. In addition, the magnets 321 and 322 are magnetized in the radial direction DR2, while the magnet 323 is magnetized in the rotating axis direction DR1.

When a current is passed through the coils 231~233, the stator 200 generates magnetic fields in both the rotating axis direction DR1 and the radial direction DR2. Upon receipt of the magnetic fields generated by the coils 231~233, the magnets 321~323 of the rotor 300 magnetically interact with the respective magnetic fields. As a result of the magnetic interaction, the rotor 300 is rotated around the stator 200, to thereby output a predetermined torque from the rotary electric machine 100Q.

As such, even when the stator 200 is installed on the inner circumference side of the rotor 300, the end faces of the rotor 300 in the rotating axis direction DR1 can be magnetically utilized in an effective way. Consequently, it becomes possible to output a torque which is greater than that generated when the end faces of the rotor 300 in the rotating axis direction DR1 are not magnetically utilized.

It should be noted that, in the rotary electric machine 100Q, any one of the above-described rotors 20~20N may be used, and any one of the above-described stators 10, 10K, 10L, and 10M may be used.

In addition, the magnets 321 and 322 constitute the radial rotor magnetic pole section, and the magnet 323 constitutes the axial rotor magnetic pole section.

Further, although it has been described that, in the rotors 20, 20A, 20B, 20B1, 20C, 20D, 20E, 20E1, 20F, 20G, 20H, 20I, 20J, 20K, 20L, 20M, and 20N, the rotor cores 22, 40, 50, 60, 70, 80, 90, 110, and 120 are produced by forming the magnetic dust core, the present invention is not limited to such rotor cores. The rotor cores 22, 40, 50, 60, 70, 80, 90, 110, and 120 may be formed of a solid ferric core, or may be formed of a plurality of laminated magnetic steel sheets. When the rotor cores 22, 40, 50, 60, 70, 80, 90, 110, and 120 are produced by laminating the plurality of magnetic steel sheets, the radial part (a part magnetized in the radial direction DR2) is produced by laminating the plurality of magnetic steel sheets along the rotating axis direction DR1, while the axial part (a part magnetized in the rotating axis direction DR1) is produced by laminating the plurality of magnetic steel sheets along the radial direction DR2.

It should be understood the present disclosure of the embodiments is illustrative and not restrictive in any respect. The scope of the present invention is therefore not to be determined by the above description of the embodiments, but is to be determined solely by the following claims, and various changes and modifications that fall within the spirit and scope of the claims or equivalence of such a spirit and scope are therefore intended to be embraced by the claims.

INDUSTRIAL APPLICABILITY

The present invention may be applied to a rotary electric machine capable of making effective use of both end faces of a rotor in a rotating axis direction.

What is claimed is:

1. A rotary electric machine comprising:
a rotor including a plurality of first rotor magnetic pole sections directed toward a radial direction, a plurality of second rotor magnetic pole sections directed toward a rotating axis direction, and a rotor core having a cylinder surface that encloses a rotating axis and a cylinder end face located on an end in the rotating axis direction; and
a stator including a plurality of first stator magnetic pole sections which are opposed to the cylinder surface and disposed corresponding to the plurality of respective first rotor magnetic pole sections to generate magnetic flux in the radial direction, and a plurality of second stator magnetic pole sections which are opposed to the cylinder end face and disposed corresponding to the plurality of respective second rotor magnetic pole sections to generate magnetic flux in the rotating axis direction, wherein the rotor rotates freely relative to the stator upon receiving, at the plurality of first and second rotor magnetic pole sections, magnetic flux from the plurality of respective first and second stator magnetic pole sections;

each of the first rotor magnetic pole sections is composed of a first magnet disposed on the cylinder surface of the rotor core and magnetized in the radial direction; and each of the second rotor magnetic pole sections is composed of a second magnet embedded in the rotor core and magnetized in the rotating axis direction;

the rotor core is sandwiched between both end parts, in the rotating axis direction, of a plurality of magnets each having a cross section which is integrally formed in the shape of a substantially cornered letter C;

a middle part of each of the plurality of magnets along the rotating axis direction constitutes the first magnet; and the both end parts of each of the plurality of magnets in the rotating axis direction constitute the second magnet.

2. The rotary electric machine according to claim 1, wherein:

the first stator magnetic pole sections comprise;

a first tooth disposed along the rotating axis direction of the rotor, and a first coil wound around the first tooth; and the second stator magnetic pole sections comprise;

a second tooth disposed along the radial direction of the rotor, and a second coil wound around the second tooth.

3. The rotary electric machine according to claim 2, wherein a width of the second tooth in a direction toward an outer circumference from an inner circumference of the rotor remains substantially constant or becomes narrower.

4. The rotary electric machine according to claim 2, wherein one of the first coil or the second coil is placed inside the coil ends of the other of the first coil or the second coil.

5. The rotary electric machine according to claim 2, wherein:

the first tooth is separated from the second tooth; and the first coil is wound around the first tooth separately from of the second coil.

6. The rotary electric machine according to claim 1, wherein the rotor is placed on an inner circumference side of the stator.

7. The rotary electric machine according to claim 1, wherein the rotor is placed on an outer circumference side of the stator.

8. A rotary electric machine, comprising:

a rotor including a plurality of first rotor magnetic pole sections directed toward a radial direction, a plurality of second rotor magnetic pole sections directed toward a rotating axis direction, and a rotor core having a cylinder surface that encloses a rotating axis and a cylinder end face located on an end in the rotating axis direction; and a stator including a plurality of first stator magnetic pole sections which are opposed to the cylinder surface and disposed corresponding to the plurality of respective first rotor magnetic pole sections to generate magnetic flux in the radial direction, and a plurality of second stator magnetic pole sections which are opposed to the cylinder end face and disposed corresponding to the plurality of respective second rotor magnetic pole sections to generate magnetic flux in the rotating axis direction, wherein the rotor rotates freely relative to the stator upon receiving, at the plurality of first and second rotor magnetic pole sections, magnetic flux from the plurality of respective first and second stator magnetic pole sections;

the first rotor magnetic pole sections include are composed of a magnet embedded in the rotor core and magnetized in the radial direction;

the second rotor magnetic pole sections include ferromagnetic material that forms the rotor core and has a magnetic property of a salient pole in the rotating axis direction;

the magnet constituting the first rotor magnetic pole sections and a part of the ferromagnetic material constituting the second rotor magnetic pole sections are disposed on the same location in the radial direction;

the ferromagnetic material has an indented structure with protrusions and depressions formed along a circumferential direction of the rotor; and the magnet is disposed corresponding to the depressions in the indented structure.

* * * * *